US010697125B2

(12) United States Patent
Ostendorf et al.

(10) Patent No.: US 10,697,125 B2
(45) Date of Patent: *Jun. 30, 2020

(54) SANITARY TISSUE PRODUCTS

(71) Applicant: The Procter & Gamble Company, Cincinnati, OH (US)

(72) Inventors: Ward William Ostendorf, West Chester, OH (US); Guillermo Matias Vidal, Cincinnati, OH (US); Jeffrey Glen Sheehan, Symmes Township, OH (US); David Warren Loebker, Cincinnati, OH (US); Ryan Dominic Maladen, Anderson Township, OH (US); John Allen Manifold, Sunman, IN (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,765

(22) Filed: Mar. 6, 2019

(65) Prior Publication Data

US 2019/0194874 A1 Jun. 27, 2019

Related U.S. Application Data

(63) Continuation of application No. 15/803,016, filed on Nov. 3, 2017, now Pat. No. 10,351,997, which is a
(Continued)

(51) Int. Cl.
*D21H 27/00* (2006.01)
*D21H 27/02* (2006.01)
(Continued)

(52) U.S. Cl.
CPC ............ *D21H 27/005* (2013.01); *B32B 3/30* (2013.01); *B32B 29/005* (2013.01); *B32B 29/06* (2013.01);
(Continued)

(58) Field of Classification Search
CPC .... D21H 27/005; D21H 27/002; D21H 27/30; D21H 27/02; D21H 27/007; D21H 11/00;
(Continued)

(56) References Cited

U.S. PATENT DOCUMENTS 4,637,859 A * 1/1987 Trokhan ................ D21F 11/006
162/109
5,846,380 A * 12/1998 Van Phan ............. D21F 11/006
162/111
(Continued)

FOREIGN PATENT DOCUMENTS

EP 0140404 A1 * 5/1985 ............ D21F 11/006
WO WO-9701671 A1 * 1/1997 ............ D21F 11/006
(Continued)

OTHER PUBLICATIONS

All Office Action Application U.S. Appl. Nos. 14/574,415; 15/137,505; 15/498,543; 15/803,016; 16/293,752; 16/293,765; 16/293,968; 16/039,892; 16/287,380; 14/574,417; 15/209,092; 14/574,418; 15/242,672; 15/598,708; 15/803,042; 14/574,420; 15/131,138; 14/574,421; 15/141,150 and 14/574,422.
(Continued)

*Primary Examiner* — Jose A Fortuna

(74) *Attorney, Agent, or Firm* — C. Brant Cook

(57) ABSTRACT

Sanitary tissue products employing fibrous structures that exhibit novel compressibility properties alone and in combination with plate stiffness properties and methods for making same.

19 Claims, 18 Drawing Sheets

Related U.S. Application Data continuation of application No. 15/498,543, filed on Apr. 27, 2017, now Pat. No. 9,909,261, which is a continuation of application No. 15/137,505, filed on Apr. 25, 2016, now Pat. No. 9,670,620, which is a continuation of application No. 14/574,415, filed on Dec. 18, 2014, now Pat. No. 9,322,136.

(60) Provisional application No. 61/918,398, filed on Dec. 19, 2013.

(51) Int. Cl.
| | |
|---|---|
| *D21H 27/30* | (2006.01) |
| *D21H 27/40* | (2006.01) |
| *B32B 3/30* | (2006.01) |
| *B32B 29/00* | (2006.01) |
| *B32B 29/06* | (2006.01) |
| *D21H 11/04* | (2006.01) |

(52) U.S. Cl.
CPC ............. *D21H 11/04* (2013.01); *D21H 27/02* (2013.01); *D21H 27/30* (2013.01); *D21H 27/40* (2013.01); *B32B 2250/26* (2013.01); *B32B 2307/546* (2013.01); *B32B 2555/00* (2013.01)

(58) Field of Classification Search
CPC ...... D21H 27/00; D21H 27/38; D21H 25/005; D21H 27/40; B31F 1/07; B31F 1/12; B31F 1/16; B32B 3/30; D21F 11/006
See application file for complete search history.

(56) References Cited

U.S. PATENT DOCUMENTS

| | | | | |
|---|---|---|---|---|
| 6,162,327 | A * | 12/2000 | Batra | B32B 29/06 |
| | | | | 162/109 |
| 9,315,945 | B2 * | 4/2016 | Maladen | D21H 27/002 |
| 9,322,136 | B2 * | 4/2016 | Ostendorf | D21H 27/02 |
| 9,404,222 | B2 * | 8/2016 | Ostendorf | D21H 27/005 |
| 9,435,080 | B2 * | 9/2016 | Ostendorf | D21H 27/005 |
| 9,617,684 | B2 * | 4/2017 | Maladen | D21H 27/02 |
| 9,622,625 | B2 * | 4/2017 | Maladen | A47K 10/16 |
| 9,670,620 | B2 * | 6/2017 | Ostendorf | D21H 27/005 |
| 9,683,331 | B2 * | 6/2017 | Ostendorf | D21H 27/005 |
| 9,896,806 | B2 * | 2/2018 | Ostendorf | D21H 27/005 |
| 9,909,261 | B2 * | 3/2018 | Ostendorf | D21H 27/02 |
| 10,060,077 | B2 * | 8/2018 | Ostendorf | B31F 1/16 |
| 10,246,828 | B2 * | 4/2019 | Ostendorf | D21H 27/005 |
| 10,351,997 | B2 * | 7/2019 | Ostendorf | D21H 27/30 |
| 2004/0221975 | A1 * | 11/2004 | Hernandez-Munoa | D21H 27/00 |
| | | | | 162/135 |
| 2004/0231812 | A1 * | 11/2004 | Hernandez-Munoa | D21H 27/00 |
| | | | | 162/109 |
| 2007/0207293 | A1 * | 9/2007 | Santiago | D21H 27/02 |
| | | | | 428/174 |
| 2007/0272381 | A1 * | 11/2007 | Elony | B32B 29/00 |
| | | | | 162/123 |
| 2008/0029235 | A1 * | 2/2008 | Edwards | D21F 11/006 |
| | | | | 162/111 |
| 2009/0220769 | A1 * | 9/2009 | Manifold | D21H 15/06 |
| | | | | 428/326 |
| 2010/0040825 | A1 | 2/2010 | Manifold et al. | |
| 2010/0230059 | A1 * | 9/2010 | Santiago | D21H 27/02 |
| | | | | 162/109 |
| 2012/0088076 | A1 * | 4/2012 | Glakpe | A61F 13/51104 |
| | | | | 428/195.1 |
| 2013/0040101 | A1 | 2/2013 | Fung et al. | |
| 2013/0071624 | A1 | 3/2013 | Manifold et al. | |
| 2013/0143001 | A1 * | 6/2013 | Manifold | D06C 23/04 |
| | | | | 428/167 |
| 2013/0216789 | A1 * | 8/2013 | Kraus | D21H 27/30 |
| | | | | 428/172 |
| 2013/0319625 | A1 | 12/2013 | Mohammadi et al. | |
| 2013/0327487 | A1 | 12/2013 | Espinosa et al. | |
| 2015/0176217 | A1 * | 6/2015 | Ostendorf | D21H 27/005 |
| | | | | 162/111 |
| 2016/0319489 | A1 * | 11/2016 | Ostendorf | D21H 27/005 |
| 2016/0355989 | A1 * | 12/2016 | Ostendorf | D21H 27/005 |
| 2017/0022670 | A1 * | 1/2017 | Bailey | D21H 27/004 |
| 2017/0226697 | A1 * | 8/2017 | Ostendorf | D21H 27/005 |
| 2017/0254024 | A1 * | 9/2017 | Ostendorf | D21H 27/005 |
| 2017/0306566 | A1 * | 10/2017 | Bailey | D21F 11/14 |
| 2018/0051419 | A1 * | 2/2018 | Ostendorf | D21H 27/02 |
| 2018/0051420 | A1 * | 2/2018 | Ostendorf | D21H 27/02 |
| 2018/0320319 | A1 * | 11/2018 | Ostendorf | D21H 27/005 |
| 2019/0194873 | A1 * | 6/2019 | Ostendorf | D21H 27/02 |
| 2019/0194874 | A1 * | 6/2019 | Ostendorf | D21H 27/02 |
| 2019/0194875 | A1 * | 6/2019 | Ostendorf | D21H 27/005 |
| 2019/0203422 | A1 * | 7/2019 | Ostendorf | D21H 27/02 |

FOREIGN PATENT DOCUMENTS

| | | | | |
|---|---|---|---|---|
| WO | WO-2004099501 | A1 * | 11/2004 | ............. D21H 27/00 |
| WO | WO-2013184909 | A1 * | 12/2013 | ............. D21H 27/002 |

OTHER PUBLICATIONS

PCT International Search Report dated Mar. 11, 2015—5 pages.
PCT International Search Report dated Mar. 19, 2015—5 pages.
PCT International Search Report dated Mar. 13, 2015—5 pages.
PCT International Search Report dated Mar. 19, 2015—8 pages.

* cited by examiner

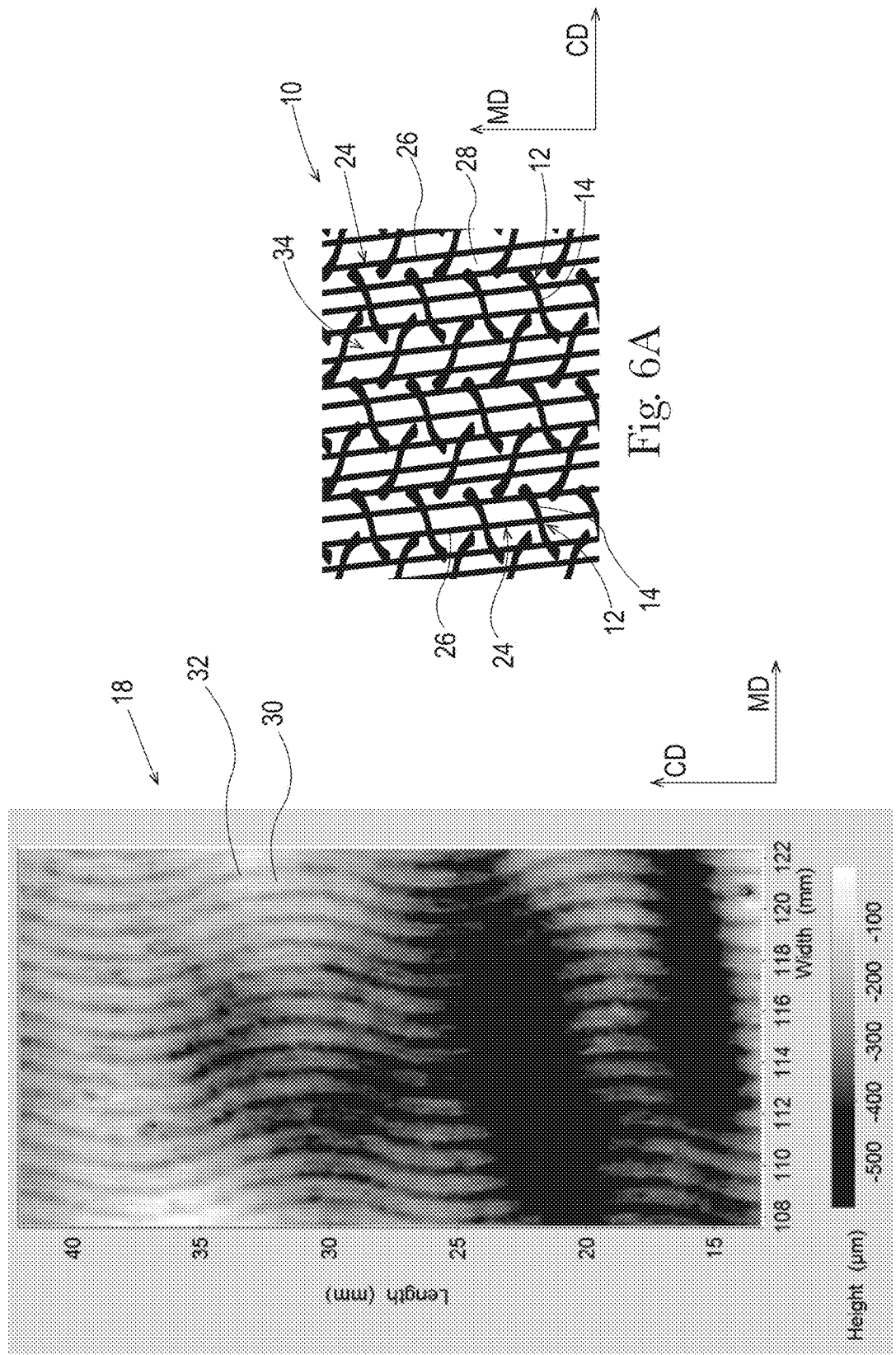

SANITARY TISSUE PRODUCTS

FIELD OF THE INVENTION

The present invention relates to sanitary tissue products comprising fibrous structures that exhibit a novel combination of cushiness as evidenced by compressibility of the sanitary tissue products and flexibility as evidenced by plate stiffness of the sanitary tissue products and methods for making same.

BACKGROUND OF THE INVENTION

Cushiness and flexibility, both characteristics associated with cloths, are attributes that consumers desire in their sanitary tissue products, for example bath tissue products. A technical measure of cushiness is compressibility of the sanitary tissue product which is measured by the Stack Compressibility and Resilient Bulk Test Method. A technical measure of flexibility is plate stiffness of the sanitary tissue product which is measured by the Plate Stiffness Test Method. Current sanitary tissue products fall short of consumers' expectations for cushiness and flexibility.

Accordingly, one problem faced by sanitary tissue product manufacturers is how to improve (i.e., increase) the compressibility properties and improve (i.e., decrease) the plate stiffness properties of sanitary tissue products, for example bath tissue products, to make such sanitary tissue products cushier and more flexible to better meet consumers' expectations for more clothlike, luxurious, and plush sanitary tissue products.

Accordingly, there exists a need for sanitary tissue products, for example bath tissue products, that exhibit improved compressibility properties and improved plate stiffness properties to provide consumers with sanitary tissue products that fulfill their desires and expectations for more comfortable and/or luxurious sanitary tissue products, and methods for making such sanitary tissue products.

SUMMARY OF THE INVENTION

The present invention fulfills the need described above by providing sanitary tissue products, for example bath tissue products, that are cushier and more flexible than known sanitary tissue products, for example bath tissue products, as evidenced by improved compressibility as measured according to the Stack Compressibility and Resilient Bulk Test Method and improved plate stiffness as measured according to the Plate Stiffness Test Method, and methods for making such sanitary tissue products.

One solution to the problem set forth above is achieved by making the sanitary tissue products or at least one fibrous structure ply employed in the sanitary tissue products on patterned molding members that impart three-dimensional (3D) patterns to the sanitary tissue products and/or fibrous structure plies made thereon, wherein the patterned molding members are designed such that the resulting sanitary tissue products, for example bath tissue products, made using the patterned molding members are cushier and more flexible than known sanitary tissue products as evidenced by the sanitary tissue products, for example bath tissue products, exhibiting compressibilities that are greater than (i.e., greater than 36 mils/(log(g/in$^2$)) and/or greater than 46 mils/(log(g/in$^2$))) the compressibilities of known sanitary tissue products, for example bath tissue products, as measured according to the Stack Compressibility and Resilient Bulk Test Method and plate stiffnesses that are less than (i.e., less than 8.3 N*mm and/or less than 5.2 N*mm) the plate stiffnesses of known sanitary tissue products, for example bath tissue products, as measured according to the Plate Stiffness Test Method. Non-limiting examples of such patterned molding members include patterned felts, patterned forming wires, patterned rolls, patterned fabrics, and patterned belts utilized in conventional wet-pressed papermaking processes, air-laid papermaking processes, and/or wet-laid papermaking processes that produce 3D patterned sanitary tissue products and/or 3D patterned fibrous structure plies employed in sanitary tissue products. Other non-limiting examples of such patterned molding members include through-air-drying fabrics and through-air-drying belts utilized in through-air-drying papermaking processes that produce through-air-dried sanitary tissue products, for example 3D patterned through-air dried sanitary tissue products, and/or through-air-dried fibrous structure plies, for example 3D patterned through-air-dried fibrous structure plies, employed in sanitary tissue products.

In one example of the present invention, a sanitary tissue product comprising a plurality of pulp fibers, wherein the sanitary tissue product exhibits a Compressibility of greater than 46 mils/(log(g/in$^2$)) as measured according to the Stack Compressibility and Resilient Bulk Test Method and a Plate Stiffness of less than 5.2 N*mm as measured according to the Plate Stiffness Test Method, is provided.

In another example of the present invention, a sanitary tissue product comprising at least one 3D patterned fibrous structure ply comprising a plurality of pulp fibers, wherein the sanitary tissue product exhibits a Compressibility of greater than 46 mils/(log(g/in$^2$)) as measured according to the Stack Compressibility and Resilient Bulk Test Method and a Plate Stiffness of less than 5.2 N*mm as measured according to the Plate Stiffness Test Method, is provided.

In yet another example of the present invention, a sanitary tissue product, for example bath tissue product, comprising at least one creped through-air-dried fibrous structure ply comprising a plurality of pulp fibers, wherein the sanitary tissue product exhibits a Compressibility of greater than 36 mils/(log(g/in$^2$)) as measured according to the Stack Compressibility and Resilient Bulk Test Method and a Plate Stiffness of less than 5.2 N*mm as measured according to the Plate Stiffness Test Method, is provided.

In even another example of the present invention, a multi-ply, for example two-ply, sanitary tissue product, for example bath tissue product, comprising a plurality of pulp fibers, wherein the multi-ply sanitary tissue product exhibits a Compressibility of greater than 36 mils/(log(g/in$^2$)) as measured according to the Stack Compressibility and Resilient Bulk Test Method and a Plate Stiffness of less than 5.2 N*mm as measured according to the Plate Stiffness Test Method, is provided.

In even yet another example of the present invention, a multi-ply, for example two-ply, sanitary tissue product, for example bath tissue product, comprising at least one 3D patterned fibrous structure ply, for example a 3D patterned through-air-dried fibrous structure ply, comprising a plurality of pulp fibers, wherein the multi-ply sanitary tissue product exhibits a Compressibility of greater than 36 mils/(log(g/in$^2$)) as measured according to the Stack Compressibility and Resilient Bulk Test Method and a Plate Stiffness of less than 5.2 N*mm as measured according to the Plate Stiffness Test Method, is provided.

In even yet another example of the present invention, a multi-ply sanitary tissue product comprising at least one creped through-air-dried fibrous structure ply comprising a plurality of pulp fibers, wherein the sanitary tissue product exhibits a Compressibility of greater than 36 mils/(log(g/in$^2$)) as measured according to the Stack Compressibility and Resilient Bulk Test Method and a Plate Stiffness of less than 8.3 N*mm as measured according to the Plate Stiffness Test Method.

In yet another example of the present invention, a multi-ply sanitary tissue product comprising a plurality of pulp fibers, wherein the sanitary tissue product exhibits a Compressibility as measured according to the Stack Compressibility and Resilient Bulk Test Method and a Plate Stiffness as measured according to the Plate Stiffness Test Method such that the sanitary tissue product is above a line having the following equation: y=1.5152x+43.061 graphed on a plot of Compressibility to Plate Stiffness as shown in FIG. 1A, is provided.

In yet another example of the present invention, a multi-ply bath tissue product, for example a bath tissue product that exhibits a sum of MD and CD dry tensile of less than 1000 g/in, comprising at least one creped through-air-dried fibrous structure ply comprising a plurality of pulp fibers, wherein the sanitary tissue product exhibits a Compressibility of greater than 36 mils/(log(g/in$^2$)) as measured according to the Stack Compressibility and Resilient Bulk Test Method, is provided.

In still yet another example of the present invention, a method for making a single- or multi-ply sanitary tissue product according to the present invention, wherein the method comprises the steps of:
  a. contacting a patterned molding member with a fibrous structure comprising a plurality of pulp fibers such that a 3D patterned fibrous structure ply is formed;
  b. making a single- or multi-ply sanitary tissue product according to the present invention comprising the 3D patterned fibrous structure ply, is provided.

Accordingly, the present invention provides sanitary tissue products, for example bath tissue products, that are cushier and more flexible than known sanitary tissue products, for example bath tissue products, and methods for making same.

BRIEF DESCRIPTION OF THE DRAWINGS

FIG. 5D is a magnified portion of the MikroCAD image of FIG. 5C;

FIG. 6A is a schematic representation of another example of a molding member according to the present invention;

DETAILED DESCRIPTION OF THE INVENTION

Definitions

Figure 1A:
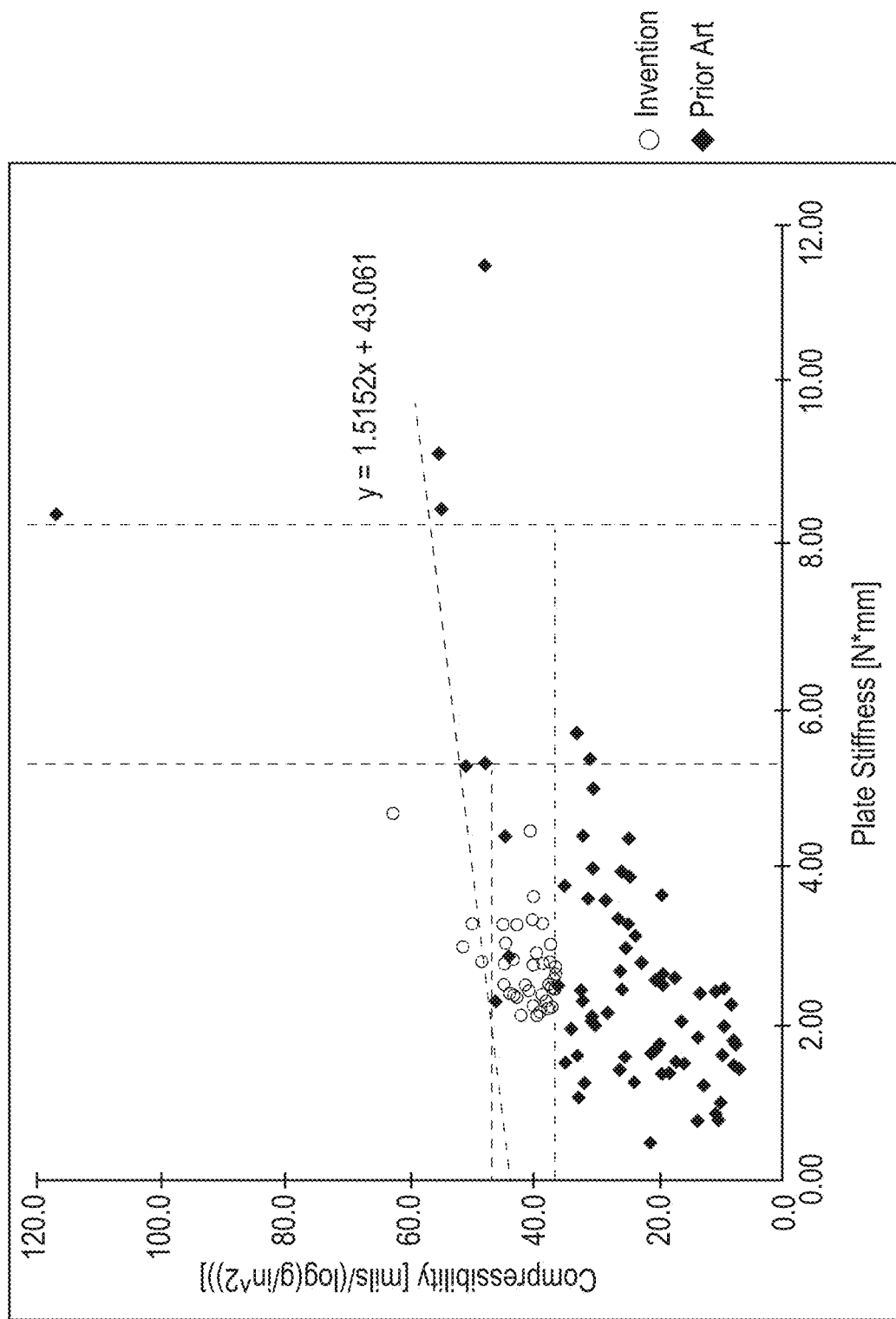
FIG. 1A is a plot of Compressibility (mils/(log(g/in$^2$))) to Plate Stiffness (N*mm) for sanitary tissue products of the present invention and commercially available sanitary tissue products, both single-ply and multi-ply sanitary tissue products, illustrating the high level of Compressibility and the low level of Plate Stiffness exhibited by the sanitary tissue products, for example bath tissue products, of the present invention.

"Sanitary tissue product" as used herein means a soft, low density (i.e. <about 0.15 g/cm$^3$) article comprising one or more fibrous structure plies according to the present invention, wherein the sanitary tissue product is useful as a wiping implement for post-urinary and post-bowel movement cleaning (toilet tissue), for otorhinolaryngological discharges (facial tissue), and multi-functional absorbent and cleaning uses (absorbent towels). The sanitary tissue product may be convolutedly wound upon itself about a core or without a core to form a sanitary tissue product roll.

The sanitary tissue products and/or fibrous structures of the present invention may exhibit a basis weight of greater than 15 g/m$^2$ to about 120 g/m$^2$ and/or from about 15 g/m$^2$ to about 110 g/m$^2$ and/or from about 20 g/m$^2$ to about 100 g/m$^2$ and/or from about 30 to 90 g/m$^2$. In addition, the sanitary tissue products and/or fibrous structures of the present invention may exhibit a basis weight between about 40 g/m² to about 120 g/m² and/or from about 50 g/m² to about 110 g/m² and/or from about 55 g/m² to about 105 g/m² and/or from about 60 to 100 g/m².

The sanitary tissue products of the present invention may exhibit a sum of MD and CD dry tensile strength of greater than about 59 g/cm (150 g/in) and/or from about 78 g/cm to about 394 g/cm and/or from about 98 g/cm to about 335 g/cm. In addition, the sanitary tissue product of the present invention may exhibit a sum of MD and CD dry tensile strength of greater than about 196 g/cm and/or from about 196 g/cm to about 394 g/cm and/or from about 216 g/cm to about 335 g/cm and/or from about 236 g/cm to about 315 g/cm. In one example, the sanitary tissue product exhibits a sum of MD and CD dry tensile strength of less than about 394 g/cm and/or less than about 335 g/cm.

In another example, the sanitary tissue products of the present invention may exhibit a sum of MD and CD dry tensile strength of greater than about 196 g/cm and/or greater than about 236 g/cm and/or greater than about 276 g/cm and/or greater than about 315 g/cm and/or greater than about 354 g/cm and/or greater than about 394 g/cm and/or from about 315 g/cm to about 1968 g/cm and/or from about 354 g/cm to about 1181 g/cm and/or from about 354 g/cm to about 984 g/cm and/or from about 394 g/cm to about 787 g/cm.

The sanitary tissue products of the present invention may exhibit an initial sum of MD and CD wet tensile strength of less than about 78 g/cm and/or less than about 59 g/cm and/or less than about 39 g/cm and/or less than about 29 g/cm.

The sanitary tissue products of the present invention may exhibit an initial sum of MD and CD wet tensile strength of greater than about 118 g/cm and/or greater than about 157 g/cm and/or greater than about 196 g/cm and/or greater than about 236 g/cm and/or greater than about 276 g/cm and/or greater than about 315 g/cm and/or greater than about 354 g/cm and/or greater than about 394 g/cm and/or from about 118 g/cm to about 1968 g/cm and/or from about 157 g/cm to about 1181 g/cm and/or from about 196 g/cm to about 984 g/cm and/or from about 196 g/cm to about 787 g/cm and/or from about 196 g/cm to about 591 g/cm.

The sanitary tissue products of the present invention may exhibit a density (based on measuring caliper at 95 g/in²) of less than about 0.60 g/cm³ and/or less than about 0.30 g/cm³ and/or less than about 0.20 g/cm³ and/or less than about 0.10 g/cm³ and/or less than about 0.07 g/cm³ and/or less than about 0.05 g/cm³ and/or from about 0.01 g/cm³ to about 0.20 g/cm³ and/or from about 0.02 g/cm³ to about 0.10 g/cm³.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets.

In another example, the sanitary tissue products may be in the form of discrete sheets that are stacked within and dispensed from a container, such as a box.

The fibrous structures and/or sanitary tissue products of the present invention may comprise additives such as surface softening agents, for example silicones, quaternary ammonium compounds, aminosilicones, lotions, and mixtures thereof, temporary wet strength agents, permanent wet strength agents, bulk softening agents, wetting agents, latexes, especially surface-pattern-applied latexes, dry strength agents such as carboxymethylcellulose and starch, and other types of additives suitable for inclusion in and/or on sanitary tissue products.

"Fibrous structure" as used herein means a structure that comprises a plurality of pulp fibers. In one example, the fibrous structure may comprise a plurality of wood pulp fibers. In another example, the fibrous structure may comprise a plurality of non-wood pulp fibers, for example plant fibers, synthetic staple fibers, and mixtures thereof. In still another example, in addition to pulp fibers, the fibrous structure may comprise a plurality of filaments, such as polymeric filaments, for example thermoplastic filaments such as polyolefin filaments (i.e., polypropylene filaments) and/or hydroxyl polymer filaments, for example polyvinyl alcohol filaments and/or polysaccharide filaments such as starch filaments. In one example, a fibrous structure according to the present invention means an orderly arrangement of fibers alone and with filaments within a structure in order to perform a function. Non-limiting examples of fibrous structures of the present invention include paper.

Non-limiting examples of processes for making fibrous structures include known wet-laid papermaking processes, for example conventional wet-pressed papermaking processes and through-air-dried papermaking processes, and air-laid papermaking processes. Such processes typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fibrous slurry is then used to deposit a plurality of fibers onto a forming wire, fabric, or belt such that an embryonic fibrous structure is formed, after which drying and/or bonding the fibers together results in a fibrous structure. Further processing the fibrous structure may be carried out such that a finished fibrous structure is formed. For example, in typical papermaking processes, the finished fibrous structure is the fibrous structure that is wound on the reel at the end of papermaking, often referred to as a parent roll, and may subsequently be converted into a finished product, e.g. a single- or multi-ply sanitary tissue product.

The fibrous structures of the present invention may be homogeneous or may be layered. If layered, the fibrous structures may comprise at least two and/or at least three and/or at least four and/or at least five layers of fiber and/or filament compositions.

In one example, the fibrous structure of the present invention consists essentially of fibers, for example pulp fibers, such as cellulosic pulp fibers and more particularly wood pulp fibers.

In another example, the fibrous structure of the present invention comprises fibers and is void of filaments.

In still another example, the fibrous structures of the present invention comprises filaments and fibers, such as a co-formed fibrous structure.

"Co-formed fibrous structure" as used herein means that the fibrous structure comprises a mixture of at least two different materials wherein at least one of the materials comprises a filament, such as a polypropylene filament, and at least one other material, different from the first material, comprises a solid additive, such as a fiber and/or a particulate. In one example, a co-formed fibrous structure comprises solid additives, such as fibers, such as wood pulp fibers, and filaments, such as polypropylene filaments.

"Fiber" and/or "Filament" as used herein means an elongate particulate having an apparent length greatly exceeding its apparent width, i.e. a length to diameter ratio of at least about 10. In one example, a "fiber" is an elongate particulate as described above that exhibits a length of less than 5.08 cm (2 in.) and a "filament" is an elongate particulate as described above that exhibits a length of greater than or equal to 5.08 cm (2 in.).

Fibers are typically considered discontinuous in nature. Non-limiting examples of fibers include pulp fibers, such as wood pulp fibers, and synthetic staple fibers such as polyester fibers.

Filaments are typically considered continuous or substantially continuous in nature. Filaments are relatively longer than fibers. Non-limiting examples of filaments include meltblown and/or spunbond filaments. Non-limiting examples of materials that can be spun into filaments include natural polymers, such as starch, starch derivatives, cellulose and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments and polycaprolactone filaments. The filaments may be monocomponent or multicomponent, such as bicomponent filaments.

In one example of the present invention, "fiber" refers to papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified fibrous structure. U.S. Pat. Nos. 4,300,981 and 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking.

In one example, the wood pulp fibers are selected from the group consisting of hardwood pulp fibers, softwood pulp fibers, and mixtures thereof. The hardwood pulp fibers may be selected from the group consisting of: tropical hardwood pulp fibers, northern hardwood pulp fibers, and mixtures thereof. The tropical hardwood pulp fibers may be selected from the group consisting of: *eucalyptus* fibers, acacia fibers, and mixtures thereof. The northern hardwood pulp fibers may be selected from the group consisting of: cedar fibers, maple fibers, and mixtures thereof.

In addition to the various wood pulp fibers, other cellulosic fibers such as cotton linters, rayon, lyocell, trichomes, seed hairs, and bagasse can be used in this invention. Other sources of cellulose in the form of fibers or capable of being spun into fibers include grasses and grain sources.

"Trichome" or "trichome fiber" as used herein means an epidermal attachment of a varying shape, structure and/or function of a non-seed portion of a plant. In one example, a trichome is an outgrowth of the epidermis of a non-seed portion of a plant. The outgrowth may extend from an epidermal cell. In one embodiment, the outgrowth is a trichome fiber. The outgrowth may be a hairlike or bristle-like outgrowth from the epidermis of a plant.

Trichome fibers are different from seed hair fibers in that they are not attached to seed portions of a plant. For example, trichome fibers, unlike seed hair fibers, are not attached to a seed or a seed pod epidermis. Cotton, kapok, milkweed, and coconut coir are non-limiting examples of seed hair fibers.

Further, trichome fibers are different from nonwood bast and/or core fibers in that they are not attached to the bast, also known as phloem, or the core, also known as xylem portions of a nonwood dicotyledonous plant stem. Non-limiting examples of plants which have been used to yield nonwood bast fibers and/or nonwood core fibers include kenaf, jute, flax, ramie and hemp.

Further trichome fibers are different from monocotyledonous plant derived fibers such as those derived from cereal straws (wheat, rye, barley, oat, etc), stalks (corn, cotton, sorghum, *Hesperaloe funifera*, etc.), canes (bamboo, bagasse, etc.), grasses (esparto, lemon, sabai, switchgrass, etc), since such monocotyledonous plant derived fibers are not attached to an epidermis of a plant.

Further, trichome fibers are different from leaf fibers in that they do not originate from within the leaf structure. Sisal and abaca are sometimes liberated as leaf fibers.

Finally, trichome fibers are different from wood pulp fibers since wood pulp fibers are not outgrowths from the epidermis of a plant; namely, a tree. Wood pulp fibers rather originate from the secondary xylem portion of the tree stem.

"Basis Weight" as used herein is the weight per unit area of a sample reported in lbs/3000 ft$^2$ or g/m$^2$ (gsm) and is measured according to the Basis Weight Test Method described herein.

"Machine Direction" or "MD" as used herein means the direction parallel to the flow of the fibrous structure through the fibrous structure making machine and/or sanitary tissue product manufacturing equipment.

"Cross Machine Direction" or "CD" as used herein means the direction parallel to the width of the fibrous structure making machine and/or sanitary tissue product manufacturing equipment and perpendicular to the machine direction.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply sanitary tissue product. It is also contemplated that an individual, integral fibrous structure can effectively form a multi-ply fibrous structure, for example, by being folded on itself.

"Embossed" as used herein with respect to a fibrous structure and/or sanitary tissue product means that a fibrous structure and/or sanitary tissue product has been subjected to a process which converts a smooth surfaced fibrous structure and/or sanitary tissue product to a decorative surface by replicating a design on one or more emboss rolls, which form a nip through which the fibrous structure and/or sanitary tissue product passes. Embossed does not include creping, microcreping, printing or other processes that may also impart a texture and/or decorative pattern to a fibrous structure and/or sanitary tissue product.

"Differential density", as used herein, means a fibrous structure and/or sanitary tissue product that comprises one or more regions of relatively low fiber density, which are referred to as pillow regions, and one or more regions of relatively high fiber density, which are referred to as knuckle regions.

"Densified", as used herein means a portion of a fibrous structure and/or sanitary tissue product that is characterized by regions of relatively high fiber density (knuckle regions).

"Non-densified", as used herein, means a portion of a fibrous structure and/or sanitary tissue product that exhibits a lesser density (one or more regions of relatively lower fiber density) (pillow regions) than another portion (for example a knuckle region) of the fibrous structure and/or sanitary tissue product.

"Non-rolled" as used herein with respect to a fibrous structure and/or sanitary tissue product of the present invention means that the fibrous structure and/or sanitary tissue product is an individual sheet (for example not connected to adjacent sheets by perforation lines. However, two or more individual sheets may be interleaved with one another) that is not convolutedly wound about a core or itself. For example, a non-rolled product comprises a facial tissue.

"Stack Compressibility and Resilient Bulk Test Method" as used herein means the Stack Compressibility and Resilient Bulk Test Method described herein.

"Slip Stick Coefficient of Friction Test Method" as used herein means the Slip Stick Coefficient of Friction Test Method described herein.

"Plate Stiffness Test Method" as used herein means the Plate Stiffness Test Method described herein.

"Creped" as used herein means creped off of a Yankee dryer or other similar roll and/or fabric creped and/or belt creped. Rush transfer of a fibrous structure alone does not result in a "creped" fibrous structure or "creped" sanitary tissue product for purposes of the present invention.

Sanitary Tissue Product

The sanitary tissue products of the present invention may be single-ply or multi-ply sanitary tissue products. In other words, the sanitary tissue products of the present invention may comprise one or more fibrous structures. The fibrous structures and/or sanitary tissue products of the present invention are made from a plurality of pulp fibers, for example wood pulp fibers and/or other cellulosic pulp fibers, for example trichomes. In addition to the pulp fibers, the fibrous structures and/or sanitary tissue products of the present invention may comprise synthetic fibers and/or filaments.

Figure 1B:
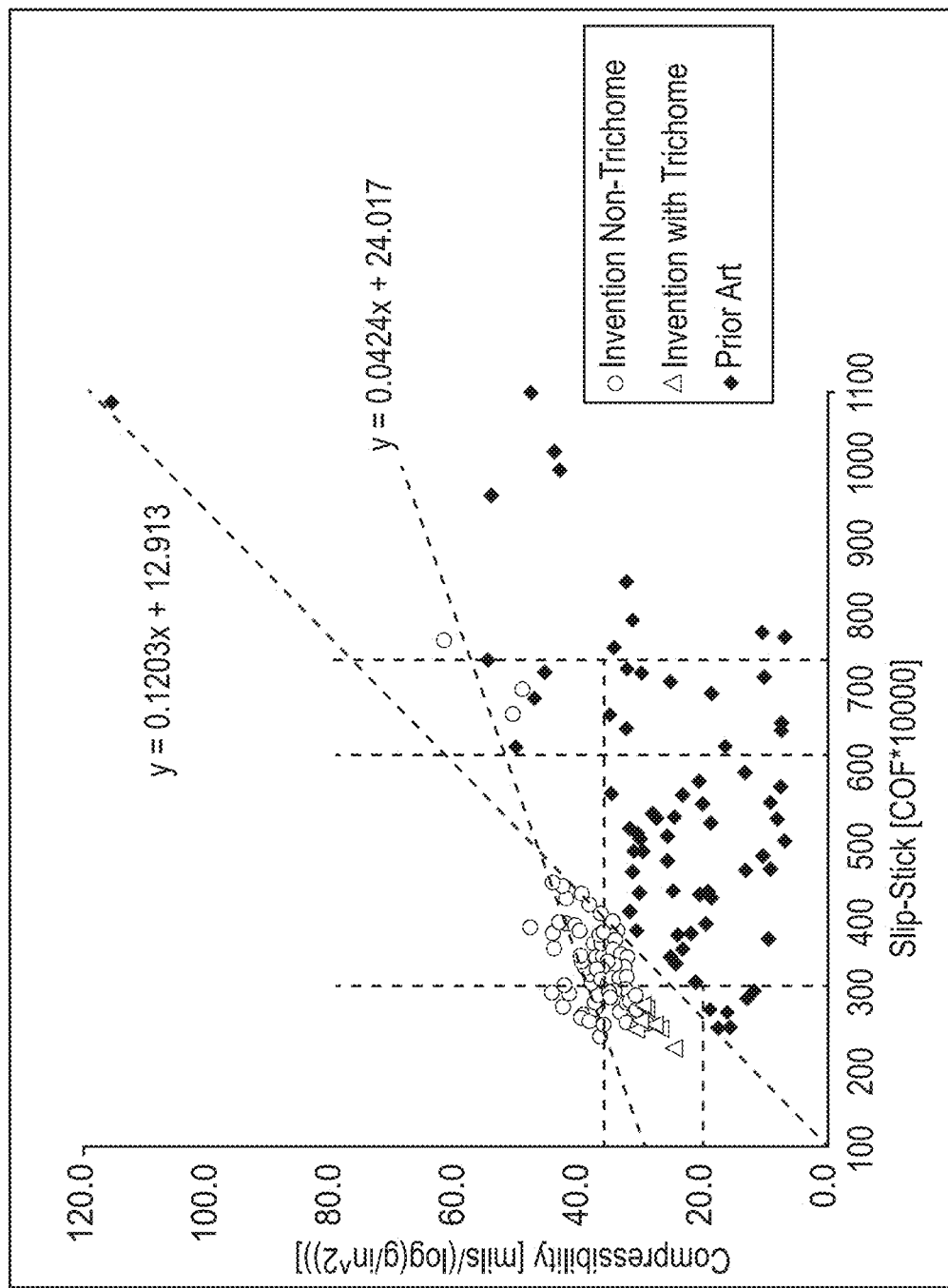
FIG. 1B is a plot of Compressibility (mils/(log(g/in$^2$))) to Slip Stick Coefficient of Friction (COF*10000) for sanitary tissue products of the present invention and commercially available sanitary tissue products, both single-ply and multi-ply sanitary tissue products, illustrating the high level of Compressibility and the low level of Plate Stiffness exhibited by the sanitary tissue products, for example bath tissue products, of the present invention.

As shown in FIG. 1 and Table 1 below, which contains a portion of the data values represented in FIG. 1, the sanitary tissue products of the present invention exhibit a combination of compressibility values as measured according to the Stack Compressibility and Resilient Bulk Test Method, plate stiffness values as measured according to the Plate Stiffness Test Method, slip stick coefficient of friction values as measured according to the Slip Stick Coefficient of Friction Test Method and/or resilient bulk values as measured according to the Stack Compressibility and Resilient Bulk Test Method that are novel over known sanitary tissue products.

TABLE 1

| Sample | # of plies | SlipStick COF * 10k | Plate Stiffness (N * mm) | Compressibility 10-1250 (-m) 5sht | Resilient Bulk (cc/g) | Basis Weight (lbs/3000 ft$^2$) | Basis Weight (gsm) |
|---|---|---|---|---|---|---|---|
| Kroger Home Sense Soft & Strong Bath | 2 | 672 | 2.48 | 35.55 | 44.39 | 32.17 | 52.36 |
| Kroger Home Sense Lotioned Facial | 3 | 258 | 1.38 | 17.31 | 36.91 | 27.25 | 44.35 |
| Angle Soft ® | 2 | 759 | 1.51 | 34.47 | 47.30 | 25.07 | 40.80 |
| Scott Extra Soft Tissue (UCTAD) | 1 | 725 | 2.27 | 45.64 | 72.40 | 19.20 | 31.25 |
| Scott 1000 | 1 | 780 | 0.84 | 10.25 | 41.03 | 11.37 | 18.50 |
| Cottonelle ® Ultra (UCTAD) | 2 | 625 | 5.24 | 50.30 | 69.47 | 28.73 | 46.76 |
| Quilted Northern ® Ultra Plush | 3 | 390 | 1.93 | 33.58 | 51.04 | — | — |
| Quilted Northern ® Ultra Soft & Strong | 2 | 510 | 3.33 | 25.68 | 52.95 | 30.84 | 50.19 |
| Kirkland Extra Soft | 2 | 382 | 2.76 | 21.97 | 58.90 | 28.42 | 46.25 |
| Kleenex ® Hand Towels (DRC) | 1 | 1016 | 4.36 | 44.10 | 56.20 | 40.63 | 66.13 |
| NEVE Neuttro | 2 | 528 | 1.37 | 18.66 | 55.15 | 19.33 | 31.46 |
| NEVE Supreme | 3 | 428 | 2.65 | 18.72 | 53.20 | 28.82 | 46.90 |
| Nepia Super Smooth | 2 | 506 | 1.45 | 6.81 | 42.69 | 22.74 | 37.01 |
| Tempo Neutral | 3 | 435 | 3.65 | 19.08 | 42.88 | 29.74 | 48.40 |
| Kleenex ® Tissue (Every Day) | 2 | 303 | 1.22 | 12.25 | 44.97 | 17.63 | 28.69 |
| Kleenex ® Tissue with Lotion | 2 | 298 | 2.40 | 12.73 | 39.12 | 28.82 | 46.90 |
| Kleenex ® Tissue Ultra Soft | 3 | 279 | 2.05 | 15.90 | 44.36 | 25.87 | 42.10 |
| Kleenex ® Tissue Cool Touch | 3 | 257 | 1.51 | 15.36 | 29.79 | 34.53 | 56.20 |
| Bounty ® Extra Soft | 2 | 743 | 9.19 | 54.98 | 65.66 | 36.32 | 59.11 |
| Bounty ® Basic | 1 | 1080 | 8.39 | 116.02 | 95.76 | 24.71 | 40.22 |
| Bounty ® | 2 | 955 | 8.50 | 54.53 | 91.69 | 30.95 | 50.37 |
| Brawny ® | 2 | 1092 | 11.61 | 47.82 | 90.10 | 29.66 | 48.27 |
| Charmin ® Ultra Soft | 2 | 346 | 3.26 | 24.51 | 55.13 | 31.13 | 50.66 |
| Charmin ® Ultra Strong | 2 | 437 | 3.97 | 30.21 | 76.03 | 22.98 | 37.40 |
| Charmin ® Premium | 2 | 568 | 3.74 | 34.69 | 79.24 | 23.81 | 38.75 |
| Puffs ® | 2 | 395 | 1.75 | 19.39 | 57.90 | 18.06 | 29.39 |
| Puffs ® Plus | 2 | 281 | 2.52 | 18.60 | 45.40 | 26.87 | 43.73 |
| Puffs ® Ultra | 2 | 263 | 2.60 | 16.78 | 45.29 | 24.63 | 40.09 |
| Scott Extra Soft Tissue (UCTAD) | 1 | 992 | 2.86 | 43.28 | 73.72 | 19.20 | 31.25 |

TABLE 1-continued

| Sample | # of plies | SlipStick COF * 10k | Plate Stiffness (N * mm) | Compressibility 10-1250 (-m) 5sht | Resilient Bulk (cc/g) | Basis Weight (lbs/3000 ft²) | Basis Weight (gsm) |
|---|---|---|---|---|---|---|---|
| Members Mark | 2 | 440 | 2.96 | 24.92 | 70.15 | 23.31 | 37.94 |
| Charmin ® Ultra Strong | 2 | 535 | 4.18 | 35.04 | 72.30 | 24.45 | 39.79 |
| Cottonelle ® Ultra (UCTAD) | 2 | 690 | 5.29 | 47.30 | 68.66 | 27.71 | 45.10 |
| Cottonelle ® Ultra (UCTAD) | 2 | 619 | — | 47.3 | 64.6 | 27.1 | 44.11 |
| Charmin ® Ultra Strong | 2 | 437 | 3.97 | 30.21 | 76.03 | 22.98 | 37.40 |
| Great Value Ultra Soft | 2 | 366 | 2.55 | 28.8 | 63.3 | 24.5 | 39.87 |
| Charmin ® Sensitive | 2 | 489 | 1.98 | 29.77 | 60.87 | 28.84 | 46.94 |
| Charmin ® Basic | 1 | 507 | 1.42 | 25.67 | 56.31 | 20.03 | 32.60 |
| Charmin ® Basic | 1 | 565 | 1.26 | 23.36 | 58.98 | 18.89 | 30.74 |
| Charmin ® Basic | 1 | 534 | 1.58 | 24.54 | 58.94 | 18.67 | 30.39 |
| Invention | 2 | 670 | 2.98 | 50.83 | 65.86 | 23.07 | 37.55 |
| Invention | 2 | 706 | 3.26 | 49.22 | 65.71 | 23.48 | 38.21 |
| Invention | 2 | 768 | 4.65 | 61.99 | 75.86 | 27.36 | 44.53 |
| Invention | 2 | 389 | 2.79 | 47.81 | 53.85 | 33.46 | 54.46 |
| Invention | 2 | 283 | 2.36 | 42.45 | 62.69 | 34.89 | 56.78 |
| Invention | 2 | 340 | 3.75 | 33.80 | 57.00 | 30.12 | 49.02 |
| Invention | 2 | 371 | 2.79 | 36.66 | 57.77 | 31.03 | 50.50 |
| Invention | 2 | 351 | 3.00 | 36.73 | 59.64 | 30.54 | 49.70 |
| Invention | 2 | 302 | 3.26 | 44.39 | 62.61 | 30.66 | 49.90 |
| Invention | 2 | 318 | 2.45 | 35.95 | 64.50 | 31.69 | 51.58 |
| Invention | 2 | 408 | 2.22 | 36.44 | 63.92 | 31.68 | 51.56 |
| Invention | 2 | 335 | 2.10 | 35.74 | 62.56 | 31.42 | 51.14 |
| Invention | 2 | 264 | 2.92 | 27.79 | 60.88 | 29.98 | 48.79 |
| Invention | 2 | 260 | 3.90 | 27.62 | 65.95 | 29.22 | 47.56 |
| Invention | 2 | 230 | 3.04 | 24.56 | 64.04 | 31.14 | 50.68 |
| Invention | 2 | 256 | 3.79 | 27.08 | 65.30 | — | — |
| Invention-Example 4 | 2 | 253 | 3.24 | 30.65 | 66.06 | — | — |
| Invention | 2 | 269 | 4.42 | 29.86 | 62.05 | — | — |
| Invention | 2 | 445 | 2.81 | 42.65 | 56.74 | 30.28 | 49.28 |
| Invention | 2 | 262 | 2.62 | 36.15 | 58.67 | 32.37 | 52.68 |
| Invention | 2 | 246 | 2.60 | 36.40 | 54.83 | 34.45 | 56.07 |
| Invention | 2 | 392 | 2.49 | 40.83 | 54.95 | 29.95 | 48.74 |
| Invention | 2 | 445 | 2.81 | 42.65 | 56.74 | 30.28 | 49.28 |
| Invention | 2 | 311 | 3.31 | 33.01 | 55.34 | 27.69 | 45.07 |
| Invention | 2 | 333 | 2.92 | 34.45 | 57.58 | 30.49 | 49.62 |
| Invention | 2 | 321 | 2.16 | 35.00 | 64.47 | 29.81 | 48.52 |
| Invention | 2 | 393 | 2.38 | 43.09 | 57.58 | 31.08 | 50.58 |
| Invention | 2 | 287 | 2.49 | 36.99 | 55.72 | 31.66 | 51.53 |
| Invention-Example 5 | 2 | 732 | 1.36 | 43.10 | 63.80 | 21.26 | 34.60 |
| Invention-Example 6 | 2 | 745 | 1.90 | 56.30 | 84.70 | 20.70 | 33.69 |
| Invention | 2 | 643 | 2.68 | 52.30 | 70.20 | 26.99 | 43.93 |
| Invention | 2 | 438 | 2.82 | 33.42 | 67.75 | 30.30 | 49.31 |
| Invention | 2 | 511 | 3.77 | 55.20 | 68.05 | 33.80 | 55.01 |
| Invention-Example 7 | 2 | 708 | 11.51 | 68.4 | 100.4 | 31.5 | 51.27 |
| Invention | 2 | 675 | 11.64 | 66.8 | 94.7 | 33.0 | 53.71 |

In one example of the present invention, the sanitary tissue product of the present invention exhibits a Compressibility of greater than 46 and/or greater than 47 and/or greater than 49 and/or greater than 50 mils/(log(g/in$^2$)) as measured according to the Stack Compressibility and Resilient Bulk Test Method and a Plate Stiffness of less than 5.2 and/or less than 5 and/or less than 4.75 and/or less than 4 and/or less than 3.5 and/or less than 3 and/or less than 2.5 N*mm as measured according to the Plate Stiffness Test Method.

In another example of the present invention, the sanitary tissue product of the present invention is a 3D patterned sanitary tissue product comprising at least one 3D patterned fibrous structure ply, wherein the sanitary tissue product exhibits a Compressibility of greater than 46 and/or greater than 47 and/or greater than 49 and/or greater than 50 mils/(log(g/in$^2$)) as measured according to the Stack Compressibility and Resilient Bulk Test Method and a Plate Stiffness of less than 5.2 and/or less than 5 and/or less than 4.75 and/or less than 4 and/or less than 3.5 and/or less than 3 and/or less than 2.5 N*mm as measured according to the Plate Stiffness Test Method.

In another example of the present invention, a sanitary tissue product of the present invention, for example a bath tissue product, comprises at least one creped through-air-dried fibrous structure ply comprising a plurality of pulp fibers, wherein the sanitary tissue product exhibits a Compressibility of greater than 36 and/or greater than 38 and/or greater than 40 and/or greater than 42 and/or greater than 46 and/or greater than 47 and/or greater than 49 and/or greater than 50 mils/(log(g/in$^2$)) as measured according to the Stack Compressibility and Resilient Bulk Test Method and a Plate Stiffness of less than 5.2 and/or less than 5 and/or less than 4.75 and/or less than 4 and/or less than 3.5 and/or less than 3 and/or less than 2.5 N*mm as measured according to the Plate Stiffness Test Method.

In even another example of the present invention, the sanitary tissue product is a multi-ply, for example two-ply, sanitary tissue product, for example bath tissue product, that exhibits a Compressibility of greater than 36 and/or greater than 38 and/or greater than 40 and/or greater than 42 and/or greater than 46 and/or greater than 47 and/or greater than 49 and/or greater than 50 mils/(log(g/in$^2$)) as measured according to the Stack Compressibility and Resilient Bulk Test Method and a Plate Stiffness of less than 5.2 and/or less than 5 and/or less than 4.75 and/or less than 4 and/or less than 3.5 and/or less than 3 and/or less than 2.5 N*mm as measured according to the Plate Stiffness Test Method.

In even yet another example of the present invention, the sanitary tissue product is a multi-ply, for example two-ply, sanitary tissue product, for example bath tissue product, comprising at least one 3D patterned fibrous structure ply, for example a 3D patterned through-air-dried fibrous structure ply, wherein the sanitary tissue product exhibits a Compressibility of greater than 36 and/or greater than 38 and/or greater than 40 and/or greater than 42 and/or greater than 46 and/or greater than 47 and/or greater than 49 and/or greater than 50 mils/(log(g/in$^2$)) as measured according to the Stack Compressibility and Resilient Bulk Test Method and a Plate Stiffness of less than 5.2 and/or less than 5 and/or less than 4.75 and/or less than 4 and/or less than 3.5 and/or less than 3 and/or less than 2.5 N*mm as measured according to the Plate Stiffness Test Method.

In one example, a sanitary tissue product of the present invention is a multi-ply sanitary tissue product comprising at least one through-air-dried fibrous structure comprising a plurality of pulp fibers, wherein the multi-ply sanitary tissue product exhibits a compressibility of greater than 36 and/or greater than 38 and/or greater than 40 and/or greater than 46 mils/(log(g/in$^2$)) as measured according to the Stack Compressibility and Resilient Bulk Test Method and a plate stiffness of less than 5 and/or less than 4.75 and/or less than 4 and/or less than 3.5 and/or less than 3 and/or less than 2.5 N*mm as measured according to the Plate Stiffness Test Method.

In another example, a sanitary tissue product of the present invention is a multi-ply sanitary tissue product comprising at least one creped, through-air-dried fibrous structure comprising a plurality of pulp fibers, wherein the multi-ply sanitary tissue product exhibits a compressibility of greater than 36 and/or greater than 38 and/or greater than 40 and/or greater than 46 mils/(log(g/in$^2$)) as measured according to the Stack Compressibility and Resilient Bulk Test Method and a plate stiffness of less than 8.3 and/or less than 7 and/or less than 5 and/or less than 4.75 and/or less than 4 and/or less than 3.5 and/or less than 3 and/or less than 2.5 N*mm as measured according to the Plate Stiffness Test Method.

In another example of the present invention, in addition to exhibiting the Compressibility as described above, the sanitary tissue product of the present invention may also exhibit a Slip Stick Coefficient of Friction of less than 725 and/or less than 700 and/or less than 625 and/or less than 620 and/or less than 500 and/or less than 340 and/or less than 314 and/or less than 312 and/or less than 300 and/or less than 290 and/or less than 280 and/or less than 275 and/or less than 260 (COF*10000) as measured according to the Slip Stick Coefficient of Friction Test Method.

In another example of the present invention, a multi-ply bath tissue product, for example a bath tissue product that exhibits a sum of MD and CD dry tensile of less than 1000 g/in, comprises at least one creped through-air-dried fibrous structure ply comprising a plurality of pulp fibers, wherein the sanitary tissue product exhibits a Compressibility of greater than 36 and/or greater than 38 and/or greater than 40 and/or greater than 42 and/or greater than 46 and/or greater than 47 and/or greater than 49 and/or greater than 50 mils/(log(g/in$^2$)) as measured according to the Stack Compressibility and Resilient Bulk Test Method.

In another example of the present invention, the sanitary tissue product of the present invention exhibits a Plate Stiffness of less than 8.3 and/or less than 8 and/or less than 6 and/or less than 5 and/or less than 3 and/or less than 2 and/or greater than 0 and/or greater than 0.5 and/or greater than 1 and/or greater than 1.25 and/or greater than 1.5 and/or greater than 1.75 N*mm as measured according to the Plate Stiffness Test Method and a Resilient Bulk of greater than 80 and/or greater than 82 and/or greater than 84 cc/g as measured according to the Stack Compressibility and Resilient Bulk Test Method.

In another example of the present invention, the sanitary tissue product of the present invention is a multi-ply sanitary tissue product and/or comprises a creped fibrous structure that exhibits a Plate Stiffness of less than 2.9 and/or less than 2.75 and/or less than 2.25 and/or less than 2 and/or greater than 0 and/or greater than 0.5 and/or greater than 1 and/or greater than 1.25 and/or greater than 1.5 and/or greater than 1.75 N*mm as measured according to the Plate Stiffness Test Method and a Resilient Bulk of greater than 64 and/or greater than 70 and/or greater than 75 and/or greater than 80 and/or greater than 82 and/or greater than 84 cc/g as measured according to the Stack Compressibility and Resilient Bulk Test Method.

In another example of the present invention, the sanitary tissue product of the present invention is a multi-ply sanitary tissue product that exhibits a Plate Stiffness of less than 1.6 and/or less than 1.5 and/or less than 1.4 and/or greater than 0 and/or greater than 0.5 and/or greater than 1 and/or greater than 1.2 N*mm as measured according to the Plate Stiffness Test Method and a Resilient Bulk of greater than 56 and/or greater than 60 and/or greater than 64 and/or greater than 70 and/or greater than 75 and/or greater than 80 and/or greater than 82 and/or greater than 84 cc/g as measured according to the Stack Compressibility and Resilient Bulk Test Method.

In another example of the present invention, the sanitary tissue product of the present invention exhibits a Plate Stiffness of less than 2.2 and/or less than 2.1 and/or less than 2 and/or greater than 0 and/or greater than 0.5 and/or greater than 1 and/or greater than 1.2 and/or greater than 1.4 and/or greater than 1.6 and/or greater than 1.75 N*mm as measured according to the Plate Stiffness Test Method, a Resilient Bulk of greater than 56 and/or greater than 60 and/or greater than 64 and/or greater than 70 and/or greater than 75 and/or greater than 80 and/or greater than 82 and/or greater than 84 cc/g as measured according to the Stack Compressibility and Resilient Bulk Test Method, and a Compressibility of greater than 34.5 and/or greater than 37 and/or greater than 40 and/or greater than 42 and/or greater than 45 and/or greater than 50 and/or greater than 55 mils/(log(g/in$^2$)) as measured according to the Stack Compressibility and Resilient Bulk Test Method.

In another example of the present invention, the sanitary tissue product of the present invention exhibits a Plate Stiffness of less than 8.3 and/or less than 8 and/or less than 6 and/or less than 5 and/or less than 3 and/or less than 2 and/or greater than 0 and/or greater than 0.5 and/or greater than 1 and/or greater than 1.25 and/or greater than 1.5 and/or greater than 1.75 N*mm as measured according to the Plate Stiffness Test Method, a Resilient Bulk of greater than 80 and/or greater than 82 and/or greater than 84 cc/g as measured according to the Stack Compressibility and Resilient Bulk Test Method, and a Compressibility of greater than 30 and/or greater than 32 and/or greater than 34.5 and/or greater than 37 and/or greater than 40 and/or greater than 42 and/or greater than 45 and/or greater than 50 and/or greater than 55 mils/(log(g/in$^2$)) as measured according to the Stack Compressibility and Resilient Bulk Test Method.

In another example of the present invention, the sanitary tissue product of the present invention exhibits a Plate Stiffness of less than 2.2 and/or less than 2.1 and/or less than 2 and/or greater than 0 and/or greater than 0.5 and/or greater than 1 and/or greater than 1.2 and/or greater than 1.4 and/or greater than 1.6 and/or greater than 1.75 N*mm as measured according to the Plate Stiffness Test Method, a Compressibility of greater than 33 and/or greater than 34.5 and/or greater than 37 and/or greater than 40 and/or greater than 42 and/or greater than 45 and/or greater than 50 and/or greater than 55 mils/(log(g/in$^2$)) as measured according to the Stack Compressibility and Resilient Bulk Test Method, and a Basis Weight of less than 25 and/or less than 24 and/or less than 23 and/or less than 22 and/or less than 21.5 and/or less than 21 and/or greater than 0 and/or greater than 10 and/or greater than 15 lbs/3000 ft$^2$ as measured according to the Basis Weight Test Method.

In another example of the present invention, the sanitary tissue product of the present invention exhibits a Compressibility of greater than 45 and/or greater than 45.6 and/or greater than 50 and/or greater than 55 mils/(log(g/in$^2$)) as measured according to the Stack Compressibility and Resilient Bulk Test Method and a Basis Weight of less than 25 and/or less than 24.7 and/or less than 24 and/or less than 23 and/or less than 22 and/or less than 21.5 and/or less than 21 and/or greater than 0 and/or greater than 10 and/or greater than 15 lbs/3000 ft$^2$ as measured according to the Basis Weight Test Method.

In another example of the present invention, the sanitary tissue product of the present invention is a multi-ply sanitary tissue product that exhibits a Compressibility of greater than 0 and/or greater than 10 and/or greater than 15 and/or greater than 20 mils/(log(g/in$^2$)) as measured according to the Stack Compressibility and Resilient Bulk Test Method and a Basis Weight of less than 23 and/or less than 22.9 and/or less than 22 and/or less than 21.5 and/or less than 21 and/or greater than 0 and/or greater than 10 and/or greater than 15 lbs/3000 ft$^2$ as measured according to the Basis Weight Test Method.

In another example of the present invention, the sanitary tissue product of the present invention comprises a creped fibrous structure such that the sanitary tissue product exhibits a Compressibility of greater than 32 and/or greater than 32.25 and/or greater than 33 and/or greater than 34.5 and/or greater than 37 and/or greater than 40 and/or greater than 42 and/or greater than 45 and/or greater than 50 and/or greater than 55 mils/(log(g/in$^2$)) as measured according to the Stack Compressibility and Resilient Bulk Test Method and a Basis Weight of less than 23 and/or less than 22.9 and/or less than 22 and/or less than 21.5 and/or less than 21 and/or greater than 0 and/or greater than 10 and/or greater than 15 lbs/3000 ft$^2$ as measured according to the Basis Weight Test Method.

In another example of the present invention, the sanitary tissue product of the present invention comprises a creped fibrous structure such that the sanitary tissue product exhibits a Compressibility of greater than 36 and/or greater than 37 and/or greater than 40 and/or greater than 42 and/or greater than 45 and/or greater than 50 and/or greater than 55 and/or less than 115 and/or less than 100 and/or less than 90 mils/(log(g/in$^2$)) as measured according to the Stack Compressibility and Resilient Bulk Test Method and a Basis Weight of less than 29.6 and/or less than 29 and/or less than 28 and/or less than 27 and/or less than 25 and/or less than 24 and/or less than 23 and/or less than 22.9 and/or less than 22 and/or less than 21.5 and/or less than 21 and/or greater than 0 and/or greater than 10 and/or greater than 15 lbs/3000 ft$^2$ as measured according to the Basis Weight Test Method.

In another example of the present invention, the sanitary tissue product of the present invention exhibits a Slip Stick Coefficient of Friction of less than 950 and/or less than 900 and/or less than 850 and/or less than 800 and/or less than 775 and/or less than 725 and/or less than 700 and/or less than 625 and/or less than 620 and/or less than 500 and/or less than 340 and/or less than 314 and/or less than 312 and/or less than 300 and/or less than 290 and/or less than 280 and/or less than 275 and/or less than 260 (COF*10000) as measured according to the Slip Stick Coefficient of Friction Test Method and a Resilient Bulk of greater than 80 and/or greater than 82 and/or greater than 84 cc/g as measured according to the Stack Compressibility and Resilient Bulk Test Method.

In another example of the present invention, the sanitary tissue product of the present invention exhibits a Slip Stick Coefficient of Friction of less than 300 and/or less than 290 and/or less than 280 and/or less than 275 and/or less than 260 (COF*10000) as measured according to the Slip Stick Coefficient of Friction Test Method and a Resilient Bulk of greater than 55 and/or greater than 56 and/or greater than 60 and/or greater than 64 and/or greater than 70 and/or greater than 75 and/or greater than 80 and/or greater than 82 and/or greater than 84 cc/g as measured according to the Stack Compressibility and Resilient Bulk Test Method.

The fibrous structures and/or sanitary tissue products of the present invention may be creped or uncreped.

The fibrous structures and/or sanitary tissue products of the present invention may be wet-laid or air-laid.

The fibrous structures and/or sanitary tissue products of the present invention may be embossed.

The fibrous structures and/or sanitary tissue products of the present invention may comprise a surface softening agent or be void of a surface softening agent. In one example, the sanitary tissue product is a non-lotioned sanitary tissue product, such as a sanitary tissue product comprising a non-lotioned fibrous structure ply, for example a non-lotioned through-air-dried fibrous structure ply, for example a non-lotioned creped through-air-dried fibrous structure ply and/or a non-lotioned uncreped through-air-dried fibrous structure ply. In yet another example, the sanitary tissue product may comprise a non-lotioned fabric creped fibrous structure ply and/or a non-lotioned belt creped fibrous structure ply.

The fibrous structures and/or sanitary tissue products of the present invention may comprise trichome fibers and/or may be void of trichome fibers.

The fibrous structures and/or sanitary tissue products of the present invention may exhibit the compressibility values alone or in combination with the plate stiffness values with or without the aid of surface softening agents. In other words, the sanitary tissue products of the present invention may exhibit the compressibility values described above alone or in combination with the plate stiffness values when surface softening agents are not present on and/or in the sanitary tissue products, in other words the sanitary tissue product is void of surface softening agents. This does not mean that the sanitary tissue products themselves cannot include surface softening agents. It simply means that when the sanitary tissue product is made without adding the surface softening agents, the sanitary tissue product exhibits the compressibility and plate stiffness values of the present invention. Addition of a surface softening agent to such a sanitary tissue product within the scope of the present invention (without the need of a surface softening agent or other chemistry) may enhance the sanitary tissue product's compressibility and/or plate stiffness to an extent. However, sanitary tissue products that need the inclusion of surface softening agents on and/or in them to be within the scope of the present invention, in other words to achieve the compressibility and plate stiffness values of the present invention, are outside the scope of the present invention.

Patterned Molding Members

The sanitary tissue products of the present invention and/or fibrous structure plies employed in the sanitary tissue products of the present invention are formed on patterned molding members that result in the sanitary tissue products of the present invention. In one example, the pattern molding member comprises a non-random repeating pattern. In another example, the pattern molding member comprises a resinous pattern.

A "reinforcing element" may be a desirable (but not necessary) element in some examples of the molding member, serving primarily to provide or facilitate integrity, stability, and durability of the molding member comprising, for example, a resinous material. The reinforcing element can be fluid-permeable or partially fluid-permeable, may have a variety of embodiments and weave patterns, and may comprise a variety of materials, such as, for example, a plurality of interwoven yarns (including Jacquard-type and the like woven patterns), a felt, a plastic, other suitable synthetic material, or any combination thereof.

Figure 2A:
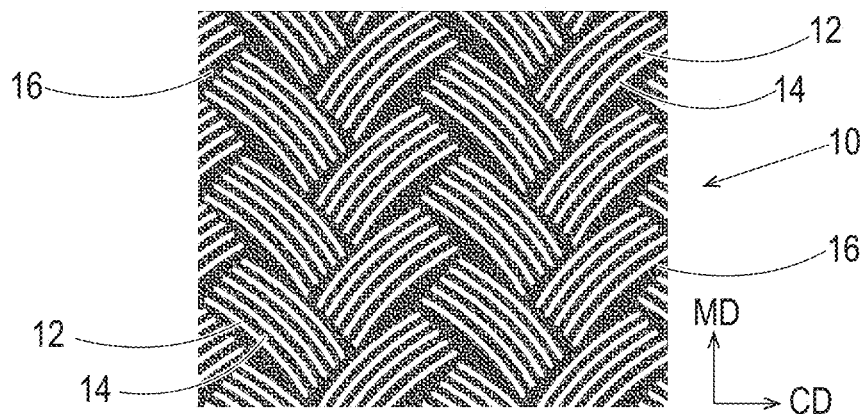
FIG. 2A is a schematic representation of an example of a molding member according to the present invention.
Figure 2B:
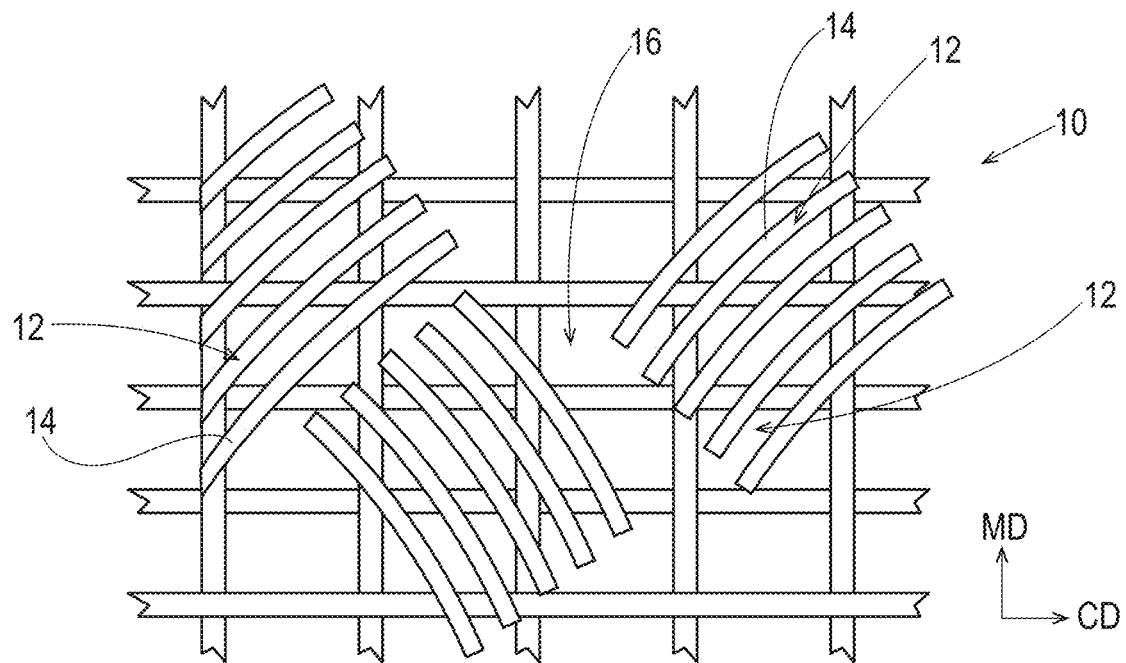
FIG. 2B is a further schematic representation of a portion of the molding member of FIG. 2A.
Figure 3:
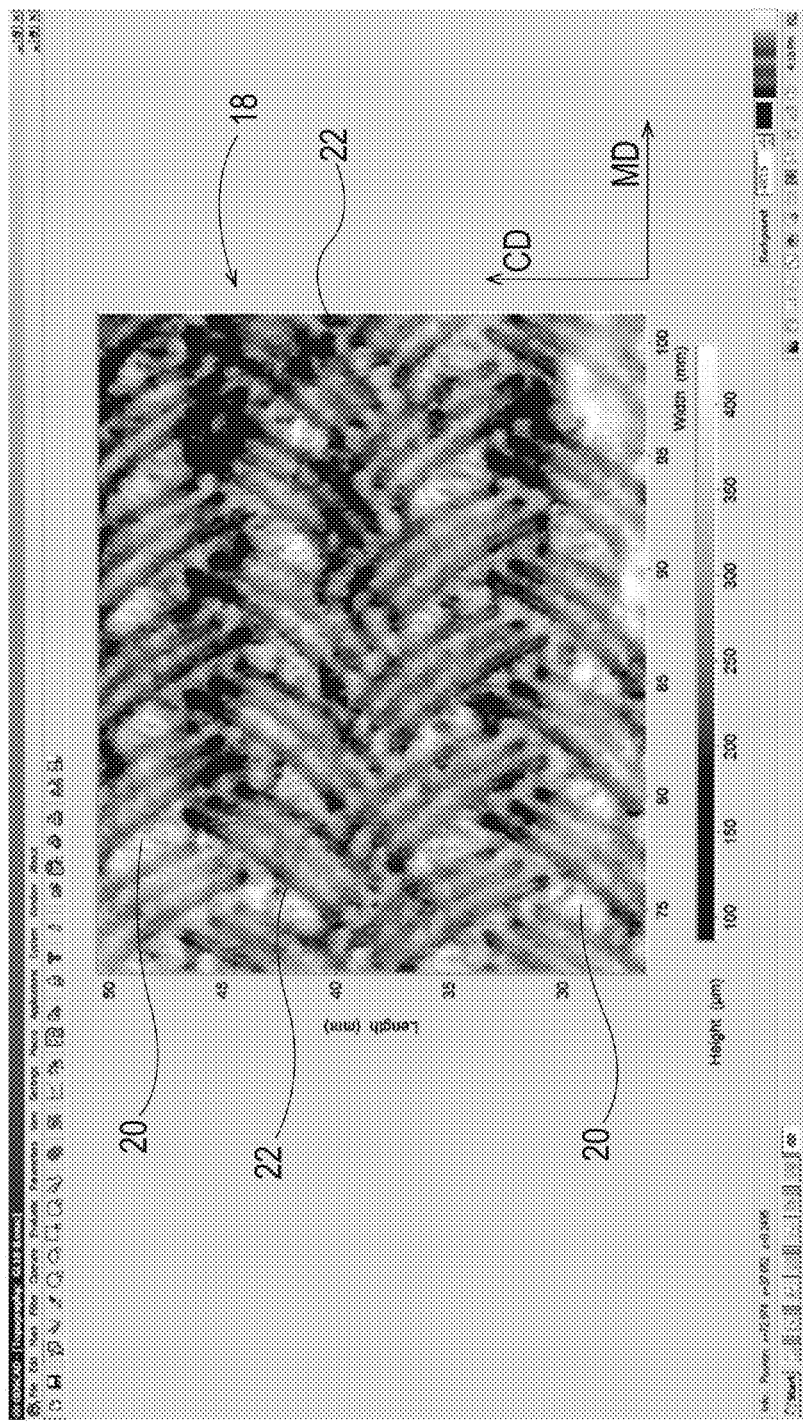
FIG. 3 is a MikroCAD image of a sanitary tissue product made using the molding member of FIG. 2A.

As shown in FIGS. 2A and 2B, a non-limiting of a patterned molding member suitable for use in the present invention comprises a through-air-drying belt 10. The through-air-drying belt 10 comprises a plurality of discrete knuckles 12 formed by line segments of resin 14 arranged in a non-random, repeating pattern, such as a woven pattern, for example a herringbone pattern. The discrete knuckles 12 are dispersed within a continuous pillow network 16, which constitute a deflection conduit into which portions of a fibrous structure ply being made on the through-air-drying belt 10 of FIGS. 2A and 2B deflect. FIG. 3 is a MikroCAD image of a resulting sanitary tissue product 18 being made on the through-air-drying belt 10. The sanitary tissue product 18 comprises a continuous pillow region 20 imparted by the continuous pillow network 16 of the through-air-drying belt 10 of FIGS. 2A and 2B. The sanitary tissue product 18 further comprises discrete knuckle regions 22 imparted by the discrete knuckles 12 of the through-air-drying belt 10 of FIGS. 2A and 2B. The continuous pillow region 20 and discrete knuckle regions 22 may exhibit different densities, for example, one or more of the discrete knuckle regions 22 may exhibit a density that is greater than the density of the continuous pillow region 20.

Figure 4A:
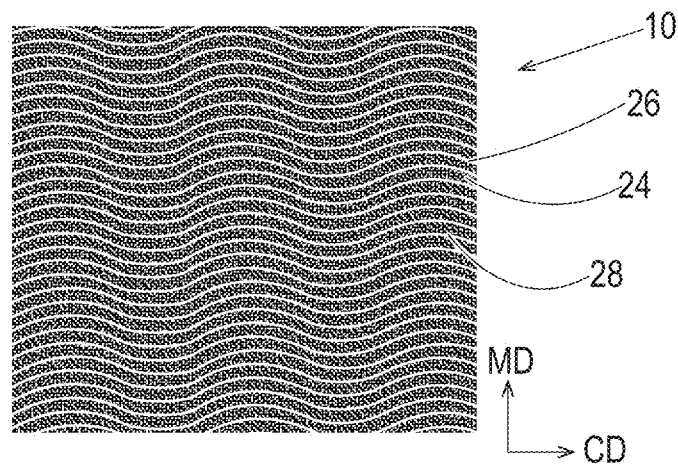
FIG. 4A is a schematic representation of another example of a molding member according to the present invention.
Figure 4B:
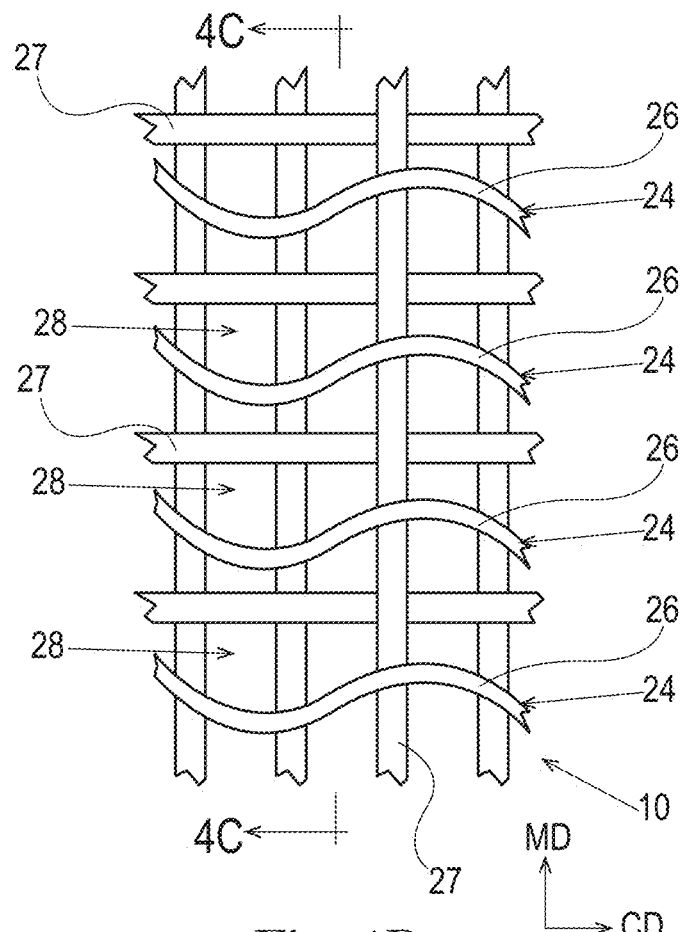
FIG. 4B is a further schematic representation of a portion of the molding member of FIG. 4A.
Figure 5A:
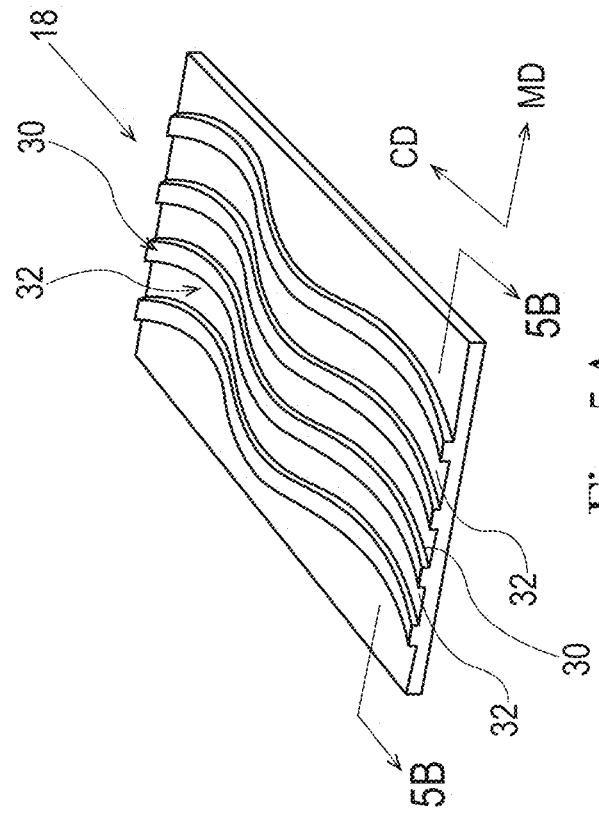
FIG. 5A is a schematic representation of a sanitary tissue product made using the molding member of FIG. 4A.
Figure 5B:
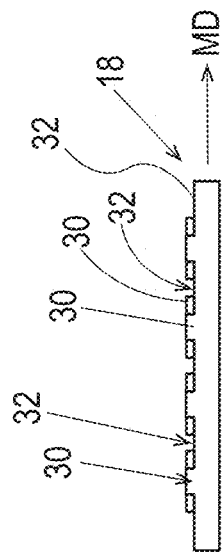
FIG. 5B is a cross-sectional view of FIG. 5A taken along line 5B-5B.
Figure 4C:
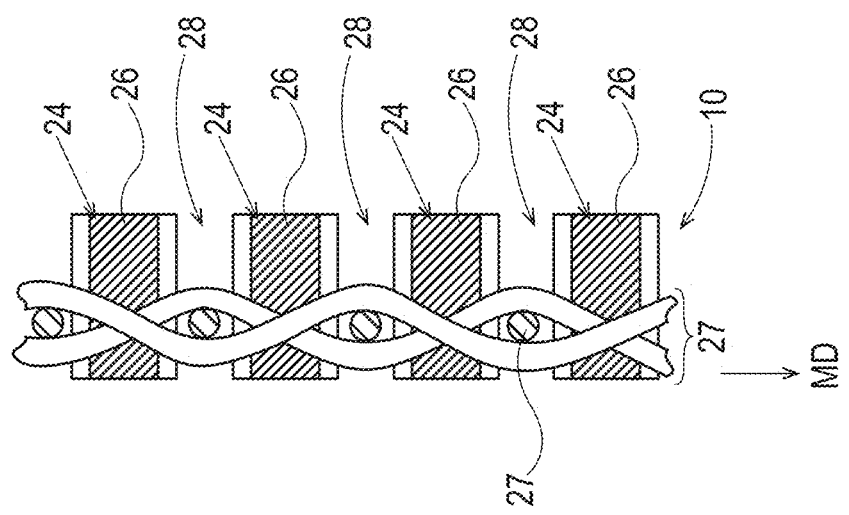
FIG. 4C is a cross-sectional view of FIG. 4B taken along line 4C-4C.
Figure 5C:
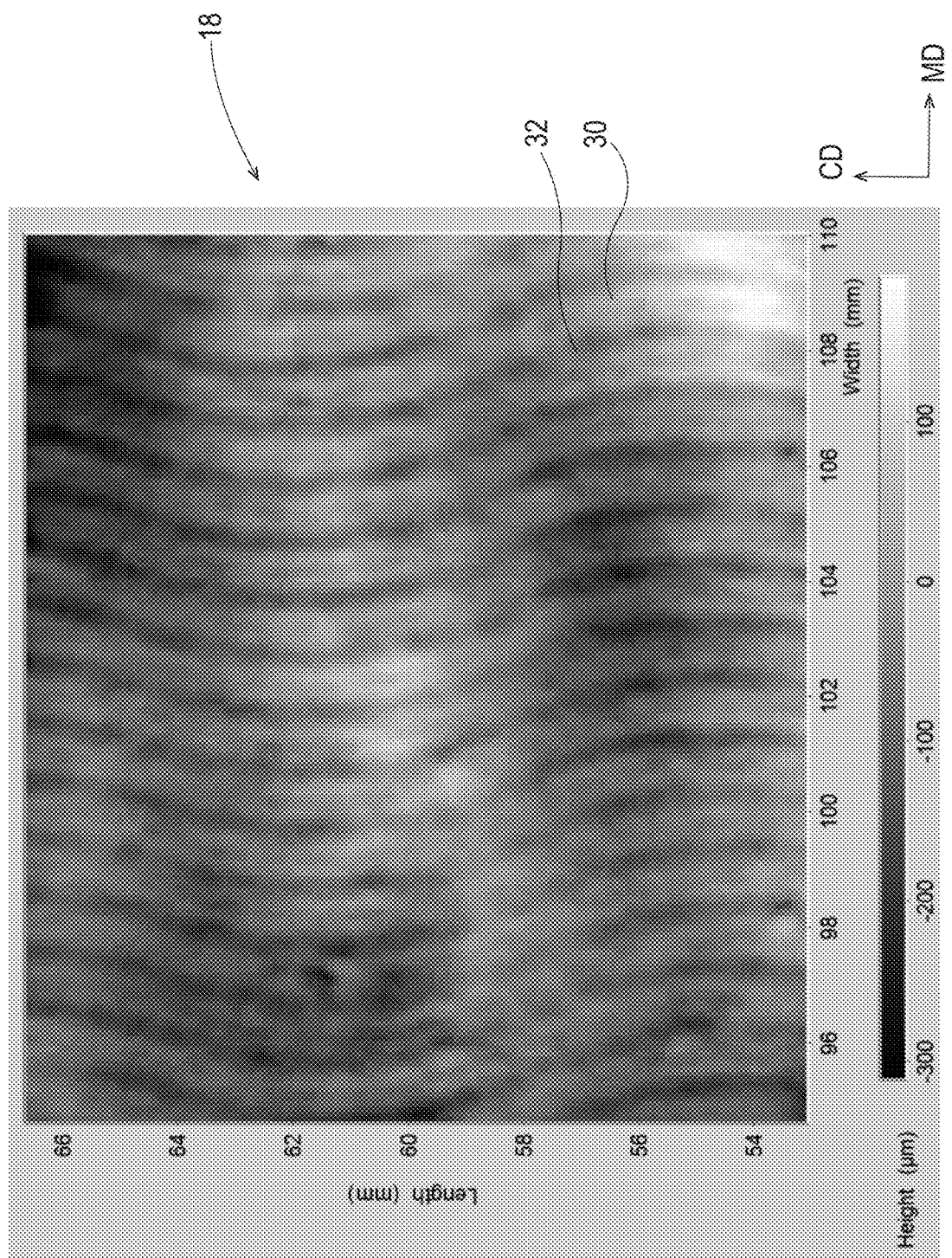
FIG. 5C is a MikroCAD image of a sanitary tissue product made using the molding member of FIG. 4A.

As shown in FIGS. 4A-4C, a non-limiting example of another patterned molding member suitable for use in the present invention comprises a through-air-drying belt 10. The through-air-drying belt 10 comprises a plurality of semi-continuous knuckles 24 formed by semi-continuous line segments of resin 26 arranged in a non-random, repeating pattern, for example a substantially cross-machine direction repeating pattern of semi-continuous lines supported on a support fabric comprising filaments 27. In this case, the semi-continuous lines are curvilinear, for example sinusoidal. The semi-continuous knuckles 24 are spaced from adjacent semi-continuous knuckles 24 by semi-continuous pillows 28, which constitute deflection conduits into which portions of a fibrous structure ply being made on the through-air-drying belt 10 of FIGS. 4A-4C deflect. As shown in FIGS. 5A-5D, a resulting sanitary tissue product 18 being made on the through-air-drying belt 10 of FIGS. 4A-4C comprises semi-continuous pillow regions 30 imparted by the semi-continuous pillows 28 of the through-air-drying belt 10 of FIGS. 4A-4C. The sanitary tissue product 18 further comprises semi-continuous knuckle regions 32 imparted by the semi-continuous knuckles 24 of the through-air-drying belt 10 of FIGS. 4A-4C. The semi-continuous pillow regions 30 and semi-continuous knuckle regions 32 may exhibit different densities, for example, one or more of the semi-continuous knuckle regions 32 may exhibit a density that is greater than the density of one or more of the semi-continuous pillow regions 30.

Without wishing to be bound by theory, foreshortening (dry & wet crepe, fabric crepe, rush transfer, etc) is an integral part of fibrous structure and/or sanitary tissue paper making, helping to produce the desired balance of strength, stretch, softness, absorbency, etc. Fibrous structure support, transport and molding members used in the papermaking process, such as rolls, wires, felts, fabrics, belts, etc. have been variously engineered to interact with foreshortening to further control the fibrous structure and/or sanitary tissue product properties. In the past, it has been thought that it is advantageous to avoid highly CD dominant knuckle designs that result in MD oscillations of foreshortening forces. However, it has unexpectedly been found that the molding member of FIGS. 4A-4C provides patterned molding member having CD dominant semi-continuous knuckles that to enable better control of the fibrous structure's molding and stretch while overcoming the negatives of the past.

Figure 6B:
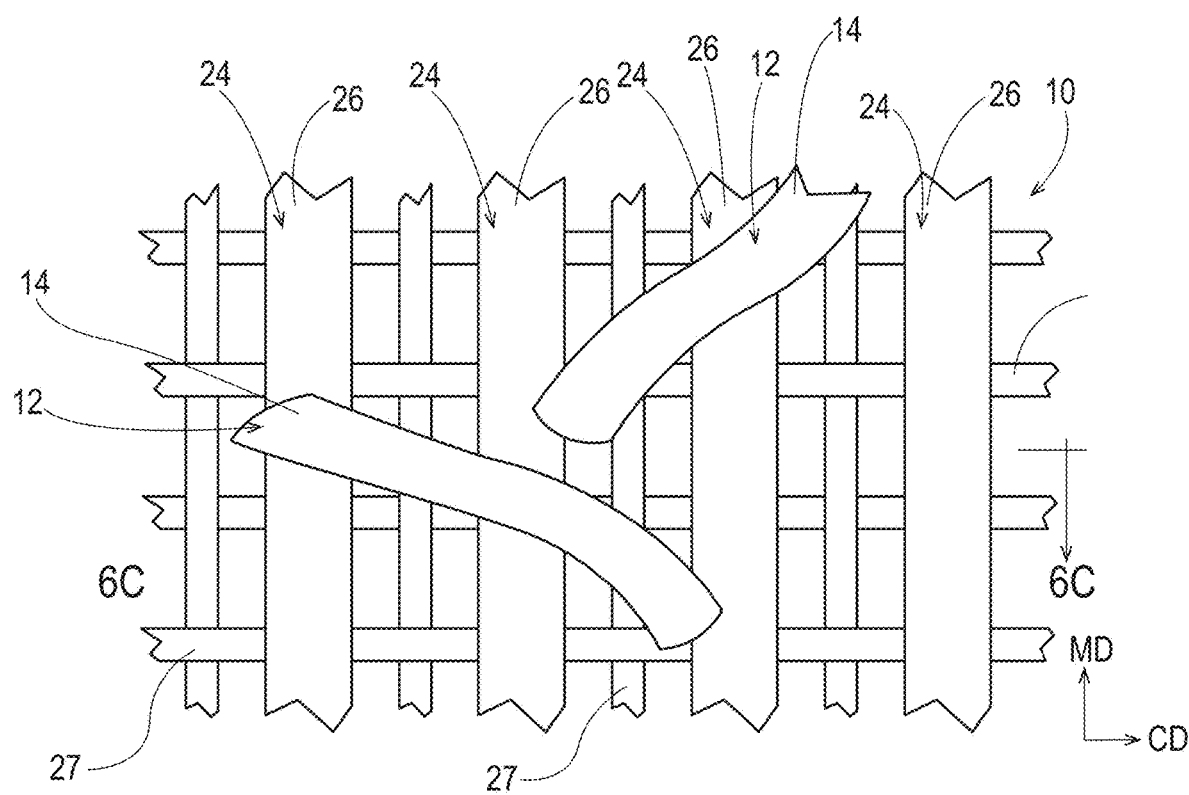
FIG. 6B is a further schematic representation of a portion of the molding member of FIG. 6A.
Figure 6C:
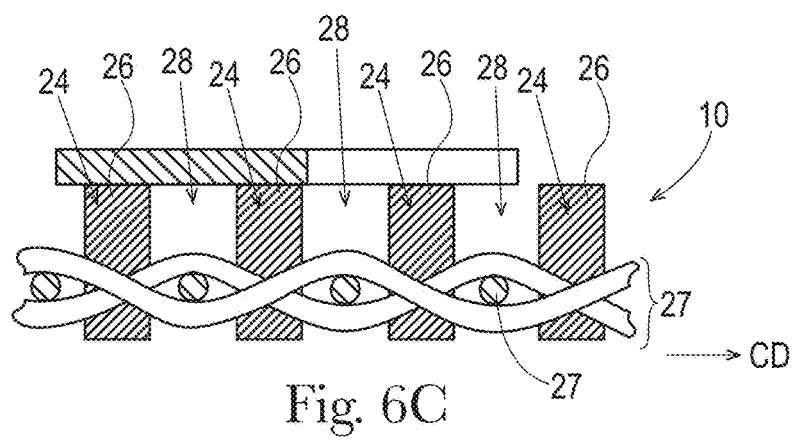
FIG. 6C is a cross-sectional view of FIG. 6B taken along line 6C-6C.
Figure 7A:
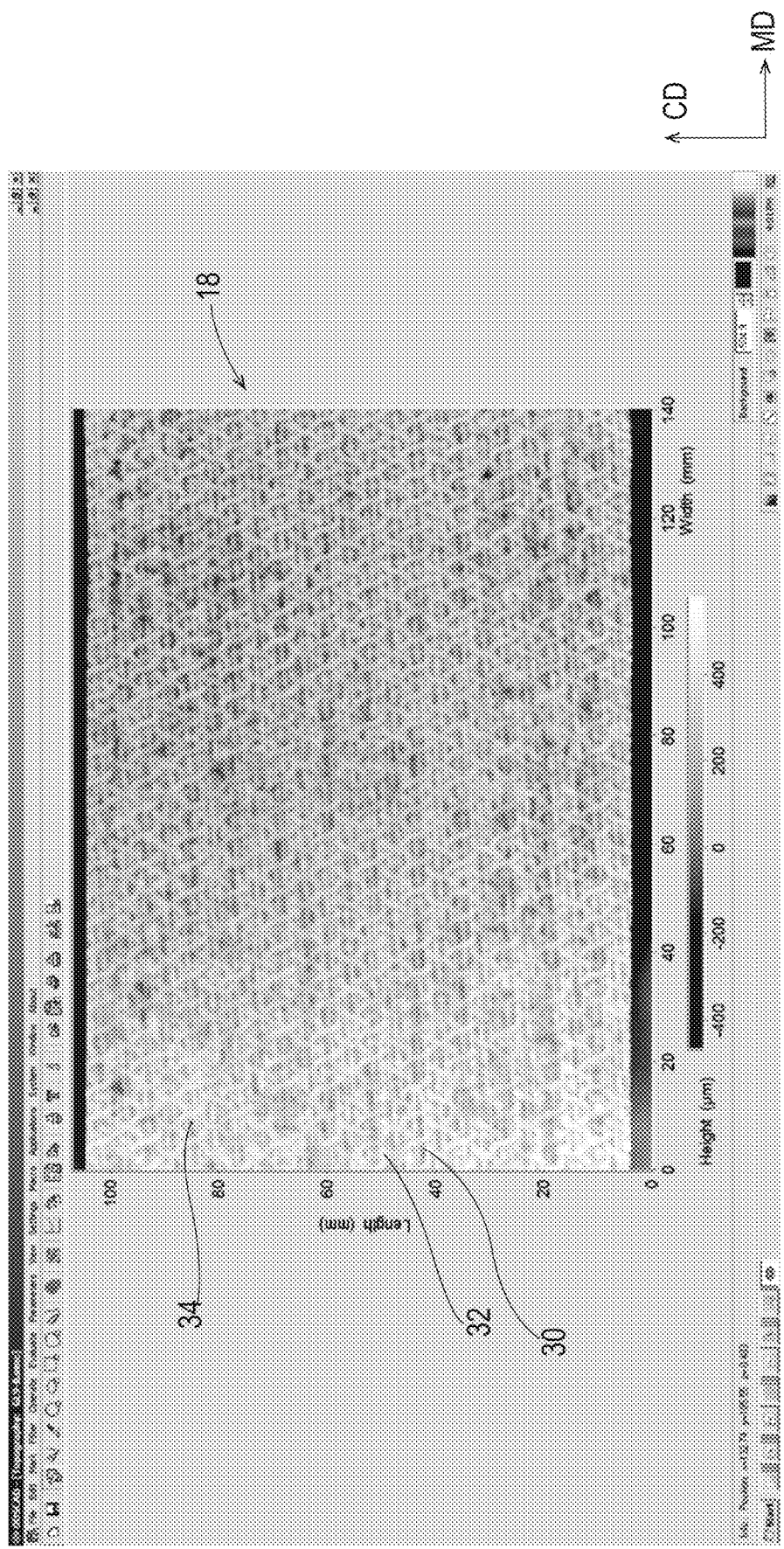
FIG. 7A is a MikroCAD image of a sanitary tissue product made using the molding member of FIG. 6A.
Figure 7B:
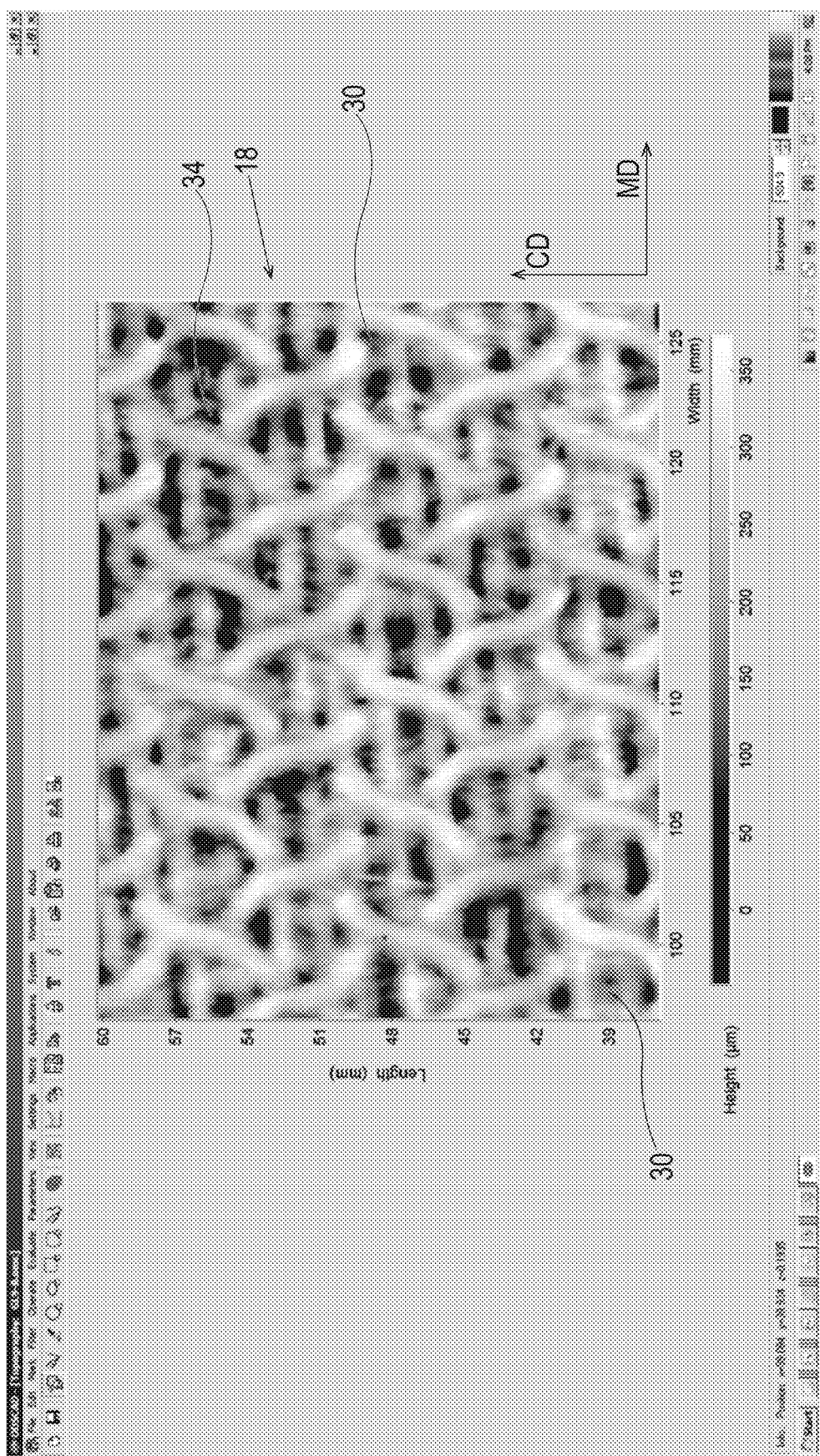
FIG. 7B is a magnified portion of the MikroCAD image of FIG. 7A.

As shown in FIGS. 6A-6C, a non-limiting example of another patterned molding member suitable for use in the present invention comprises a through-air-drying belt 10. The through-air-drying belt 10 comprises a plurality of semi-continuous knuckles 24 formed by semi-continuous line segments of resin 26 arranged in a non-random, repeating pattern, for example a substantially machine direction repeating pattern of semi-continuous lines supported on a support fabric comprising filaments 27. In this case, unlike in FIGS. 4A-4C, the semi-continuous lines are substantially straight, they are not curvilinear. The semi-continuous knuckles 24 are spaced from adjacent semi-continuous knuckles 24 by semi-continuous pillows 28, which constitute deflection conduits into which portions of a fibrous structure ply being made on the through-air-drying belt 10 of FIGS. 6A-6C deflect. In addition to the semi-continuous line segments of resin 26, the through-air-drying belt 10 further comprises a plurality of discrete knuckles 12 formed by discrete line segments 14 which overlay one or more of the semi-continuous knuckles 24. The arrangement of the discrete knuckles 12 creates discrete pillows 34. In one case, this through-air-drying belt 10 is referred to as a dual cast through-air-drying belt, which means that the semi-continuous knuckles 24 are formed first and then the discrete knuckles 12 are formed such that they overlay one or more of the semi-continuous knuckles 24 and a multi-elevational belt and pattern on the resulting sanitary tissue product are formed. As shown in FIGS. 7A and 7B, a resulting sanitary tissue product 18 being made on the through-air-drying belt 10 of FIGS. 6A-6C comprises semi-continuous pillow regions 30 at a first elevation (the lowest elevation) imparted by the semi-continuous pillows 28 of the through-air-drying belt 10 of FIGS. 6A-6C. The sanitary tissue product 18 further comprises semi-continuous knuckle regions 32 imparted by the semi-continuous knuckles 24 of the through-air-drying belt 10 of FIGS. 6A-6C. In addition, the sanitary tissue product 18 further comprises discrete pillow regions 34 The semi-continuous pillow regions 30 and semi-continuous knuckle regions 32 may exhibit different densities, for example, one or more of the semi-continuous knuckle regions 32 may exhibit a density that is greater than the density of one or more of the semi-continuous pillow regions 30.

Non-Limiting Examples of Making Sanitary Tissue Products

The sanitary tissue products of the present invention may be made by any suitable papermaking process so long as a molding member of the present invention is used to making the sanitary tissue product or at least one fibrous structure ply of the sanitary tissue product and that the sanitary tissue product exhibits a compressibility and plate stiffness values of the present invention. The method may be a sanitary tissue product making process that uses a cylindrical dryer such as a Yankee (a Yankee-process) or it may be a Yankeeless process as is used to make substantially uniform density and/or uncreped fibrous structures and/or sanitary tissue products. Alternatively, the fibrous structures and/or sanitary tissue products may be made by an air-laid process and/or meltblown and/or spunbond processes and any combinations thereof so long as the fibrous structures and/or sanitary tissue products of the present invention are made thereby.

Figure 8:
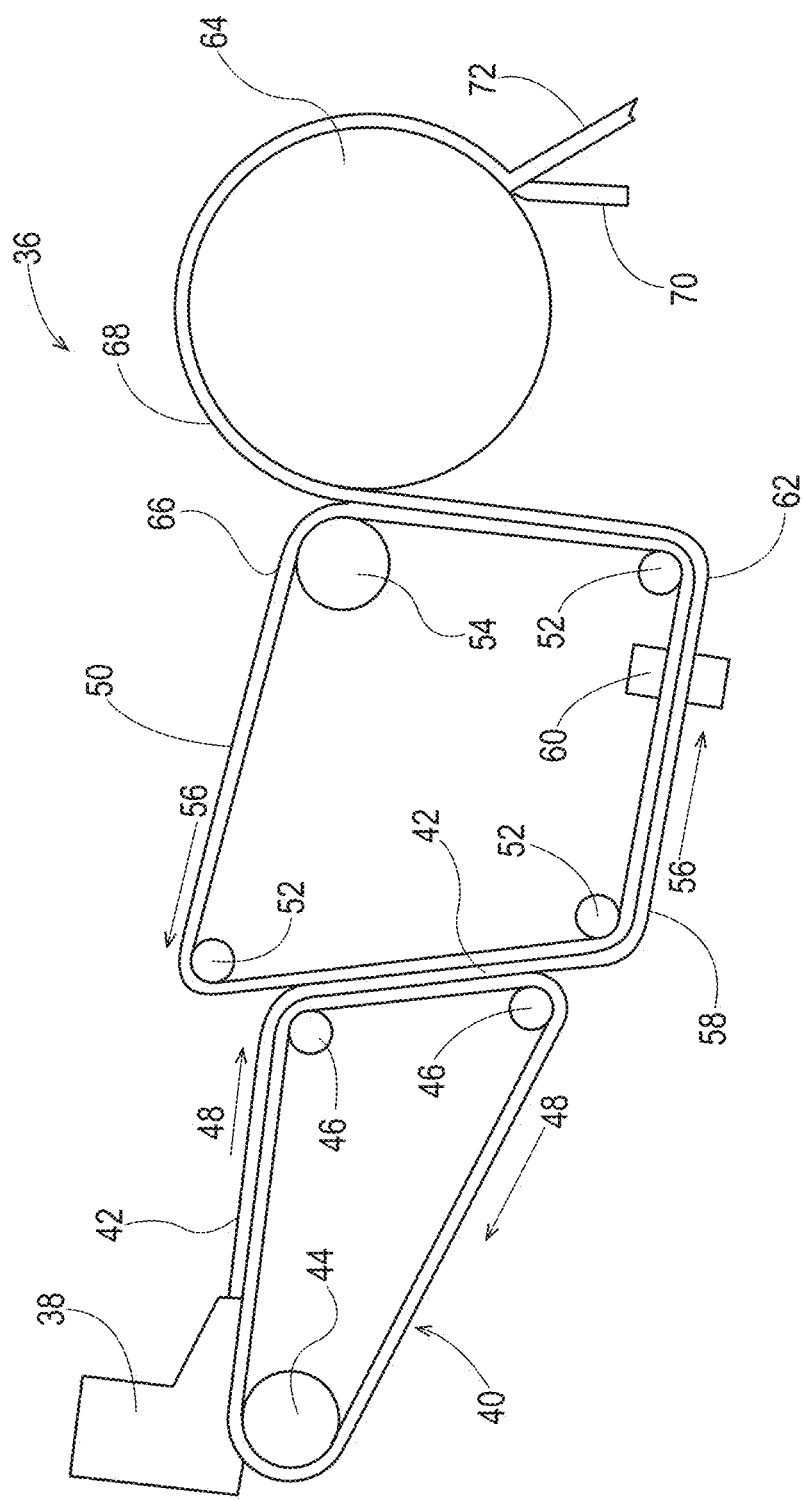
FIG. 8 is a schematic representation of an example of a through-air-drying papermaking process for making a sanitary tissue product according to the present invention.

As shown in FIG. 8, one example of a process and equipment, represented as 36 for making a sanitary tissue product according to the present invention comprises supplying an aqueous dispersion of fibers (a fibrous furnish or fiber slurry) to a headbox 38 which can be of any convenient design. From headbox 38 the aqueous dispersion of fibers is delivered to a first foraminous member 40 which is typically a Fourdrinier wire, to produce an embryonic fibrous structure 42.

The first foraminous member 40 may be supported by a breast roll 44 and a plurality of return rolls 46 of which only two are shown. The first foraminous member 40 can be propelled in the direction indicated by directional arrow 48 by a drive means, not shown. Optional auxiliary units and/or devices commonly associated fibrous structure making machines and with the first foraminous member 40, but not shown, include forming boards, hydrofoils, vacuum boxes, tension rolls, support rolls, wire cleaning showers, and the like.

After the aqueous dispersion of fibers is deposited onto the first foraminous member 40, embryonic fibrous structure 42 is formed, typically by the removal of a portion of the aqueous dispersing medium by techniques well known to those skilled in the art. Vacuum boxes, forming boards, hydrofoils, and the like are useful in effecting water removal. The embryonic fibrous structure 42 may travel with the first foraminous member 40 about return roll 46 and is brought into contact with a patterned molding member 50, such as a 3D patterned through-air-drying belt. While in contact with the patterned molding member 50, the embryonic fibrous structure 42 will be deflected, rearranged, and/or further dewatered.

The patterned molding member 50 may be in the form of an endless belt. In this simplified representation, the patterned molding member 50 passes around and about patterned molding member return rolls 52 and impression nip roll 54 and may travel in the direction indicated by directional arrow 56. Associated with patterned molding member 50, but not shown, may be various support rolls, other return rolls, cleaning means, drive means, and the like well known to those skilled in the art that may be commonly used in fibrous structure making machines.

After the embryonic fibrous structure 42 has been associated with the patterned molding member 50, fibers within the embryonic fibrous structure 42 are deflected into pillows and/or pillow network ("deflection conduits") present in the patterned molding member 50. In one example of this process step, there is essentially no water removal from the embryonic fibrous structure 42 through the deflection conduits after the embryonic fibrous structure 42 has been associated with the patterned molding member 50 but prior to the deflecting of the fibers into the deflection conduits. Further water removal from the embryonic fibrous structure 42 can occur during and/or after the time the fibers are being deflected into the deflection conduits. Water removal from the embryonic fibrous structure 42 may continue until the consistency of the embryonic fibrous structure 42 associated with patterned molding member 50 is increased to from about 25% to about 35%. Once this consistency of the embryonic fibrous structure 42 is achieved, then the embryonic fibrous structure 42 can be referred to as an intermediate fibrous structure 58. During the process of forming the embryonic fibrous structure 42, sufficient water may be removed, such as by a noncompressive process, from the embryonic fibrous structure 42 before it becomes associated with the patterned molding member 50 so that the consistency of the embryonic fibrous structure 42 may be from about 10% to about 30%.

While applicants decline to be bound by any particular theory of operation, it appears that the deflection of the fibers in the embryonic fibrous structure and water removal from the embryonic fibrous structure begin essentially simultaneously. Embodiments can, however, be envisioned wherein deflection and water removal are sequential operations. Under the influence of the applied differential fluid pressure, for example, the fibers may be deflected into the deflection conduit with an attendant rearrangement of the fibers. Water removal may occur with a continued rearrangement of fibers. Deflection of the fibers, and of the embryonic fibrous structure, may cause an apparent increase in surface area of the embryonic fibrous structure. Further, the rearrangement of fibers may appear to cause a rearrangement in the spaces or capillaries existing between and/or among fibers.

It is believed that the rearrangement of the fibers can take one of two modes dependent on a number of factors such as, for example, fiber length. The free ends of longer fibers can be merely bent in the space defined by the deflection conduit while the opposite ends are restrained in the region of the ridges. Shorter fibers, on the other hand, can actually be transported from the region of the ridges into the deflection conduit (The fibers in the deflection conduits will also be rearranged relative to one another). Naturally, it is possible for both modes of rearrangement to occur simultaneously.

As noted, water removal occurs both during and after deflection; this water removal may result in a decrease in fiber mobility in the embryonic fibrous structure. This decrease in fiber mobility may tend to fix and/or freeze the fibers in place after they have been deflected and rearranged. Of course, the drying of the fibrous structure in a later step in the process of this invention serves to more firmly fix and/or freeze the fibers in position.

Any convenient means conventionally known in the papermaking art can be used to dry the intermediate fibrous structure 58. Examples of such suitable drying process include subjecting the intermediate fibrous structure 58 to conventional and/or flow-through dryers and/or Yankee dryers.

In one example of a drying process, the intermediate fibrous structure 58 in association with the patterned molding member 50 passes around the patterned molding member return roll 52 and travels in the direction indicated by directional arrow 56. The intermediate fibrous structure 58 may first pass through an optional predryer 60. This predryer 60 can be a conventional flow-through dryer (hot air dryer) well known to those skilled in the art. Optionally, the predryer 60 can be a so-called capillary dewatering apparatus. In such an apparatus, the intermediate fibrous structure 58 passes over a sector of a cylinder having preferential-capillary-size pores through its cylindrical-shaped porous cover. Optionally, the predryer 60 can be a combination capillary dewatering apparatus and flow-through dryer. The quantity of water removed in the predryer 60 may be controlled so that a predried fibrous structure 62 exiting the predryer 60 has a consistency of from about 30% to about 98%. The predried fibrous structure 62, which may still be associated with patterned molding member 50, may pass around another patterned molding member return roll 52 and as it travels to an impression nip roll 54. As the predried fibrous structure 62 passes through the nip formed between impression nip roll 54 and a surface of a Yankee dryer 64, the pattern formed by the top surface 66 of patterned molding member 50 is impressed into the predried fibrous structure 62 to form a 3D patterned fibrous structure 68. The imprinted fibrous structure 68 can then be adhered to the surface of the Yankee dryer 64 where it can be dried to a consistency of at least about 95%.

The 3D patterned fibrous structure 68 can then be foreshortened by creping the 3D patterned fibrous structure 68 with a creping blade 70 to remove the 3D patterned fibrous structure 68 from the surface of the Yankee dryer 64 resulting in the production of a 3D patterned creped fibrous structure 72 in accordance with the present invention. As used herein, foreshortening refers to the reduction in length of a dry (having a consistency of at least about 90% and/or at least about 95%) fibrous structure which occurs when energy is applied to the dry fibrous structure in such a way that the length of the fibrous structure is reduced and the fibers in the fibrous structure are rearranged with an accompanying disruption of fiber-fiber bonds. Foreshortening can be accomplished in any of several well-known ways. One common method of foreshortening is creping. The 3D patterned creped fibrous structure 72 may be subjected to post processing steps such as calendaring, tuft generating operations, and/or embossing and/or converting.

Figure 9:
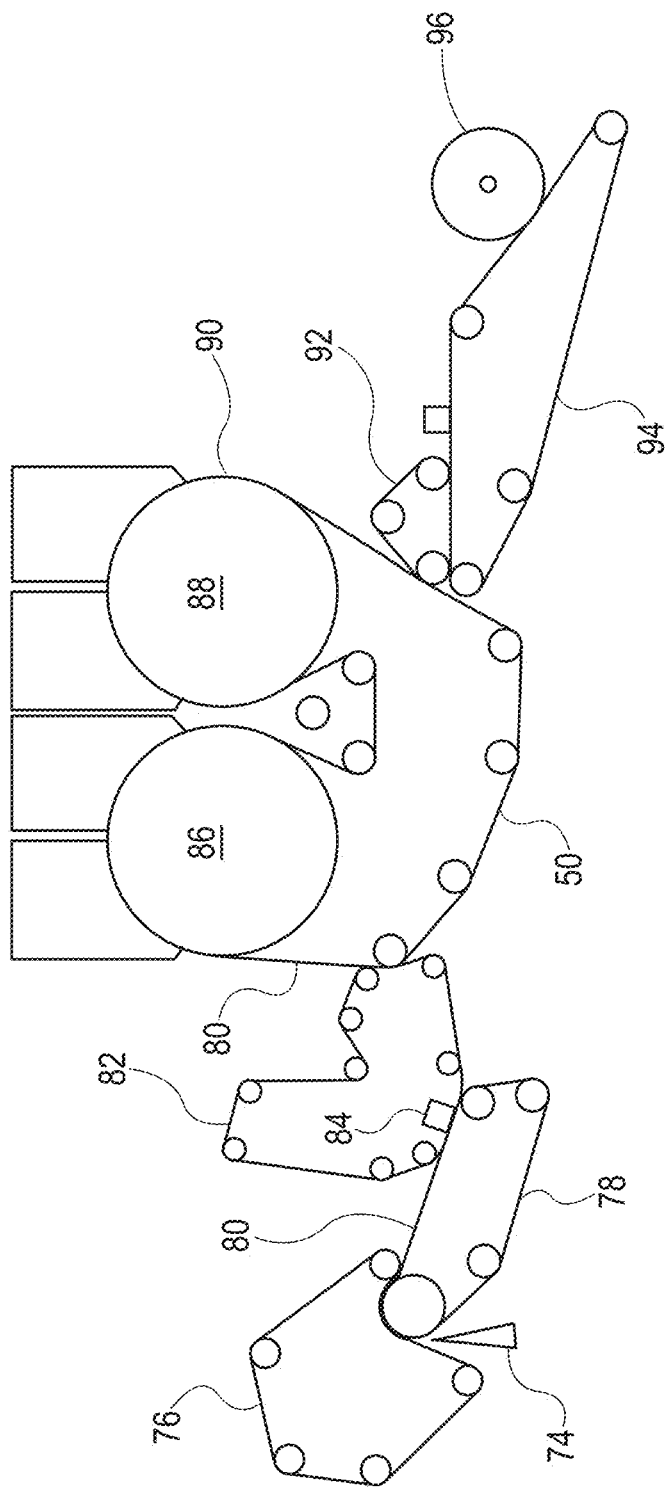
FIG. 9 is a schematic representation of an example of an uncreped through-air-drying papermaking process for making a sanitary tissue product according to the present invention.

Another example of a suitable papermaking process for making the sanitary tissue products of the present invention is illustrated in FIG. 9. FIG. 9 illustrates an uncreped through-air-drying process. In this example, a multi-layered headbox 74 deposits an aqueous suspension of papermaking fibers between forming wires 76 and 78 to form an embryonic fibrous structure 80. The embryonic fibrous structure 80 is transferred to a slower moving transfer fabric 82 with the aid of at least one vacuum box 84. The level of vacuum used for the fibrous structure transfers can be from about 3 to about 15 inches of mercury (76 to about 381 millimeters of mercury). The vacuum box 84 (negative pressure) can be supplemented or replaced by the use of positive pressure from the opposite side of the embryonic fibrous structure 80 to blow the embryonic fibrous structure 80 onto the next fabric in addition to or as a replacement for sucking it onto the next fabric with vacuum. Also, a vacuum roll or rolls can be used to replace the vacuum box(es) 84.

The embryonic fibrous structure 80 is then transferred to a molding member 50 of the present invention, such as a through-air-drying fabric, and passed over through-air-dryers 86 and 88 to dry the embryonic fibrous structure 80 to form a 3D patterned fibrous structure 90. While supported by the molding member 50, the 3D patterned fibrous structure 90 is finally dried to a consistency of about 94% percent or greater. After drying, the 3D patterned fibrous structure 90 is transferred from the molding member 50 to fabric 92 and thereafter briefly sandwiched between fabrics 92 and 94. The dried 3D patterned fibrous structure 90 remains with fabric 94 until it is wound up at the reel 96 ("parent roll") as a finished fibrous structure. Thereafter, the finished 3D patterned fibrous structure 90 can be unwound, calendered and converted into the sanitary tissue product of the present invention, such as a roll of bath tissue, in any suitable manner.

Figure 10:
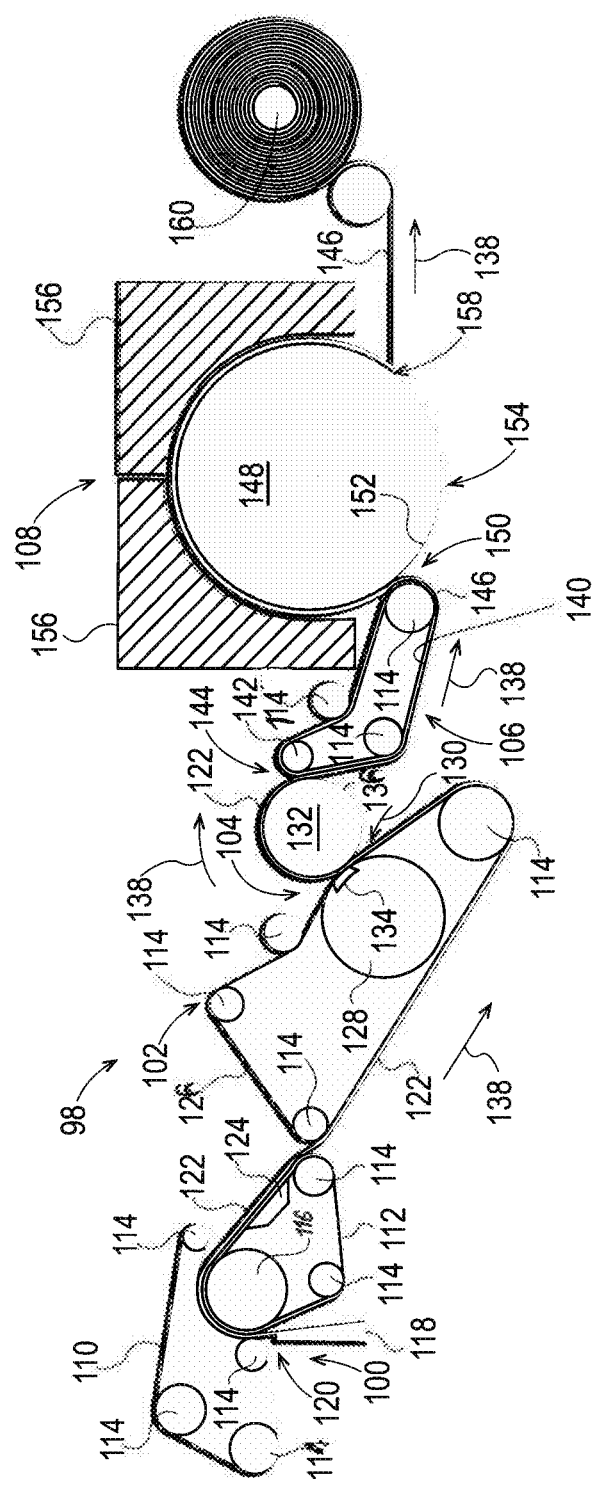
FIG. 10 is a schematic representation of an example of fabric creped papermaking process for making a sanitary tissue product according to the present invention.

Yet another example of a suitable papermaking process for making the sanitary tissue products of the present invention is illustrated in FIG. 10. FIG. 10 illustrates a papermaking machine 98 having a conventional twin wire forming section 100, a felt run section 102, a shoe press section 104, a molding member section 106, in this case a creping fabric section, and a Yankee dryer section 108 suitable for practicing the present invention. Forming section 100 includes a pair of forming fabrics 110 and 112 supported by a plurality of rolls 114 and a forming roll 116. A headbox 118 provides papermaking furnish to a nip 120 between forming roll 116 and roll 114 and the fabrics 110 and 112. The furnish forms an embryonic fibrous structure 122 which is dewatered on the fabrics 110 and 112 with the assistance of vacuum, for example, by way of vacuum box 124.

The embryonic fibrous structure 122 is advanced to a papermaking felt 126 which is supported by a plurality of rolls 114 and the felt 126 is in contact with a shoe press roll 128. The embryonic fibrous structure 122 is of low consistency as it is transferred to the felt 126. Transfer may be assisted by vacuum; such as by a vacuum roll if so desired or a pickup or vacuum shoe as is known in the art. As the embryonic fibrous structure 122 reaches the shoe press roll 128 it may have a consistency of 10-25% as it enters the shoe press nip 130 between shoe press roll 128 and transfer roll 132. Transfer roll 132 may be a heated roll if so desired. Instead of a shoe press roll 128, it could be a conventional suction pressure roll. If a shoe press roll 128 is employed it is desirable that roll 114 immediately prior to the shoe press roll 128 is a vacuum roll effective to remove water from the felt 126 prior to the felt 126 entering the shoe press nip 130 since water from the furnish will be pressed into the felt 126 in the shoe press nip 130. In any case, using a vacuum roll at the roll 114 is typically desirable to ensure the embryonic fibrous structure 122 remains in contact with the felt 126 during the direction change as one of skill in the art will appreciate from the diagram.

The embryonic fibrous structure 122 is wet-pressed on the felt 126 in the shoe press nip 130 with the assistance of pressure shoe 134. The embryonic fibrous structure 122 is thus compactively dewatered at the shoe press nip 130, typically by increasing the consistency by 15 or more points at this stage of the process. The configuration shown at shoe press nip 130 is generally termed a shoe press; in connection with the present invention transfer roll 132 is operative as a transfer cylinder which operates to convey embryonic fibrous structure 122 at high speed, typically 1000 feet/minute (fpm) to 6000 fpm to the patterned molding member section 106 of the present invention, for example a creping fabric section.

Transfer roll 132 has a smooth transfer roll surface 136 which may be provided with adhesive and/or release agents if needed. Embryonic fibrous structure 122 is adhered to transfer roll surface 136 which is rotating at a high angular velocity as the embryonic fibrous structure 122 continues to advance in the machine-direction indicated by arrows 138.

On the transfer roll 132, embryonic fibrous structure 122 has a generally random apparent distribution of fiber.

Embryonic fibrous structure 122 enters shoe press nip 130 typically at consistencies of 10-25% and is dewatered and dried to consistencies of from about 25 to about 70% by the time it is transferred to the molding member 140 according to the present invention, which in this case is a patterned creping fabric, as shown in the diagram.

Molding member 140 is supported on a plurality of rolls 114 and a press nip roll 142 and forms a molding member nip 144, for example fabric crepe nip, with transfer roll 132 as shown.

The molding member 140 defines a creping nip over the distance in which molding member 140 is adapted to contact transfer roll 132; that is, applies significant pressure to the embryonic fibrous structure 122 against the transfer roll 132. To this end, backing (or creping) press nip roll 142 may be provided with a soft deformable surface which will increase the length of the creping nip and increase the fabric creping angle between the molding member 140 and the embryonic fibrous structure 122 and the point of contact or a shoe press roll could be used as press nip roll 142 to increase effective contact with the embryonic fibrous structure 122 in high impact molding member nip 144 where embryonic fibrous structure 122 is transferred to molding member 140 and advanced in the machine-direction 138. By using different equipment at the molding member nip 144, it is possible to adjust the fabric creping angle or the takeaway angle from the molding member nip 144. Thus, it is possible to influence the nature and amount of redistribution of fiber, delamination/debonding which may occur at molding member nip 144 by adjusting these nip parameters. In some embodiments it may by desirable to restructure the z-direction interfiber characteristics while in other cases it may be desired to influence properties only in the plane of the fibrous structure. The molding member nip parameters can influence the distribution of fiber in the fibrous structure in a variety of directions, including inducing changes in the z-direction as well as the MD and CD. In any case, the transfer from the transfer roll to the molding member is high impact in that the fabric is traveling slower than the fibrous structure and a significant velocity change occurs. Typically, the fibrous structure is creped anywhere from 10-60% and even higher during transfer from the transfer roll to the molding member.

Molding member nip 144 generally extends over a molding member nip distance of anywhere from about ⅛" to about 2", typically ½" to 2". For a molding member 140, for example creping fabric, with 32 CD strands per inch, embryonic fibrous structure 122 thus will encounter anywhere from about 4 to 64 weft filaments in the molding member nip 144.

The nip pressure in molding member nip 144, that is, the loading between roll 142 and transfer roll 132 is suitably 20-100 pounds per linear inch (PLI).

After passing through the molding member nip 144, and for example fabric creping the embryonic fibrous structure 122, a 3D patterned fibrous structure 146 continues to advance along MD 138 where it is wet-pressed onto Yankee cylinder (dryer) 148 in transfer nip 150. Transfer at nip 150 occurs at a 3D patterned fibrous structure 146 consistency of generally from about 25 to about 70%. At these consistencies, it is difficult to adhere the 3D patterned fibrous structure 146 to the Yankee cylinder surface 152 firmly enough to remove the 3D patterned fibrous structure 146 from the molding member 140 thoroughly. This aspect of the process is important, particularly when it is desired to use a high velocity drying hood as well as maintain high impact creping conditions.

In this connection, it is noted that conventional TAD processes do not employ high velocity hoods since sufficient adhesion to the Yankee dryer is not achieved.

It has been found in accordance with the present invention that the use of particular adhesives cooperate with a moderately moist fibrous structure (25-70% consistency) to adhere it to the Yankee dryer sufficiently to allow for high velocity operation of the system and high jet velocity impingement air drying. In this connection, a poly(vinyl alcohol)/polyamide adhesive composition as noted above is applied at 154 as needed.

The 3D patterned fibrous structure is dried on Yankee cylinder 148 which is a heated cylinder and by high jet velocity impingement air in Yankee hood 156. As the Yankee cylinder 148 rotates, 3D patterned fibrous structure 146 is creped from the Yankee cylinder 148 by creping doctor blade 158 and wound on a take-up roll 160. Creping of the paper from a Yankee dryer may be carried out using an undulatory creping blade, such as that disclosed in U.S. Pat. No. 5,690,788, the disclosure of which is incorporated by reference. Use of the undulatory crepe blade has been shown to impart several advantages when used in production of tissue products. In general, tissue products creped using an undulatory blade have higher caliper (thickness), increased CD stretch, and a higher void volume than do comparable tissue products produced using conventional crepe blades. All of these changes affected by the use of the undulatory blade tend to correlate with improved softness perception of the tissue products.

When a wet-crepe process is employed, an impingement air dryer, a through-air dryer, or a plurality of can dryers can be used instead of a Yankee. Impingement air dryers are disclosed in the following patents and applications, the disclosure of which is incorporated herein by reference: U.S. Pat. No. 5,865,955 of Ilvespaaet et al. U.S. Pat. No. 5,968,590 of Ahonen et al. U.S. Pat. No. 6,001,421 of Ahonen et al. U.S. Pat. No. 6,119,362 of Sundqvist et al. U.S. patent application Ser. No. 09/733,172, entitled Wet Crepe, Impingement-Air Dry Process for Making Absorbent Sheet, now U.S. Pat. No. 6,432,267. A throughdrying unit as is well known in the art and described in U.S. Pat. No. 3,432,936 to Cole et al., the disclosure of which is incorporated herein by reference as is U.S. Pat. No. 5,851,353 which discloses a can-drying system.

Figure 11:
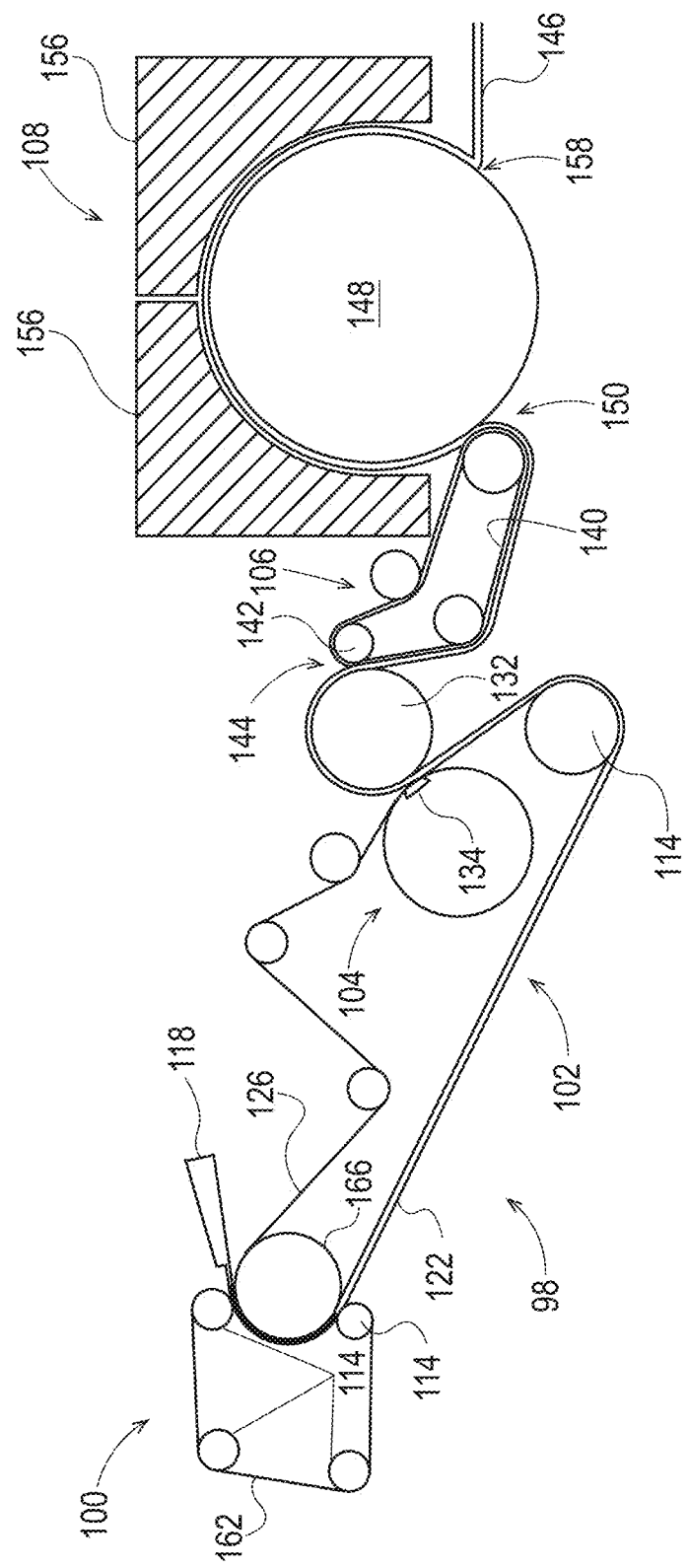
FIG. 11 is a schematic representation of another example of a fabric creped papermaking process for making a sanitary tissue product according to the present invention.

There is shown in FIG. 11 a papermaking machine 98, similar to FIG. 10, for use in connection with the present invention. Papermaking machine 98 is a three fabric loop machine having a forming section 100 generally referred to in the art as a crescent former. Forming section 100 includes a forming wire 162 supported by a plurality of rolls such as rolls 114. The forming section 100 also includes a forming roll 166 which supports paper making felt 126 such that embryonic fibrous structure 122 is formed directly on the felt 126. Felt run 102 extends to a shoe press section 104 wherein the moist embryonic fibrous structure 122 is deposited on a transfer roll 132 (also referred to sometimes as a backing roll) as described above. Thereafter, embryonic fibrous structure 122 is creped onto molding member 140, such as a crepe fabric, in molding member nip 144 before being deposited on Yankee dryer 148 in another press nip 150. The papermaking machine 98 may include a vacuum turning roll, in some embodiments; however, the three loop system may be configured in a variety of ways wherein a turning roll is not necessary. This feature is particularly important in connection with the rebuild of a papermachine inasmuch as the expense of relocating associated equipment i.e. pulping or fiber processing equipment and/or the large and expensive drying equipment such as the Yankee dryer or plurality of can dryers would make a rebuild prohibitively expensive unless the improvements could be configured to be compatible with the existing facility.

Figure 12:
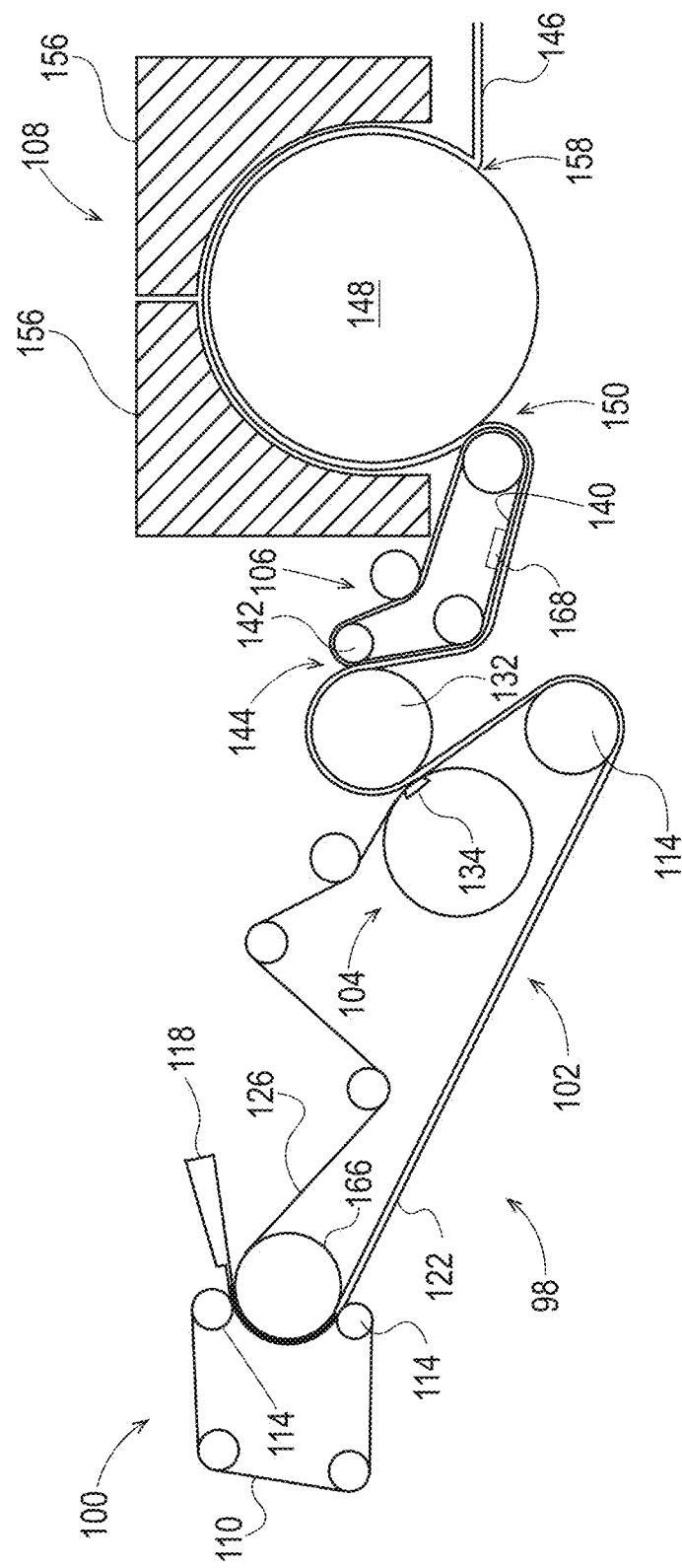
FIG. 12 is a schematic representation of an example of belt creped papermaking process for making a sanitary tissue product according to the present invention.

FIG. 12 shows another example of a suitable papermaking process to make the sanitary tissue products of the present invention. FIG. 12 illustrates a papermaking machine 98 for use in connection with the present invention. Papermaking machine 98 is a three fabric loop machine having a forming section 100, generally referred to in the art as a crescent former. Forming section 100 includes headbox 118 depositing a furnish on forming wire 110 supported by a plurality of rolls 114. The forming section 100 also includes a forming roll 166, which supports papermaking felt 126, such that embryonic fibrous structure 122 is formed directly on felt 126. Felt run 102 extends to a shoe press section 104 wherein the moist embryonic fibrous structure 122 is deposited on a transfer roll 132 and wet-pressed concurrently with the transfer. Thereafter, embryonic fibrous structure 122 is transferred to the molding member section 106, by being transferred to and/or creped onto molding member 140 of the present invention in molding member nip 144, for example belt crepe nip, before being optionally vacuum drawn by suction box 168 and then deposited on Yankee dryer 148 in another press nip 150 using a creping adhesive, as noted above. Transfer to a Yankee dryer from the creping belt differs from conventional transfers in a conventional wet press (CWP) from a felt to a Yankee. In a CWP process, pressures in the transfer nip may be 500 PLI (87.6 kN/meter) or so, and the pressured contact area between the Yankee surface and the fibrous structure is close to or at 100%. The press roll may be a suction roll which may have a P&J hardness of 25-30. On the other hand, a belt crepe process of the present invention typically involves transfer to a Yankee with 4-40% pressured contact area between the fibrous structure and the Yankee surface at a pressure of 250-350 PLI (43.8-61.3 kN/meter). No suction is applied in the transfer nip, and a softer pressure roll is used, P&J hardness 35-45. The papermaking machine may include a suction roll, in some embodiments; however, the three loop system may be configured in a variety of ways wherein a turning roll is not necessary. This feature is particularly important in connection with the rebuild of a papermachine inasmuch as the expense of relocating associated equipment, i.e., the headbox, pulping or fiber processing equipment and/or the large and expensive drying equipment, such as the Yankee dryer or plurality of can dryers, would make a rebuild prohibitively expensive, unless the improvements could be configured to be compatible with the existing facility.

Non-Limiting Examples of Methods for Making Sanitary Tissue Products

Example 1—Through-Air-Drying Belt

The following Example illustrates a non-limiting example for a preparation of a sanitary tissue product comprising a fibrous structure according to the present invention on a pilot-scale Fourdrinier fibrous structure making (papermaking) machine.

An aqueous slurry of *eucalyptus* (Fibria Brazilian bleached hardwood kraft pulp) pulp fibers is prepared at about 3% fiber by weight using a conventional repulper, then transferred to the hardwood fiber stock chest. The *eucalyptus* fiber slurry of the hardwood stock chest is pumped through a stock pipe to a hardwood fan pump where the slurry consistency is reduced from about 3% by fiber weight to about 0.15% by fiber weight. The 0.15% *eucalyptus* slurry is then pumped and equally distributed in the top and bottom chambers of a multi-layered, three-chambered headbox of a Fourdrinier wet-laid papermaking machine.

Additionally, an aqueous slurry of NSK (Northern Softwood Kraft) pulp fibers is prepared at about 3% fiber by weight using a conventional repulper, then transferred to the softwood fiber stock chest. The NSK fiber slurry of the softwood stock chest is pumped through a stock pipe to be refined to a Canadian Standard Freeness (CSF) of about 630. The refined NSK fiber slurry is then directed to the NSK fan pump where the NSK slurry consistency is reduced from about 3% by fiber weight to about 0.15% by fiber weight. The 0.15% *eucalyptus* slurry is then directed and distributed to the center chamber of a multi-layered, three-chambered headbox of a Fourdrinier wet-laid papermaking machine.

The wet-laid papermaking machine has a layered headbox having a top chamber, a center chamber, and a bottom chamber where the chambers feed directly onto the forming wire (Fourdrinier wire). The *eucalyptus* fiber slurry of 0.15% consistency is directed to the top headbox chamber and bottom headbox chamber. The NSK fiber slurry is directed to the center headbox chamber. All three fiber layers are delivered simultaneously in superposed relation onto the Fourdrinier wire to form thereon a three-layer embryonic fibrous structure (web), of which about 38% of the top side is made up of the *eucalyptus* fibers, about 38% is made of the *eucalyptus* fibers on the bottom side and about 24% is made up of the NSK fibers in the center. Dewatering occurs through the Fourdrinier wire and is assisted by a deflector and wire table vacuum boxes. The Fourdrinier wire is an 84M (84 by 76 5A, Albany International). The speed of the Fourdrinier wire is about 750 feet per minute (fpm).

The embryonic wet fibrous structure is transferred from the Fourdrinier wire, at a fiber consistency of about 15% at the point of transfer, to a 3D patterned through-air-drying belt as shown in FIGS. 6A-6C. The speed of the 3D patterned through-air-drying belt is the same as the speed of the Fourdrinier wire. The 3D patterned through-air-drying belt is designed to yield a fibrous structure as shown in FIGS. 7A and 7B comprising a pattern of high density knuckle regions dispersed throughout a multi-elevational continuous pillow region. The multi-elevational continuous pillow region comprises an intermediate density pillow region (density between the high density knuckles and the low density other pillow region) and a low density pillow region formed by the deflection conduits created by the semi-continuous knuckle layer substantially oriented in the machine direction. This 3D patterned through-air-drying belt is formed by casting a first layer of an impervious resin surface of semi-continuous knuckles onto a fiber mesh supporting fabric similar to that shown in FIGS. 4B and 4C and then casting a second layer of impervious resin surface of discrete knuckles. The supporting fabric is a 98×52 filament, dual layer fine mesh. The thickness of the first layer resin cast is about 6 mils above the supporting fabric and the thickness of the second layer resin cast is about 13 mils above the supporting fabric.

Further de-watering of the fibrous structure is accomplished by vacuum assisted drainage until the fibrous structure has a fiber consistency of about 20% to 30%.

While remaining in contact with the 3D patterned through-air-drying belt, the fibrous structure is pre-dried by air blow-through pre-dryers to a fiber consistency of about 53% by weight.

After the pre-dryers, the semi-dry fibrous structure is transferred to a Yankee dryer and adhered to the surface of the Yankee dryer with a sprayed creping adhesive. The creping adhesive is an aqueous dispersion with the actives consisting of about 80% polyvinyl alcohol (PVA 88-50), about 20% CREPETROL® 457T20. CREPETROL® 457T20 is commercially available from Hercules Incorporated of Wilmington, Del. The creping adhesive is delivered to the Yankee surface at a rate of about 0.15% adhesive solids based on the dry weight of the fibrous structure. The fiber consistency is increased to about 97% before the fibrous structure is dry-creped from the Yankee with a doctor blade.

The doctor blade has a bevel angle of about 25° and is positioned with respect to the Yankee dryer to provide an impact angle of about 81°. The Yankee dryer is operated at a temperature of about 275° F. and a speed of about 800 fpm. The fibrous structure is wound in a roll (parent roll) using a surface driven reel drum having a surface speed of about 757 fpm.

Two parent rolls of the fibrous structure are then converted into a sanitary tissue product by loading the roll of fibrous structure into an unwind stand. The line speed is 400 ft/min. One parent roll of the fibrous structure is unwound and transported to an emboss stand where the fibrous structure is strained to form the emboss pattern in the fibrous structure and then combined with the fibrous structure from the other parent roll to make a multi-ply (2-ply) sanitary tissue product. The multi-ply sanitary tissue product is then transported over a slot extruder through which a surface chemistry may be applied. The multi-ply sanitary tissue product is then transported to a winder where it is wound onto a core to form a log. The log of multi-ply sanitary tissue product is then transported to a log saw where the log is cut into finished multi-ply sanitary tissue product rolls. The multi-ply sanitary tissue product of this example exhibits the properties shown in Table 1 above.

Example 2—Through-Air-Drying Belt

The following Example illustrates a non-limiting example for a preparation of a sanitary tissue product comprising a fibrous structure according to the present invention on a pilot-scale Fourdrinier fibrous structure making (papermaking) machine.

An aqueous slurry of *eucalyptus* (Fibria Brazilian bleached hardwood kraft pulp) pulp fibers is prepared at about 3% fiber by weight using a conventional repulper, then transferred to the hardwood fiber stock chest. The *eucalyptus* fiber slurry of the hardwood stock chest is pumped through a stock pipe to a hardwood fan pump where the slurry consistency is reduced from about 3% by fiber weight to about 0.15% by fiber weight. The 0.15% *eucalyptus* slurry is then pumped and equally distributed in the top and bottom chambers of a multi-layered, three-chambered headbox of a Fourdrinier wet-laid papermaking machine.

Additionally, an aqueous slurry of NSK (Northern Softwood Kraft) pulp fibers is prepared at about 3% fiber by weight using a conventional repulper, then transferred to the softwood fiber stock chest. The NSK fiber slurry of the softwood stock chest is pumped through a stock pipe to be refined to a Canadian Standard Freeness (CSF) of about 630. The refined NSK fiber slurry is then directed to the NSK fan pump where the NSK slurry consistency is reduced from about 3% by fiber weight to about 0.15% by fiber weight. The 0.15% *eucalyptus* slurry is then directed and distributed to the center chamber of a multi-layered, three-chambered headbox of a Fourdrinier wet-laid papermaking machine.

The wet-laid papermaking machine has a layered headbox having a top chamber, a center chamber, and a bottom chamber where the chambers feed directly onto the forming wire (Fourdrinier wire). The *eucalyptus* fiber slurry of 0.15% consistency is directed to the top headbox chamber and bottom headbox chamber. The NSK fiber slurry is directed to the center headbox chamber. All three fiber layers are delivered simultaneously in superposed relation onto the Fourdrinier wire to form thereon a three-layer embryonic fibrous structure (web), of which about 38% of the top side is made up of the *eucalyptus* fibers, about 38% is made of the *eucalyptus* fibers on the bottom side and about 24% is made up of the NSK fibers in the center. Dewatering occurs through the Fourdrinier wire and is assisted by a deflector and wire table vacuum boxes. The Fourdrinier wire is an 84M (84 by 76 5A, Albany International). The speed of the Fourdrinier wire is about 750 feet per minute (fpm).

The embryonic wet fibrous structure is transferred from the Fourdrinier wire, at a fiber consistency of about 15% at the point of transfer, to a 3D patterned through-air-drying belt as shown in FIGS. 4A-4C. The speed of the 3D patterned through-air-drying belt is the same as the speed of the Fourdrinier wire. The 3D patterned through-air-drying belt is designed to yield a fibrous structure as shown in FIGS. 5A-5D comprising a pattern of semi-continuous low density pillow regions and semi-continuous high density knuckle regions. This 3D patterned through-air-drying belt is formed by casting an impervious resin surface onto a fiber mesh supporting fabric as shown in FIGS. 4B and 4C. The supporting fabric is a 98×52 filament, dual layer fine mesh. The thickness of the resin cast is about 11 mils above the supporting fabric.

Further de-watering of the fibrous structure is accomplished by vacuum assisted drainage until the fibrous structure has a fiber consistency of about 20% to 30%.

While remaining in contact with the 3D patterned through-air-drying belt, the fibrous structure is pre-dried by air blow-through pre-dryers to a fiber consistency of about 53% by weight.

After the pre-dryers, the semi-dry fibrous structure is transferred to a Yankee dryer and adhered to the surface of the Yankee dryer with a sprayed creping adhesive. The creping adhesive is an aqueous dispersion with the actives consisting of about 80% polyvinyl alcohol (PVA 88-50), about 20% CREPETROL® 457T20. CREPETROL® 457T20 is commercially available from Hercules Incorporated of Wilmington, Del. The creping adhesive is delivered to the Yankee surface at a rate of about 0.15% adhesive solids based on the dry weight of the fibrous structure. The fiber consistency is increased to about 97% before the fibrous structure is dry-creped from the Yankee with a doctor blade.

The doctor blade has a bevel angle of about 25° and is positioned with respect to the Yankee dryer to provide an impact angle of about 81°. The Yankee dryer is operated at a temperature of about 275° F. and a speed of about 800 fpm. The fibrous structure is wound in a roll (parent roll) using a surface driven reel drum having a surface speed of about 757 fpm.

Two parent rolls of the fibrous structure are then converted into a sanitary tissue product by loading the roll of fibrous structure into an unwind stand. The line speed is 400 ft/min. One parent roll of the fibrous structure is unwound and transported to an emboss stand where the fibrous structure is strained to form the emboss pattern in the fibrous structure and then combined with the fibrous structure from the other parent roll to make a multi-ply (2-ply) sanitary tissue product. The multi-ply sanitary tissue product is then transported over a slot extruder through which a surface chemistry may be applied. The multi-ply sanitary tissue product is then transported to a winder where it is wound onto a core to form a log. The log of multi-ply sanitary tissue product is then transported to a log saw where the log is cut into finished multi-ply sanitary tissue product rolls. The multi-ply sanitary tissue product of this example exhibits the properties shown in Table 1 above.

Example 3—Through-Air-Drying Belt

The following Example illustrates a non-limiting example for a preparation of a sanitary tissue product comprising a fibrous structure according to the present invention on a pilot-scale Fourdrinier fibrous structure making (papermaking) machine.

An aqueous slurry of *eucalyptus* (Fibria Brazilian bleached hardwood kraft pulp) pulp fibers is prepared at about 3% fiber by weight using a conventional repulper, then transferred to the hardwood fiber stock chest. The *eucalyptus* fiber slurry of the hardwood stock chest is pumped through a stock pipe to a hardwood fan pump where the slurry consistency is reduced from about 3% by fiber weight to about 0.15% by fiber weight. The 0.15% *eucalyptus* slurry is then pumped and equally distributed in the top and bottom chambers of a multi-layered, three-chambered headbox of a Fourdrinier wet-laid papermaking machine.

Additionally, an aqueous slurry of NSK (Northern Softwood Kraft) pulp fibers is prepared at about 3% fiber by weight using a conventional repulper, then transferred to the softwood fiber stock chest. The NSK fiber slurry of the softwood stock chest is pumped through a stock pipe to be refined to a Canadian Standard Freeness (CSF) of about 630. The refined NSK fiber slurry is then directed to the NSK fan pump where the NSK slurry consistency is reduced from about 3% by fiber weight to about 0.15% by fiber weight. The 0.15% *eucalyptus* slurry is then directed and distributed to the center chamber of a multi-layered, three-chambered headbox of a Fourdrinier wet-laid papermaking machine.

The wet-laid papermaking machine has a layered headbox having a top chamber, a center chamber, and a bottom chamber where the chambers feed directly onto the forming wire (Fourdrinier wire). The *eucalyptus* fiber slurry of 0.15% consistency is directed to the top headbox chamber and bottom headbox chamber. The NSK fiber slurry is directed to the center headbox chamber. All three fiber layers are delivered simultaneously in superposed relation onto the Fourdrinier wire to form thereon a three-layer embryonic fibrous structure (web), of which about 38% of the top side is made up of the *eucalyptus* fibers, about 38% is made of the *eucalyptus* fibers on the bottom side and about 24% is made up of the NSK fibers in the center. Dewatering occurs through the Fourdrinier wire and is assisted by a deflector and wire table vacuum boxes. The Fourdrinier wire is an 84M (84 by 76 5A, Albany International). The speed of the Fourdrinier wire is about 750 feet per minute (fpm).

The embryonic wet fibrous structure is transferred from the Fourdrinier wire, at a fiber consistency of about 15% at the point of transfer, to a 3D patterned through-air-drying belt as shown in FIGS. 2A and 2B. The speed of the 3D patterned through-air-drying belt is the same as the speed of the Fourdrinier wire. The 3D patterned through-air-drying belt is designed to yield a fibrous structure as shown in FIG. 3 comprising a pattern of discrete high density knuckle regions dispersed throughout a continuous low density pillow region. This 3D patterned through-air-drying belt is formed by casting an impervious resin surface onto a fiber mesh supporting fabric similar to that shown in FIGS. 4B and 4C. The supporting fabric is a 98×52 filament, dual layer fine mesh. The thickness of the resin cast is about 11 mils above the supporting fabric.

Further de-watering of the fibrous structure is accomplished by vacuum assisted drainage until the fibrous structure has a fiber consistency of about 20% to 30%.

While remaining in contact with the 3D patterned through-air-drying belt, the fibrous structure is pre-dried by air blow-through pre-dryers to a fiber consistency of about 53% by weight.

After the pre-dryers, the semi-dry fibrous structure is transferred to a Yankee dryer and adhered to the surface of the Yankee dryer with a sprayed creping adhesive. The creping adhesive is an aqueous dispersion with the actives consisting of about 80% polyvinyl alcohol (PVA 88-50), about 20% CREPETROL® 457T20. CREPETROL® 457T20 is commercially available from Hercules Incorporated of Wilmington, Del. The creping adhesive is delivered to the Yankee surface at a rate of about 0.15% adhesive solids based on the dry weight of the fibrous structure. The fiber consistency is increased to about 97% before the fibrous structure is dry-creped from the Yankee with a doctor blade.

The doctor blade has a bevel angle of about 25° and is positioned with respect to the Yankee dryer to provide an impact angle of about 81°. The Yankee dryer is operated at a temperature of about 275° F. and a speed of about 800 fpm. The fibrous structure is wound in a roll (parent roll) using a surface driven reel drum having a surface speed of about 757 fpm.

Two parent rolls of the fibrous structure are then converted into a sanitary tissue product by loading the roll of fibrous structure into an unwind stand. The line speed is 400 ft/min. One parent roll of the fibrous structure is unwound and transported to an emboss stand where the fibrous structure is strained to form the emboss pattern in the fibrous structure and then combined with the fibrous structure from the other parent roll to make a multi-ply (2-ply) sanitary tissue product. The multi-ply sanitary tissue product is then transported over a slot extruder through which a surface chemistry may be applied. The multi-ply sanitary tissue product is then transported to a winder where it is wound onto a core to form a log. The log of multi-ply sanitary tissue product is then transported to a log saw where the log is cut into finished multi-ply sanitary tissue product rolls. The multi-ply sanitary tissue product of this example exhibits the properties shown in Table 1 above.

Example 4—Through-Air-Drying Belt

This following example illustrates a non-limiting example for the preparation of a fibrous structure according to the present invention on a pilot-scale Fourdrinier paper making machine with the addition of trichome fibers providing a strength increase.

The following Example illustrates a non-limiting example for the preparation of sanitary tissue product comprising a fibrous structure according to the present invention on a pilot-scale Fourdrinier fibrous structure making machine.

Individualized trichome fibers are first prepared from *Stachys byzantina* bloom stalks consisting of the dried stems, leaves, and pre-flowering buds, by passing dried *Stachys byzantina* plant matter through a knife cutter (Wiley mill, manufactured by the C. W. Brabender Co. located in, NJ) equipped with an attrition screen having ¼" holes. Exiting the Wiley mill is a composite fluff constituting the individualized trichome fibers together with chunks of leaf and stem material. The individualized trichome fluff is then passed through an air classifier (Hosokawa Alpine 50ATP); the "accepts" or "fine" fraction from the classifier is greatly enriched in individualized trichome fibers while the "rejects" or "coarse" fraction is primarily chunks of stalks, and leaf elements with only a minor fraction of individualized trichome fibers. A squirrel cage speed of 9000 rpm, an air pressure resistance of 10-15 mbar, and a feed rate of about 10 g/min are used on the 50 ATP. The resulting individualized trichome material (fines) is mixed with a 10% aqueous dispersion of "Texcare 4060" to add about 10% by weight "Texcare 4060" by weight of the bone dry weight of the individualized trichomes followed by slurrying the "Texcare"-treated trichome in water at 3% consistency using a conventional repulper. This slurry is passed through a stock pipe toward another stock pipe containing a *eucalyptus* fiber slurry.

Special care must be taken while processing the trichomes. 60 lbs. of trichome fiber is pulped in a 50 gallon pulper by adding water in half amount required to make a 1% trichome fiber slurry. This is done to prevent trichome fibers over flowing and floating on surface of the water due to lower density and hydrophobic nature of the trichome fiber. After mixing and stirring a few minutes, the pulper is stopped and the remaining trichome fibers are pushed in while water is added. After pH adjustment, it is pulped for 20 minutes, then dumped in a separate chest for delivery onto the machine headbox. This allows one to place trichome fibers in one or more layers, alone or mixed with other fibers, such as hardwood fibers and/or softwood fibers.

The aqueous slurry of *eucalyptus* fibers is prepared at about 3% by weight using a conventional repulper. This slurry is also passed through a stock pipe toward the stock pipe containing the trichome fiber slurry.

The 1% trichome fiber slurry is combined with the 3% *eucalyptus* fiber slurry in a proportion which yields about 13.3% trichome fibers and 86.7% *eucalyptus* fibers. The stockpipe containing the combined trichome and *eucalyptus* fiber slurries is directed toward the wire layer of headbox of a Fourdrinier machine.

Separately, an aqueous slurry of NSK fibers of about 3% by weight is made up using a conventional repulper.

In order to impart temporary wet strength to the finished fibrous structure, a 1% dispersion of temporary wet strengthening additive (e.g., Parez® commercially available from Kemira) is prepared and is added to the NSK fiber stock pipe at a rate sufficient to deliver 0.3% temporary wet strengthening additive based on the dry weight of the NSK fibers. The absorption of the temporary wet strengthening additive is enhanced by passing the treated slurry through an in-line mixer.

The trichome fiber and *eucalyptus* fiber slurry is diluted with white water at the inlet of a fan pump to a consistency of about 0.15% based on the total weight of the *eucalyptus* and trichome fiber slurry. The NSK fibers, likewise, are diluted with white water at the inlet of a fan pump to a consistency of about 0.15% based on the total weight of the NSK fiber slurry. The *eucalyptus*/trichome fiber slurry and the NSK fiber slurry are both directed to a layered headbox capable of maintaining the slurries as separate streams until they are deposited onto a forming fabric on the Fourdrinier.

The fibrous structure making machine has a layered headbox having a top chamber, a center chamber, and a bottom chamber. The *eucalyptus*/trichome combined fiber slurry is pumped through the top headbox chamber, *eucalyptus* fiber slurry is pumped through the bottom headbox chamber, and, simultaneously, the NSK fiber slurry is pumped through the center headbox chamber and delivered in superposed relation onto the Fourdrinier wire to form thereon a three-layer embryonic fibrous structure, of which about 83% is made up of the *eucalyptus*/trichome fibers and 17% is made up of the NSK fibers. Dewatering occurs through the Fourdrinier wire and is assisted by a deflector and vacuum boxes. The Fourdrinier wire is of a 5-shed, satin weave configuration having 87 machine-direction and 76 cross-machine-direction monofilaments per inch, respectively. The speed of the Fourdrinier wire is about 750 fpm (feet per minute).

The embryonic wet fibrous structure is transferred from the Fourdrinier wire, at a fiber consistency of about 15% at the point of transfer, to a 3D patterned through-air-drying belt comprising semi-continuous knuckles and semi-continuous pillows, similar to the first layer of the through-air-drying belt shown in FIGS. 6A-6C. The speed of the 3D patterned through-air-drying belt is the same as the speed of the Fourdrinier wire. The 3D patterned through-air-drying belt is designed to yield a fibrous structure comprising a pattern of semi-continuous high density knuckle regions dispersed throughout a continuous low density pillow region. This 3D patterned through-air-drying belt is formed by casting an impervious resin surface onto a fiber mesh supporting fabric similar to that shown in FIGS. 4B and 4C. The supporting fabric is a 98×52 filament, dual layer fine mesh. The thickness of the resin cast is about 11 mils above the supporting fabric.

Further de-watering of the fibrous structure is accomplished by vacuum assisted drainage until the fibrous structure has a fiber consistency of about 20% to 30%.

While remaining in contact with the 3D patterned through-air-drying belt, the fibrous structure is pre-dried by air blow-through pre-dryers to a fiber consistency of about 65% by weight.

After the pre-dryers, the semi-dry fibrous structure is transferred to the Yankee dryer and adhered to the surface of the Yankee dryer with a sprayed creping adhesive. The creping adhesive is an aqueous dispersion with the actives consisting of about 22% polyvinyl alcohol, about 11% CREPETROL® A3025, and about 67% CREPETROL® R6390. CREPETROL® A3025 and CREPETROL® R6390 are commercially available from Hercules Incorporated of Wilmington, Del. The creping adhesive is delivered to the Yankee surface at a rate of about 0.15% adhesive solids based on the dry weight of the fibrous structure. The fiber consistency is increased to about 97% before the fibrous structure is dry creped from the Yankee with a doctor blade.

The doctor blade has a bevel angle of about 25° and is positioned with respect to the Yankee dryer to provide an impact angle of about 81 degrees. The Yankee dryer is operated at a temperature of about 350° F. (177° C.) and a speed of about 800 fpm. The fibrous structure is wound in a roll using a surface driven reel drum having a surface speed of about 656 feet per minute.

Two parent rolls of the fibrous structure are then converted into a sanitary tissue product by loading the roll of fibrous structure into an unwind stand. The line speed is 400 ft/min. One parent roll of the fibrous structure is unwound and transported to an emboss stand where the fibrous structure is strained to form the emboss pattern in the fibrous structure and then combined with the fibrous structure from the other parent roll to make a multi-ply (2-ply) sanitary tissue product. The multi-ply sanitary tissue product is then transported over a slot extruder through which a surface chemistry may be applied. The multi-ply sanitary tissue product is then transported to a winder where it is wound onto a core to form a log. The log of multi-ply sanitary tissue product is then transported to a log saw where the log is cut into finished multi-ply sanitary tissue product rolls. The multi-ply sanitary tissue product of this example exhibits the properties shown in Table 1, above.

Example 5—Through-Air-Drying Belt

The following Example illustrates a non-limiting example for a preparation of a sanitary tissue product comprising a fibrous structure according to the present invention on a pilot-scale Fourdrinier fibrous structure making (papermaking) machine.

An aqueous slurry of *eucalyptus* (Fibria Brazilian bleached hardwood kraft pulp) pulp fibers is prepared at about 3% fiber by weight using a conventional repulper, then transferred to the hardwood fiber stock chest. The *eucalyptus* fiber slurry of the hardwood stock chest is pumped through a stock pipe to a hardwood fan pump where the slurry consistency is reduced from about 3% by fiber weight to about 0.15% by fiber weight. The 0.15% *eucalyptus* slurry is then pumped and equally distributed in the top and bottom chambers of a multi-layered, three-chambered headbox of a Fourdrinier wet-laid papermaking machine.

Additionally, an aqueous slurry of NSK (Northern Softwood Kraft) pulp fibers is prepared at about 3% fiber by weight using a conventional repulper, then transferred to the softwood fiber stock chest. The NSK fiber slurry of the softwood stock chest is pumped through a stock pipe to be refined to a Canadian Standard Freeness (CSF) of about 630. The refined NSK fiber slurry is then directed to the NSK fan pump where the NSK slurry consistency is reduced from about 3% by fiber weight to about 0.15% by fiber weight. The 0.15% NSK slurry is then directed and distributed to the center chamber of a multi-layered, three-chambered headbox of a Fourdrinier wet-laid papermaking machine.

In order to impart temporary wet strength to the finished fibrous structure, a 1% dispersion of temporary wet strengthening additive (e.g., Fennorez® 91 commercially available from Kemira) is prepared and is added to the NSK fiber stock pipe at a rate sufficient to deliver 0.23% temporary wet strengthening additive based on the dry weight of the NSK fibers. The absorption of the temporary wet strengthening additive is enhanced by passing the treated slurry through an in-line mixer.

The wet-laid papermaking machine has a layered headbox having a top chamber, a center chamber, and a bottom chamber where the chambers feed directly onto the forming wire (Fourdrinier wire). The *eucalyptus* fiber slurry of 0.15% consistency is directed to the top headbox chamber and bottom headbox chamber. The NSK fiber slurry is directed to the center headbox chamber. All three fiber layers are delivered simultaneously in superposed relation onto the Fourdrinier wire to form thereon a three-layer embryonic fibrous structure (web), of which about 26% of the top side is made up of the *eucalyptus* fibers, about 26% is made up of the *eucalyptus* fibers on the bottom side and about 48% is made up of the NSK fibers in the center. Dewatering occurs through the Fourdrinier wire and is assisted by a deflector and wire table vacuum boxes. The Fourdrinier wire is an 84M (84 by 76 5A, Albany International). The speed of the Fourdrinier wire is about 800 feet per minute (fpm). The one-ply Basis Weight for this condition was 11.3 pounds per 3000 square feet. The one-ply caliper (at 95 gsi) was 10.65 mils.

The embryonic wet fibrous structure is transferred from the Fourdrinier wire, at a fiber consistency of about 18-22% at the point of transfer, to a 3D patterned through-air-drying belt as shown in FIGS. 6A-6C. The speed of the 3D patterned through-air-drying belt is the same as the speed of the Fourdrinier wire. The 3D patterned through-air-drying belt is designed to yield a fibrous structure as shown in FIGS. 7A and 7B comprising a pattern of high density knuckle regions dispersed throughout a multi-elevational continuous pillow region. The multi-elevational continuous pillow region comprises an intermediate density pillow region (density between the high density knuckles and the low density other pillow region) and a low density pillow region formed by the deflection conduits created by the semi-continuous knuckle layer substantially oriented in the machine direction. This 3D patterned through-air-drying belt is formed by casting a first layer of an impervious resin surface of semi-continuous knuckles onto a fiber mesh supporting fabric similar to that shown in FIGS. 4B and 4C and then casting a second layer of impervious resin surface of discrete knuckles. The supporting fabric is a 98×52 filament, dual layer fine mesh. The thickness of the first layer resin cast is about 6 mils above the supporting fabric and the thickness of the second layer resin cast is about 13 mils above the supporting fabric.

Further de-watering of the fibrous structure is accomplished by vacuum assisted drainage until the fibrous structure has a fiber consistency of about 20% to 30%.

While remaining in contact with the 3D patterned through-air-drying belt, the fibrous structure is pre-dried by air blow-through pre-dryers to a fiber consistency of about 50-65% by weight.

After the pre-dryers, the semi-dry fibrous structure is transferred to a Yankee dryer and adhered to the surface of the Yankee dryer with a sprayed creping adhesive. The creping adhesive is an aqueous dispersion with the actives consisting of about 80% polyvinyl alcohol (PVA 88-44), about 20% UNICREPE® 457T20. UNICREPE® 457T20 is commercially available from GP Chemicals. The creping adhesive is delivered to the Yankee surface at a rate of about 0.15% adhesive solids based on the dry weight of the fibrous structure. The fiber consistency is increased to about 96-98% before the fibrous structure is dry-creped from the Yankee with a doctor blade.

The doctor blade has a bevel angle of about 25° and is positioned with respect to the Yankee dryer to provide an impact angle of about 81°. The Yankee dryer is operated at a temperature of about 300° F. and a speed of about 800 fpm. The fibrous structure is wound in a roll (parent roll) using a surface driven reel drum having a surface speed of about 655 fpm.

Two parent rolls of the fibrous structure are then converted into a sanitary tissue product by loading the roll of fibrous structure into an unwind stand. The line speed is 400 ft/min. One parent roll of the fibrous structure is unwound and transported to an emboss stand where the fibrous structure is strained to form the emboss pattern in the fibrous structure via a 0.75" Pressure Roll Nip and then combined with the fibrous structure from the other parent roll to make a multi-ply (2-ply) sanitary tissue product. The multi-ply sanitary tissue product is then transported to a winder where it is wound onto a core to form a log. The log of multi-ply sanitary tissue product is then transported to a log saw where the log is cut into finished multi-ply sanitary tissue product rolls. The multi-ply sanitary tissue product of this example exhibits the properties shown in Table 1, above.

Example 6—Through-Air-Drying Belt

The following Example illustrates a non-limiting example for a preparation of a sanitary tissue product comprising a fibrous structure according to the present invention on a pilot-scale Fourdrinier fibrous structure making (papermaking) machine.

An aqueous slurry of *eucalyptus* (Fibria Brazilian bleached hardwood kraft pulp) pulp fibers is prepared at about 3% fiber by weight using a conventional repulper, then transferred to the hardwood fiber stock chest. The *eucalyptus* fiber slurry of the hardwood stock chest is pumped through a stock pipe to a hardwood fan pump where the slurry consistency is reduced from about 3% by fiber weight to about 0.15% by fiber weight. The 0.15% *eucalyptus* slurry is then pumped and equally distributed in the top and bottom chambers of a multi-layered, three-chambered headbox of a Fourdrinier wet-laid papermaking machine.

Additionally, an aqueous slurry of NSK (Northern Softwood Kraft) pulp fibers is prepared at about 3% fiber by weight using a conventional repulper, then transferred to the softwood fiber stock chest. The NSK fiber slurry of the softwood stock chest is pumped through a stock pipe to be refined to a Canadian Standard Freeness (CSF) of about 630. The refined NSK fiber slurry is then directed to the NSK fan pump where the NSK slurry consistency is reduced from about 3% by fiber weight to about 0.15% by fiber weight. The 0.15% NSK slurry is then directed and distributed to the center chamber of a multi-layered, three-chambered headbox of a Fourdrinier wet-laid papermaking machine.

In order to impart temporary wet strength to the finished fibrous structure, a 1% dispersion of temporary wet strengthening additive (e.g., Fennorez® 91 commercially available from Kemira) is prepared and is added to the NSK fiber stock pipe at a rate sufficient to deliver 0.23% temporary wet strengthening additive based on the dry weight of the NSK fibers. The absorption of the temporary wet strengthening additive is enhanced by passing the treated slurry through an in-line mixer.

The wet-laid papermaking machine has a layered headbox having a top chamber, a center chamber, and a bottom chamber where the chambers feed directly onto the forming wire (Fourdrinier wire). The *eucalyptus* fiber slurry of 0.15% consistency is directed to the top headbox chamber and bottom headbox chamber. The NSK fiber slurry is directed to the center headbox chamber. All three fiber layers are delivered simultaneously in superposed relation onto the Fourdrinier wire to form thereon a three-layer embryonic fibrous structure (web), of which about 26% of the top side is made up of the *eucalyptus* fibers, about 26% is made of the *eucalyptus* fibers on the bottom side and about 48% is made up of the NSK fibers in the center. Dewatering occurs through the Fourdrinier wire and is assisted by a deflector and wire table vacuum boxes. The Fourdrinier wire is an 84M (84 by 76 5A, Albany International). The speed of the Fourdrinier wire is about 800 feet per minute (fpm). The one-ply Basis Weight for this condition was 11.5 pounds per 3000 square feet. The one-ply caliper (at 95 gsi) was 23.1 mils.

The embryonic wet fibrous structure is transferred from the Fourdrinier wire, at a fiber consistency of about 18-22% at the point of transfer, to a 3D patterned through-air-drying belt as shown in FIGS. 6A-6C. The speed of the 3D patterned through-air-drying belt is the same as the speed of the Fourdrinier wire. The 3D patterned through-air-drying belt is designed to yield a fibrous structure as shown in FIGS. 7A and 7B comprising a pattern of high density knuckle regions dispersed throughout a multi-elevational continuous pillow region. The multi-elevational continuous pillow region comprises an intermediate density pillow region (density between the high density knuckles and the low density other pillow region) and a low density pillow region formed by the deflection conduits created by the semi-continuous knuckle layer substantially oriented in the machine direction. This 3D patterned through-air-drying belt is formed by casting a first layer of an impervious resin surface of semi-continuous knuckles onto a fiber mesh supporting fabric similar to that shown in FIGS. 4B and 4C and then casting a second layer of impervious resin surface of discrete knuckles. The supporting fabric is a 98×52 filament, dual layer fine mesh. The thickness of the first layer resin cast is about 6 mils above the supporting fabric and the thickness of the second layer resin cast is about 13 mils above the supporting fabric.

Further de-watering of the fibrous structure is accomplished by vacuum assisted drainage until the fibrous structure has a fiber consistency of about 20% to 30%.

While remaining in contact with the 3D patterned through-air-drying belt, the fibrous structure is pre-dried by air blow-through pre-dryers to a fiber consistency of about 50-65% by weight.

After the pre-dryers, the semi-dry fibrous structure is transferred to a Yankee dryer and adhered to the surface of the Yankee dryer with a sprayed creping adhesive. The creping adhesive is an aqueous dispersion with the actives consisting of about 80% polyvinyl alcohol (PVA 88-44), about 20% UNICREPE® 457T20. UNICREPE® 457T20 is commercially available from GP Chemicals. The creping adhesive is delivered to the Yankee surface at a rate of about 0.15% adhesive solids based on the dry weight of the fibrous structure. The fiber consistency is increased to about 96-98% before the fibrous structure is dry-creped from the Yankee with a doctor blade.

The doctor blade has a bevel angle of about 25° and is positioned with respect to the Yankee dryer to provide an impact angle of about 81°. The Yankee dryer is operated at a temperature of about 300° F. and a speed of about 800 fpm. The fibrous structure is wound in a roll (parent roll) using a surface driven reel drum having a surface speed of about 671 fpm.

Two parent rolls of the fibrous structure are then converted into a sanitary tissue product by loading the roll of fibrous structure into an unwind stand. The line speed is 400 ft/min. One parent roll of the fibrous structure is unwound and transported to an emboss stand where the fibrous structure is strained to form the emboss pattern in the fibrous structure via a 0.75" Pressure Roll Nip and then combined with the fibrous structure from the other parent roll to make a multi-ply (2-ply) sanitary tissue product. The multi-ply sanitary tissue product is then transported to a winder where it is wound onto a core to form a log. The log of multi-ply sanitary tissue product is then transported to a log saw where the log is cut into finished multi-ply sanitary tissue product rolls. The multi-ply sanitary tissue product of this example exhibits the properties shown in Table 1, above.

Example 7—Through-Air-Drying Belt

The following Example illustrates a non-limiting example for a preparation of a sanitary tissue product, for example a paper towel, comprising a fibrous structure according to the present invention on a pilot-scale Fourdrinier fibrous structure making (papermaking) machine.

A 3% by weight aqueous slurry of northern softwood kraft (NSK) pulp is made up in a conventional re-pulper. The NSK slurry is refined gently and a 3% solution of a permanent wet strength resin (i.e. Kymene 5221 marketed by Hercules incorporated of Wilmington, Del.) is added to the NSK stock pipe at a rate of 1% by weight of the dry fibers. The adsorption of Kymene 5221 to NSK is enhanced by an in-line mixer. A 1% solution of Carboxy Methyl Cellulose (CMC) (i.e. FinnFix 700 marketed by C.P. Kelco U.S. Inc. of Atlanta, Ga.) is added after the in-line mixer at a rate of 0.35% by weight of the dry fibers to enhance the dry strength of the fibrous substrate. The refined NSK fiber slurry is then directed to the NSK fan pump where the NSK slurry consistency is reduced from about 3% by fiber weight to about 0.15% by fiber weight. The 0.15% NSK slurry is then directed and distributed to the center and top chamber of a multi-layered, three-chambered headbox of a Fourdrinier wet-laid papermaking machine.

A 3% by weight aqueous slurry of *Eucalyptus* fibers is made up in a conventional re-pulper. A 1% solution of defoamer (i.e. Wickit 1285 marketed by Hercules Incorporated of Wilmington, Del.) is added to the *Eucalyptus* stock pipe at a rate of 0.1% by weight of the dry fibers and its adsorption is enhanced by an in-line mixer. The *eucalyptus* fiber slurry of the hardwood stock chest is pumped through a stock pipe to the NSK fan pump where the slurry consistency is reduced from about 3% by fiber weight to about 0.15% by fiber weight. The 0.15% *eucalyptus* slurry is then pumped and equally distributed in the center and top chambers of a multi-layered, three-chambered headbox of a Fourdrinier wet-laid papermaking machine. The *eucalyptus* fiber slurry of the hardwood stock chest is pumped through a stock pipe to the Euc fan pump where the slurry consistency is reduced from about 3% by fiber weight to about 0.15% by fiber weight. The 0.15% *Eucalyptus* slurry is then pumped and distributed in the bottom chamber of a multi-layered, three-chambered headbox of a Fourdrinier wet-laid papermaking machine.

A 3% by weight aqueous slurry of 40% *Eucalyptus* fibers, 40% Northern Softwood Kraft (NSK), and 20% Southern Softwood Kraft (SSK) is made up in a conventional re-pulper. This blend will be called mixed fiber. The fiber slurry of the mixed fiber stock chest is pumped through a stock pipe to the NSK fan pump where the slurry consistency is reduced from about 3% by fiber weight to about 0.15% by fiber weight. The 0.15% mixed fiber slurry is then pumped and equally distributed in the center and top chambers of a multi-layered, three-chambered headbox of a Fourdrinier wet-laid papermaking machine.

The wet-laid papermaking machine has a layered headbox having a top chamber, a center chamber, and a bottom chamber where the chambers feed directly onto the forming wire (Fourdrinier wire). The *eucalyptus* fiber slurry of 0.15% consistency is directed to the top headbox chamber and in equal amounts to the center and bottom chambers. The NSK fiber slurry is directed to the center and bottom headbox chamber. The Mixed Fiber slurry is directed to the center and bottom headbox chamber. All three fiber layers are delivered simultaneously in superposed relation onto the Fourdrinier wire to form thereon a three-layer embryonic fibrous structure (web), of which about 21% of the bottom side is made up of the *eucalyptus* fibers, about 11% is made of the *eucalyptus* fibers on the center and top side, about 53% is made up of the NSK fibers in the center and top side, about 15% is made up of Mixed Fiber in the center and top side. Dewatering occurs through the Fourdrinier wire and is assisted by a deflector and wire table vacuum boxes. The Fourdrinier wire is an 84M (84 by 76 5A, Albany International). The speed of the Fourdrinier wire is about 700 feet per minute (fpm).

The web is then transferred to the patterned transfer/ imprinting fabric, with a pattern as described in this application, in the transfer zone without precipitating substantial densification of the web. The web is then forwarded, at a second velocity, $V_2$, on the transfer/imprinting fabric along a looped path in contacting relation with a transfer head disposed at the transfer zone, the second velocity being from about 5% to about 40% slower than the first velocity. Since the wire speed is faster than the transfer/imprinting fabric, wet shortening of the web occurs at the transfer point. Thus, the wet web foreshortening may be about 3% to about 15%.

Further de-watering is accomplished by vacuum assisted drainage until the web has a fiber consistency of about 20% to about 30%. The patterned web is pre-dried by air blow-through to a fiber consistency of about 65% by weight. The web is then adhered to the surface of a Yankee dryer with a sprayed creping adhesive comprising 0.1% aqueous solution of Polyvinyl Alcohol (PVA). The fiber consistency is increased to an estimated 96% before the dry creping the web with a doctor blade. The doctor blade has a bevel angle of about 45 degrees and is positioned with respect to the Yankee dryer to provide an impact angle of about 101 degrees. The dried web is reeled at a fourth velocity, $V_4$, that is faster than the third velocity, $V_3$, of the drying cylinder.

Two plies of the web can be formed into multi-ply sanitary tissue products by embossing and laminating them together using PVA adhesive. The multi-ply sanitary tissue product of this example exhibits the properties shown in Table 1, above.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 2 hours prior to the test. The samples tested are "usable units." "Usable units" as used herein means sheets, flats from roll stock, pre-converted flats, and/or single or multi-ply products. All tests are conducted in such conditioned room. Do not test samples that have defects such as wrinkles, tears, holes, and like. All instruments are calibrated according to manufacturer's specifications.

Basis Weight Test Method

Basis weight of a fibrous structure and/or sanitary tissue product is measured on stacks of twelve usable units using a top loading analytical balance with a resolution of ±0.001 g. The balance is protected from air drafts and other disturbances using a draft shield. A precision cutting die, measuring 3.500 in±0.0035 in by 3.500 in±0.0035 in is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in lbs/3000 ft² or g/m² as follows:

Basis Weight=(Mass of stack)/[(Area of 1 square in stack)×(No. of squares in stack)]

For example,

Basis Weight (lbs/3000 ft$^2$)=[[Mass of stack (g)/ 453.6 (g/lbs)]/[12.25 (in$^2$)/144 (in$^2$/ft$^2$)×12]]× 3000 or,

Basis Weight (g/m$^2$)=Mass of stack (g)/[79.032 (cm$^2$)/10,000 (cm$^2$/m$^2$)×12]

Report result to the nearest 0.1 lbs/3000 ft$^2$ or 0.1 g/m$^2$. Sample dimensions can be changed or varied using a similar precision cutter as mentioned above, so as at least 100 square inches of sample area in stack.

Caliper Test Method

Caliper of a fibrous structure and/or sanitary tissue product is measured using a ProGage Thickness Tester (Thwing-Albert Instrument Company, West Berlin, N.J.) with a pressure foot diameter of 2.00 inches (area of 3.14 in$^2$) at a pressure of 95 g/in$^2$. Four (4) samples are prepared by cutting of a usable unit such that each cut sample is at least 2.5 inches per side, avoiding creases, folds, and obvious defects. An individual specimen is placed on the anvil with the specimen centered underneath the pressure foot. The foot is lowered at 0.03 in/sec to an applied pressure of 95 g/in$^2$. The reading is taken after 3 sec dwell time, and the foot is raised. The measure is repeated in like fashion for the remaining 3 specimens. The caliper is calculated as the average caliper of the four specimens and is reported in mils (0.001 in) to the nearest 0.1 mils.

Density Test Method

The density of a fibrous structure and/or sanitary tissue product is calculated as the quotient of the Basis Weight of a fibrous structure or sanitary tissue product expressed in lbs/3000 ft2 divided by the Caliper (at 95 g/in$^2$) of the fibrous structure or sanitary tissue product expressed in mils. The final Density value is calculated in lbs/ft3 and/or g/cm3, by using the appropriate converting factors.

Stack Compressibility and Resilient Bulk Test Method

Stack thickness (measured in mils, 0.001 inch) is measured as a function of confining pressure (g/in$^2$) using a Thwing-Albert (14 W. Collings Ave., West Berlin, N.J.) Vantage Compression/Softness Tester (model 1750-2005 or similar) or equivalent instrument, equipped with a 2500 g load cell (force accuracy is +/−0.25% when measuring value is between 10%-100% of load cell capacity, and 0.025% when measuring value is less than 10% of load cell capacity), a 1.128 inch diameter steel pressure foot (one square inch cross sectional area) which is aligned parallel to the steel anvil (2.5 inch diameter). The pressure foot and anvil surfaces must be clean and dust free, particularly when performing the steel-to-steel test. Thwing-Albert software (MAP) controls the motion and data acquisition of the instrument.

The instrument and software is set-up to acquire crosshead position and force data at a rate of 50 points/sec. The crosshead speed (which moves the pressure foot) for testing samples is set to 0.20 inches/min (the steel-to-steel test speed is set to 0.05 inches/min). Crosshead position and force data are recorded between the load cell range of approximately 5 and 1500 grams during compression. The crosshead is programmed to stop immediately after surpassing 1500 grams, record the thickness at this pressure (termed T$_{max}$), and immediately reverse direction at the same speed as performed in compression. Data is collected during this decompression portion of the test (also termed recovery) between approximately 1500 and 5 grams. Since the foot area is one square inch, the force data recorded corresponds to pressure in units of g/in$^2$. The MAP software is programmed to the select 15 crosshead position values (for both compression and recovery) at specific pressure trap points of 10, 25, 50, 75, 100, 125, 150, 200, 300, 400, 500, 600, 750, 1000, and 1250 g/in$^2$ (i.e., recording the crosshead position of very next acquired data point after the each pressure point trap is surpassed). In addition to these 30 collected trap points, T$_{max}$ is also recorded, which is the thickness at the maximum pressure applied during the test (approximately 1500 g/in$^2$).

Since the overall test system, including the load cell, is not perfectly rigid, a steel-to-steel test is performed (i.e., nothing in between the pressure foot and anvil) at least twice for each batch of testing, to obtain an average set of steel-to-steel crosshead positions at each of the 31 trap points described above. This steel-to-steel crosshead position data is subtracted from the corresponding crosshead position data at each trap point for each tested stacked sample, thereby resulting in the stack thickness (mils) at each pressure trap point during the compression, maximum pressure, and recovery portions of the test.

$$StackT (trap)=StackCP (trap)-SteelCP (trap)$$

Where:
trap=trap point pressure at either compression, recovery, or max
StackT=Thickness of Stack (at trap pressure)
StackCP=Crosshead position of Stack in test (at trap pressure)
SteelCP=Crosshead position of steel-to-steel test (at trap pressure)

A stack of five (5) usable units thick is prepared for testing as follows. The minimum usable unit size is 2.5 inch by 2.5 inch; however a larger sheet size is preferable for testing, since it allows for easier handling without touching the central region where compression testing takes place. For typical perforated rolled bath tissue, this consists of removing five (5) sets of 3 connected usable units. In this case, testing is performed on the middle usable unit, and the outer 2 usable units are used for handling while removing from the roll and stacking. For other product formats, it is advisable, when possible, to create a test sheet size (each one usable unit thick) that is large enough such that the inner testing region of the created 5 usable unit thick stack is never physically touched, stretched, or strained, but with dimensions that do not exceed 14 inches by 6 inches.

The 5 sheets (one usable unit thick each) of the same approximate dimensions, are placed one on top the other, with their MD aligned in the same direction, their outer face all pointing in the same direction, and their edges aligned +/−3 mm of each other. The central portion of the stack, where compression testing will take place, is never to be physically touched, stretched, and/or strained (this includes never to 'smooth out' the surface with a hand or other apparatus prior to testing).

The 5 sheet stack is placed on the anvil, positioning it such that the pressure foot will contact the central region of the stack (for the first compression test) in a physically untouched spot, leaving space for a subsequent (second) compression test, also in the central region of the stack, but separated by ¼ inch or more from the first compression test, such that both tests are in untouched, and separated spots in the central region of the stack. From these two tests, an average crosshead position of the stack at each trap pressure (i.e., StackCP(trap)) is calculated for compression, maximum pressure, and recovery portions of the tests. Then, using the average steel-to-steel crosshead trap points (i.e., SteelCP(trap)), the average stack thickness at each trap (i.e., StackT(trap) is calculated (mils).

Stack Compressibility is defined here as the absolute value of the linear slope of the stack thickness (mils) as a function of the log(10) of the confining pressure (grams/in$^2$), by using the 15 compression trap points discussed previously (i.e., compression from 10 to 1250 g/in$^2$), in a least squares regression. The units for Stack Compressibility are mils/(log(g/in$^2$)), and is reported to the nearest 0.1 mils/(log (g/in$^2$)).

Resilient Bulk is calculated from the stack weight per unit area and the sum of 8 StackT(trap) thickness values from the maximum pressure and recovery portion of the tests: i.e., at maximum pressure ($T_{max}$) and recovery trap points at R1250, R1000, R750, R500, R300, R100, and R10 g/in$^2$ (a prefix of "R" denotes these traps come from recovery portion of the test). Stack weight per unit area is measured from the same region of the stack contacted by the compression foot, after the compression testing is complete, by cutting a 3.50 inch square (typically) with a precision die cutter, and weighing on a calibrated 3-place balance, to the nearest 0.001 gram. The weight of the precisely cut stack, along with the StackT(trap) data at each required trap pressure (each point being an average from the two compression/recovery tests discussed previously), are used in the following equation to calculate Resilient Bulk, reported in units of cm$^3$/g, to the nearest 0.1 cm$^3$/g.

$$\text{Resilient Bulk} = \frac{\text{SUM}(StackT(T_{max}, R1250, R1000, R750, R500, R300, R100, R10)) * 0.00254}{M/A}$$

Where:
StackT=Thickness of Stack (at trap pressures of $T_{max}$ and recovery pressures listed above), (mils)
M=weight of precisely cut stack, (grams)
A=area of the precisely cut stack, (cm$^2$)

Plate Stiffness Test Method

As used herein, the "Plate Stiffness" test is a measure of stiffness of a flat sample as it is deformed downward into a hole beneath the sample. For the test, the sample is modeled as an infinite plate with thickness "t" that resides on a flat surface where it is centered over a hole with radius "R". A central force "F" applied to the tissue directly over the center of the hole deflects the tissue down into the hole by a distance "w". For a linear elastic material the deflection can be predicted by:

$$w = \frac{3F}{4\pi E t^3}(1-v)(3+v)R^2$$

where "E" is the effective linear elastic modulus, "v" is the Poisson's ratio, "R" is the radius of the hole, and "t" is the thickness of the tissue, taken as the caliper in millimeters measured on a stack of 5 tissues under a load of about 0.29 psi. Taking Poisson's ratio as 0.1 (the solution is not highly sensitive to this parameter, so the inaccuracy due to the assumed value is likely to be minor), the previous equation can be rewritten for "w" to estimate the effective modulus as a function of the flexibility test results:

$$E \approx \frac{3R^2}{4t^3}\frac{F}{w}$$

The test results are carried out using an MTS Alliance RT/1, Insight Renew, or similar model testing machine (MTS Systems Corp., Eden Prairie, Minn.), with a 50 newton load cell, and data acquisition rate of at least 25 force points per second. As a stack of five tissue sheets (created without any bending, pressing, or straining) at least 2.5-inches by 2.5 inches, but no more than 5.0 inches by 5.0 inches, oriented in the same direction, sits centered over a hole of radius 15.75 mm on a support plate, a blunt probe of 3.15 mm radius descends at a speed of 20 mm/min. For typical perforated rolled bath tissue, sample preparation consists of removing five (5) connected usable units, and carefully forming a 5 sheet stack, accordion style, by bending only at the perforation lines. When the probe tip descends to 1 mm below the plane of the support plate, the test is terminated. The maximum slope (using least squares regression) in grams of force/mm over any 0.5 mm span during the test is recorded (this maximum slope generally occurs at the end of the stroke). The load cell monitors the applied force and the position of the probe tip relative to the plane of the support plate is also monitored. The peak load is recorded, and "E" is estimated using the above equation.

The Plate Stiffness "S" per unit width can then be calculated as:

$$S = \frac{Et^3}{12}$$

and is expressed in units of Newtons*millimeters. The Testworks program uses the following formula to calculate stiffness (or can be calculated manually from the raw data output):

$$S = \left(\frac{F}{w}\right)\left[\frac{(3+v)R^2}{16\pi}\right]$$

wherein "F/w" is max slope (force divided by deflection), "v" is Poisson's ratio taken as 0.1, and "R" is the ring radius.

The same sample stack (as used above) is then flipped upside down and retested in the same manner as previously described. This test is run three more times (with different sample stacks). Thus, eight S values are calculated from four 5-sheet stacks of the same sample. The numerical average of these eight S values is reported as Plate Stiffness for the sample.

Slip Stick Coefficient of Friction Test Method

Background

Friction is the force resisting the relative motion of solid surfaces, fluid layers, and material elements sliding against each other. Of particular interest here, 'dry' friction resists relative lateral motion of two solid surfaces in contact. Dry friction is subdivided into static friction between non-moving surfaces, and kinetic friction between moving surfaces. "Slip Stick", as applied here, is the term used to describe the dynamic variation in kinetic friction.

Friction is not itself a fundamental force but arises from fundamental electromagnetic forces between the charged particles constituting the two contacting surfaces. Textured surfaces also involve mechanical interactions, as is the case when sandpaper drags against a fibrous substrate. The complexity of these interactions makes the calculation of friction from first principles impossible and necessitates the use of empirical methods for analysis and the development of theory. As such, a specific sled material and test method was identified, and has shown correlation to human perception of surface feel.

Figure 13:
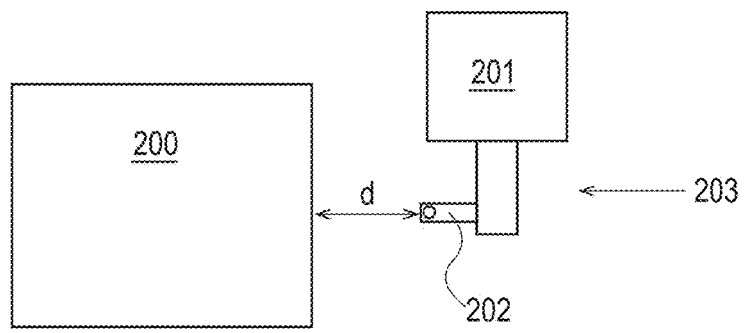
FIG. 13 is a schematic top view representation of a Slip Stick Coefficient of Friction Test Method set-up.
Figure 14:
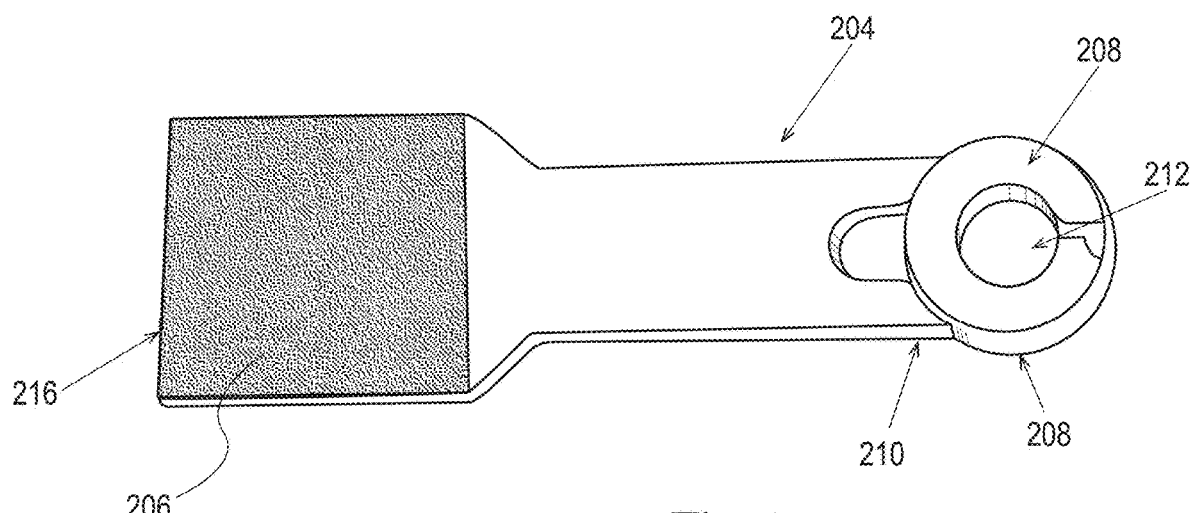
FIG. 14 is an image of a friction sled for use in the Slip Stick Coefficient of Friction Test Method.
Figure 15:
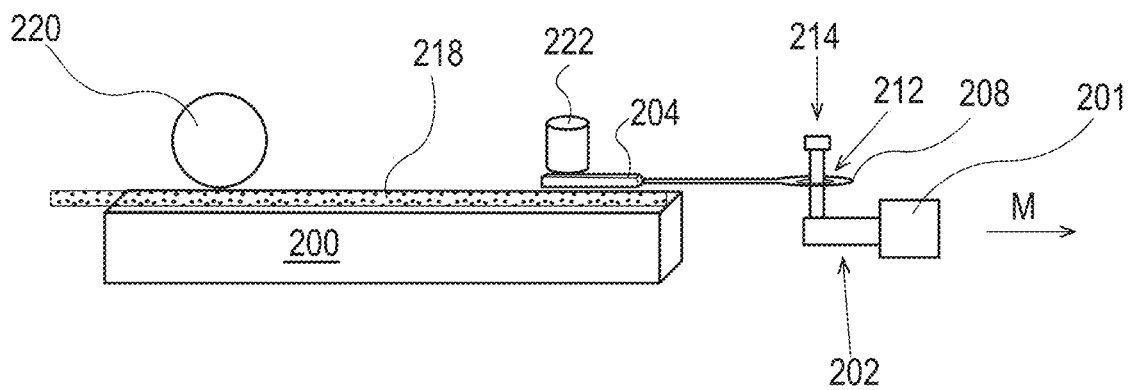
FIG. 15 is a schematic side view representation of a Slip Stick Coefficient of Friction Test Method set-up.

This Slip Stick Coefficient of Friction Test Method measures the interaction of a diamond file (120-140 grit) against a surface of a test sample, in this case a fibrous structure and/or sanitary tissue product, at a pressure of about 32 g/in$^2$ as shown in FIGS. 13-15. The friction measurements are highly dependent on the exactness of the sled material surface properties, and since each sled has no 'standard' reference, sled-to-sled surface property variation is accounted for by testing a test sample with multiple sleds, according to the equipment and procedure described below.

Equipment and Set-Up

A Thwing-Albert (14 W. Collings Ave., West Berlin, N.J.) friction/peel test instrument (model 225-1) or equivalent if no longer available, is used, equipped with data acquisition software and a calibrated 2000 gram load cell that moves horizontally across the platform. Attached to the load cell is a small metal fitting (defined here as the "load cell arm") which has a small hole near its end, such that a sled string can be attached (for this method, however, no string will be used). Into this load cell arm hole, insert a cap screw (¾ inch #8-32) by partially screwing it into the opening, so that it is rigid (not loose) and pointing vertically, perpendicular to the load cell arm.

After turning instrument on, set instrument test speed to 2 inches/min, test time to 10 seconds, and wait at least 5 minutes for instrument to warm up before re-zeroing the load cell (with nothing touching it) and testing. Force data from the load cell is acquired at a rate of 52 points per second, reported to the nearest 0.1 gram force. Press the 'Return' button to move crosshead 201 to its home position.

A smooth surfaced metal test platform 200, with dimensions of 5 inches by 4 inches by ¾ inch thick, is placed on top of the test instrument platen surface, on the left hand side of the load cell 203, with one of its 4 inch by ¾ inch sides facing towards the load cell 203, positioned 1.125 inches d from the left most tip of the load cell arm 202 as shown in FIGS. 13 and 15.

Sixteen test sleds 204 are required to perform this test (32 different sled surface faces). Each is made using a dual sided, wide faced diamond file 206 (25 mm×25 mm, 120/ 140 grit, 1.2 mm thick, McMaster-Carr part number 8142A14) with 2 flat metal washers 208 (approximately ¹¹⁄₁₆th inch outer diameter and about ¹¹⁄₃₂nd inch inner diameter). The combined weight of the diamond file 206 and 2 washers 208 is 11.7 grams+/−0.2 grams (choose different washers until weight is within this range). Using a metal bonding adhesive (Loctite 430, or similar), adhere the 2 washers 208 to the c-shaped end 210 of the diamond file 206 (one each on either face), aligned and positioned such that the opening 212 is large enough for the cap screw 214 to easily fit into, and to make the total length of sled 204 to approximately 3 inches long. Clean sled 204 by dipping it, diamond face end 216 only, into an acetone bath, while at the same time gently brushing with soft bristled toothbrush 3-6 times on both sides of the diamond file 206. Remove from acetone and pat dry each side with Kimwipe tissue (do not rub tissue on diamond surface, since this could break tissue pieces onto sled surface). Wait at least 15 minutes before using sled 204 in a test. Label each side of the sled 204 (on the arm or washer, not on the diamond face) with a unique identifier (i.e., the first sled is labeled "1a" on one side, and "1b" on its other side). When all 16 sleds 204 are created and labeled, there are then 32 different diamond face surfaces for available for testing, labeled 1a and 1b through 16a and 16b. These sleds 204 must be treated as fragile (particularly the diamond surfaces) and handled carefully; thus, they are stored in a slide box holder, or similar protective container.

Sample Prep

If sample to be tested is bath tissue, in perforated roll form, then gently remove 8 sets of 2 connected sheets from the roll, touching only the corners (not the regions where the test sled will contact). Use scissors or other sample cutter if needed. If sample is in another form, cut 8 sets of sample approximately 8 inches long in the MD, by approximately 4 inches long in the CD, one usable unit thick each. Make note and/or a mark that differentiates both face sides of each sample (e.g., fabric side or wire side, top or bottom, etc.). When sample prep is complete, there are 8 sheets prepared with appropriate marking that differentiates one side from the other. These will be referred to hereinafter as: sheets #1 through #8, each with a top side and a bottom side.

Test Operation

Press the 'Return' button to ensure crosshead 201 is in its home position.

Without touching test area of sample, place sheet #1 218 on test platform 200, top side facing up, aligning one of the sheet's CD edges (i.e. edge that is parallel to the CD) along the platform 218 edge closest to the load cell 202 (+/−1 mm). This first test (pull), of 32 total, will be in the MD direction on the top side of the sheet 218. Place a brass bar weight or equivalent 220 (1 inch diameter, 3.75 inches long) on the sheet 218, near its center, aligned perpendicular to the sled pull direction, to prevent sheet 218 from moving during the test. Place test sled "1a" 204 over cap screw head 214 (i.e., sled washer opening 212 over cap screw head 214, and sled side 1a is facing down) such that the diamond file 206 surface is laying flat and parallel on the sheet 218 surface and the cap screw 214 is touching the inside edge of the washers 208.

Gently place a cylindrically shaped brass 20 gram (+/− 0.01 grams) weight 222 on top of the sled 204, with its edge aligned and centered with the sled's back end. Initiate the sled movement m and data acquisition by pressing the 'Test' button on the instrument. The test set up is shown in FIG. 15. The computer collects the force (grams) data and, after approximately 10 seconds of test time, this first of 32 test pulls of the overall test is complete.

If the test pull was set-up correctly, the diamond file 206 face (25 mm by 25 mm square) stays in contact with the sheet 218 during the entire 10 second test time (i.e., does not overhang over the sheet 218 or test platform 200 edge). Also, if at any time during the test the sheet 218 moves, the test is invalid, and must be rerun on another untouched portion of the sheet 218, using a heavier brass bar weight or equivalent 220 to hold sheet 218 down. If the sheet 218 rips or tears, rerun the test on another untouched portion of the sheet 218 (or create a new sheet 218 from the sample). If it rips again, then replace the sled 204 with a different one (giving it the same sled name as the one it replaced). These statements apply to all 32 test pulls.

For the second of 32 test pulls (also an MD pull, but in the opposite direction on the sheet), first remove the 20 gram weight 222, the sled 204, and the brass bar weight or equivalent 220 from the sheet 218. Press the 'Return' button on the instrument to reset the crosshead 201 to its home position. Rotate the sheet 218 180° (with top side still facing up), and replace the brass bar weight or equivalent 220 onto the sheet 218 (in the same position described previously). Place test sled "1b" 204 over the cap screw head 214 (i.e., sled washer opening 212 over cap screw head 214, and sled side 1b is facing down) and the 20 gram weight 222 on the sled 204, in the same manner as described previously. Press the 'Test' button to collect the data for the second test pull.

The third test pull will be in the CD direction. After removing the sled 204, weights 220, 222, and returning the crosshead 201, the sheet 218 is rotated 90° from its previous position (with top side still facing up), and positioned so that its MD edge is aligned with the test platform 200 edge (+/−1 mm). Position the sheet 218 such that the sled 204 will not touch any perforation, if present, or touch the area where the brass bar weight or equivalent 220 rested in previous test pulls. Place the brass bar weight or equivalent 220 onto the sheet 218 near its center, aligned perpendicular to the sled pull direction m. Place test sled "2a" 204 over the cap screw head 214 (i.e., sled washer opening 212 over cap screw head 214, and sled side 2a is facing down) and the 20 gram weight 222 on the sled 204, in the same manner as described previously. Press the 'Test' button to collect the data for the third test pull.

The fourth test pull will also be in the CD, but in the opposite direction and on the opposite half section of the sheet 218. After removing the sled 204, weights 220, 222, and returning the crosshead 201, the sheet 218 is rotated 180° from its previous position (with top side still facing up), and positioned so that its MD edge is again aligned with the test platform 200 edge (+/−1 mm). Position the sheet 218 such that the sled 204 will not touch any perforation, if present, or touch the area where the brass bar weight or equivalent 220 rested in previous test pulls. Place the brass bar weight or equivalent 220 onto the sheet 218 near its center, aligned perpendicular to the sled pull direction m. Place test sled "2b" 204 over the cap screw head 214 (i.e., sled washer opening 212 over cap screw head 214, and sled side 2b is facing down) and the 20 gram weight 222 on the sled 204, in the same manner as described previously. Press the 'Test' button to collect the data for the fourth test pull.

After the fourth test pull is complete, remove the sled 204, weights 220, 222, and return the crosshead 201 to the home position. Sheet #1 218 is discarded.

Test pulls 5-8 are performed in the same manner as 1-4, except that sheet #2 218 has its bottom side now facing upward, and sleds 3a, 3b, 4a, and 4b are used.

Test pulls 9-12 are performed in the same manner as 1-4, except that sheet #3 218 has its top side facing upward, and sleds 5a, 5b, 6a, and 6b are used.

Test pulls 13-16 are performed in the same manner as 1-4, except that sheet #4 218 has its bottom side facing upward, and sleds 7a, 7b, 8a, and 8b are used.

Test pulls 17-20 are performed in the same manner as 1-4, except that sheet #5 218 has its top side facing upward, and sleds 9a, 9b, 10a, and 10b are used.

Test pulls 21-24 are performed in the same manner as 1-4, except that sheet #6 218 has its bottom side facing upward, and sleds 11a, 11b, 12a, and 12b are used.

Test pulls 25-28 are performed in the same manner as 1-4, except that sheet #7 218 has its top side facing upward, and sleds 13a, 13b, 14a, and 14b are used.

Test pulls 29-32 are performed in the same manner as 1-4, except that sheet #8 218 has its bottom side facing upward, and sleds 15a, 15b, 16a, and 16b are used.

Calculations and Results

The collected force data (grams) is used to calculate Slip Stick COF for each of the 32 test pulls, and subsequently the overall average Slip Stick COF for the sample being tested. In order to calculate Slip Stick COF for each test pull, the following calculations are made. First, the standard deviation is calculated for the force data centered on 131st data point (which is 2.5 seconds after the start of the test)+/−26 data points (i.e., the 53 data points that cover the range from 2.0 to 3.0 seconds). This standard deviation calculation is repeated for each subsequent data point, and stopped after the 493rd point (about 9.5 sec). The numerical average of these 363 standard deviation values is then divided by the sled weight (31.7 g) and multiplied by 10,000 to generate the Slip Stick COF*10,000 for each test pull. This calculation is repeated for all 32 test pulls. The numerical average of these 32 Slip Stick COF*10,000 values is the reported value of the Slip Stick COF*10,000 for the sample. For simplicity, it is referred to as just Slip Stick COF, or more simply as Slip Stick, without units (dimensionless), and is reported to the nearest 1.0.

Outliers and Noise

It is not uncommon, with this described method, to observe about one out of the 32 test pulls to exhibit force data with a harmonic wave of vibrations superimposed upon it. For whatever reason, the pulled sled periodically gets into a relatively high frequency, oscillating 'shaking' mode, which can be seen in graphed force vs. time. The sine wave-like noise was found to have a frequency of about 10 sec-1 and amplitude in the 3-5 grams force range. This adds a bias to the true Slip Stick result for that test; thus, it is appropriate for this test pull be treated as an outlier, the data removed, and replaced with a new test of that same scenario (e.g., CD top face) and sled number (e.g. 3a).

To get an estimate of the overall measurement noise, 'blanks' were run on the test instrument without any touching the load cell (i.e., no sled). The average force from these tests is zero grams, but the calculated Slip Stick COF was 66. Thus, it is speculated that, for this instrument measurement system, this value represents that absolute lower limit for Slip Stick COF.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A sanitary tissue product comprising a plurality of pulp fibers, wherein the sanitary tissue product exhibits a Compressibility of greater than 55.0 mils/(log(g/in$^2$)) as measured according to the Stack Compressibility and Resilient Bulk Test Method and a Plate Stiffness of less than 5.00 N*mm as measured according to the Plate Stiffness Test Method.

2. The sanitary tissue product according to claim 1 wherein the pulp fibers comprise wood pulp fibers.

3. The sanitary tissue product according to claim 1 wherein the pulp fibers comprise non-wood pulp fibers.

4. The sanitary tissue product according to claim 1 wherein the sanitary tissue product comprises an embossed fibrous structure ply.

5. The sanitary tissue product according to claim 1 wherein the sanitary tissue product comprises a through-air-dried fibrous structure ply.

6. The sanitary tissue product according to claim 5 wherein the through-air-dried fibrous structure ply comprises an uncreped through-air-dried fibrous structure ply.

7. The sanitary tissue product according to claim 5 wherein the through-air-dried fibrous structure ply comprises a creped through-air-dried fibrous structure ply.

8. The sanitary tissue product according to claim 1 wherein the sanitary tissue product exhibits a Compressibility of greater than 55.0 to 68.4 mils/(log(g/in$^2$)) as measured according to the Stack Compressibility and Resilient Bulk Test Method.

9. The sanitary tissue product according to claim 8 wherein the sanitary tissue product exhibits a Plate Stiffness of less than 4.00 N*mm as measured according to the Plate Stiffness Test Method.

10. The sanitary tissue product according to claim 9 wherein the sanitary tissue product exhibits a Slip Stick Coefficient of Friction of less than 625 (COF*10000) as measured according to the Slip Stick Coefficient of Friction Test Method.

11. The sanitary tissue product according to claim 1 wherein the sanitary tissue product exhibits a Compressibility of greater than 56.30 to 68.4 mils/(log(g/in$^2$)) as measured according to the Stack Compressibility and Resilient Bulk Test Method.

12. The sanitary tissue product according to claim 1 wherein the sanitary tissue product exhibits a Plate Stiffness of less than 4.75 N*mm as measured according to the Plate Stiffness Test Method.

13. The sanitary tissue product according to claim 1 wherein the sanitary tissue product exhibits a Plate Stiffness of less than 5.00 to 1.26 N*mm as measured according to the Plate Stiffness Test Method.

14. The sanitary tissue product according to claim 13 wherein the sanitary tissue product exhibits a Slip Stick Coefficient of Friction of less than 500 (COF*10000) as measured according to the Slip Stick Coefficient of Friction Test Method.

15. The sanitary tissue product according to claim 1 wherein the sanitary tissue product exhibits a Slip Stick Coefficient of Friction of less than 725 (COF*10000) as measured according to the Slip Stick Coefficient of Friction Test Method.

16. The sanitary tissue product according to claim 1 wherein the sanitary tissue product is a single-ply bath tissue.

17. The sanitary tissue product according to claim 1 wherein the sanitary tissue product is a multi-ply bath tissue.

18. A sanitary tissue product roll comprising a sanitary tissue product according to claim 1.

19. A package comprising one or more sanitary tissue product rolls according to claim 16.

* * * * *